(12) United States Patent
Kautsch et al.

(10) Patent No.: US 11,661,124 B2
(45) Date of Patent: *May 30, 2023

(54) TRACKED VEHICLE WITH ADJUSTABLE TRACK SPACING

(71) Applicant: CAMSO INC., Magog (CA)

(72) Inventors: Dewaine Kautsch, Jefferson City, MO (US); Jonathan Lauzier, Sherbrooke (CA); Michel Deslauriers, Sherbrooke (CA)

(73) Assignee: Camso Inc., Magog (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,950

(22) Filed: Nov. 15, 2021

(65) Prior Publication Data

US 2022/0177059 A1    Jun. 9, 2022

Related U.S. Application Data

(63) Continuation of application No. 16/076,537, filed as application No. PCT/US2017/016980 on Feb. 8, 2017, now Pat. No. 11,173,971.

(Continued)

(51) Int. Cl.
  *B62D 55/065*    (2006.01)
  *B62D 55/084*    (2006.01)
  (Continued)

(52) U.S. Cl.
  CPC ......... *B62D 55/0655* (2013.01); *B62D 21/14* (2013.01); *B62D 55/084* (2013.01); *B62D 55/125* (2013.01)

(58) Field of Classification Search
  CPC . B62D 55/125; B62D 55/084; B62D 55/0655
  See application file for complete search history.

(56) References Cited

U.S. PATENT DOCUMENTS

| 2,618,349 A | 11/1952 | Ludema |
| 5,639,148 A | 6/1997 | Sheidler |

(Continued)

FOREIGN PATENT DOCUMENTS

| CA | 3014075 | 8/2017 |
| WO | 2017139356 | 8/2017 |

OTHER PUBLICATIONS

International Search Report and Written Opinion dated Aug. 10, 2017 in connection with PCT Application No. PCT/US2017/016980, 18 pages.

(Continued)

*Primary Examiner* — Jacob B Meyer
*Assistant Examiner* — Hosam Shabara
(74) *Attorney, Agent, or Firm* — Hahn Loeser & Parks LLP; Bret A. Hrivnak

(57) ABSTRACT

Track systems for traction of a vehicle in which a spacing of laterally-adjacent ones of the track systems in a widthwise direction of the vehicle is adjustable. This may facilitate use of the vehicle in different conditions (e.g., in different field configurations, such as in different configurations of row crops, where the vehicle is an agricultural vehicle). For instance, the spacing of the laterally-adjacent ones of the track systems may be adjustable while the laterally-adjacent ones of the track systems are connected to a powertrain of the vehicle and/or without requiring use of additional parts (e.g. spacers).

20 Claims, 53 Drawing Sheets

Related U.S. Application Data

(60) Provisional application No. 62/348,369, filed on Jun. 10, 2016, provisional application No. 62/328,965, filed on Apr. 28, 2016, provisional application No. 62/292,856, filed on Feb. 8, 2016.

(51) Int. Cl.
 *B62D 55/125* (2006.01)
 *B62D 21/14* (2006.01)

(56) References Cited

U.S. PATENT DOCUMENTS

| | | | | |
|---|---|---|---|---|
| 5,899,542 | A * | 5/1999 | Lykken | B62D 55/1086 305/129 |
| 6,176,334 | B1 | 1/2001 | Lorenzen | |
| 6,374,933 | B1 | 4/2002 | Ruppert, Jr. et al. | |
| 6,712,549 | B2 * | 3/2004 | Roth | B62D 55/104 404/83 |
| 7,373,999 | B2 | 5/2008 | Haringer | |
| 8,662,216 | B2 | 3/2014 | Roucka | |
| 9,505,454 | B1 * | 11/2016 | Kautsch | B62D 55/10 |
| 9,663,164 | B2 * | 5/2017 | Vik | B62D 55/305 |
| 9,994,268 | B2 | 6/2018 | Gustafson | |
| 10,077,087 | B2 | 9/2018 | Lubben | |
| 10,214,256 | B2 | 2/2019 | Rehberg | |
| 10,875,591 | B2 * | 12/2020 | Lunkenbein | B62D 55/244 |
| 11,299,220 | B2 * | 4/2022 | Sauvageau | B62D 55/24 |
| 2001/0025732 | A1 | 4/2001 | Lykken et al. | |
| 2009/0321151 | A1 | 12/2009 | Archambault et al. | |
| 2012/0242142 | A1 | 9/2012 | Kautsch | |
| 2021/0291916 | A1 | 9/2021 | Kautsch et al. | |

OTHER PUBLICATIONS

Notice of Allowance dated Jul. 14, 2021, in connection with U.S. Appl. No. 16/076,537, 13 pages.

* cited by examiner

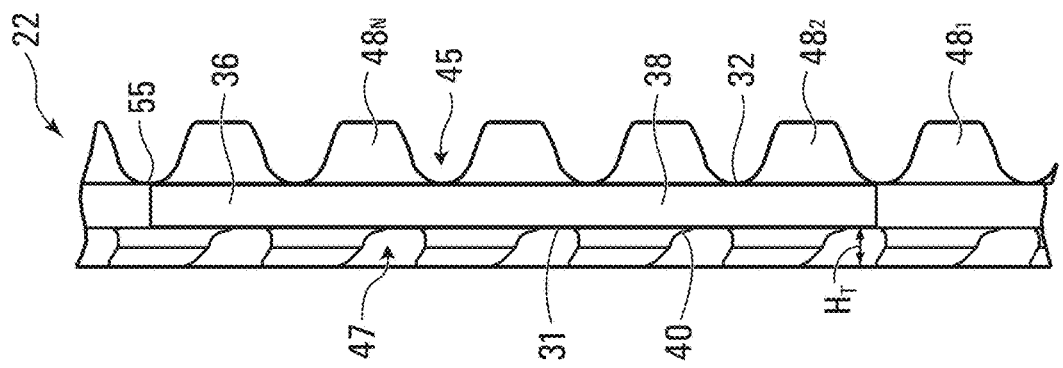
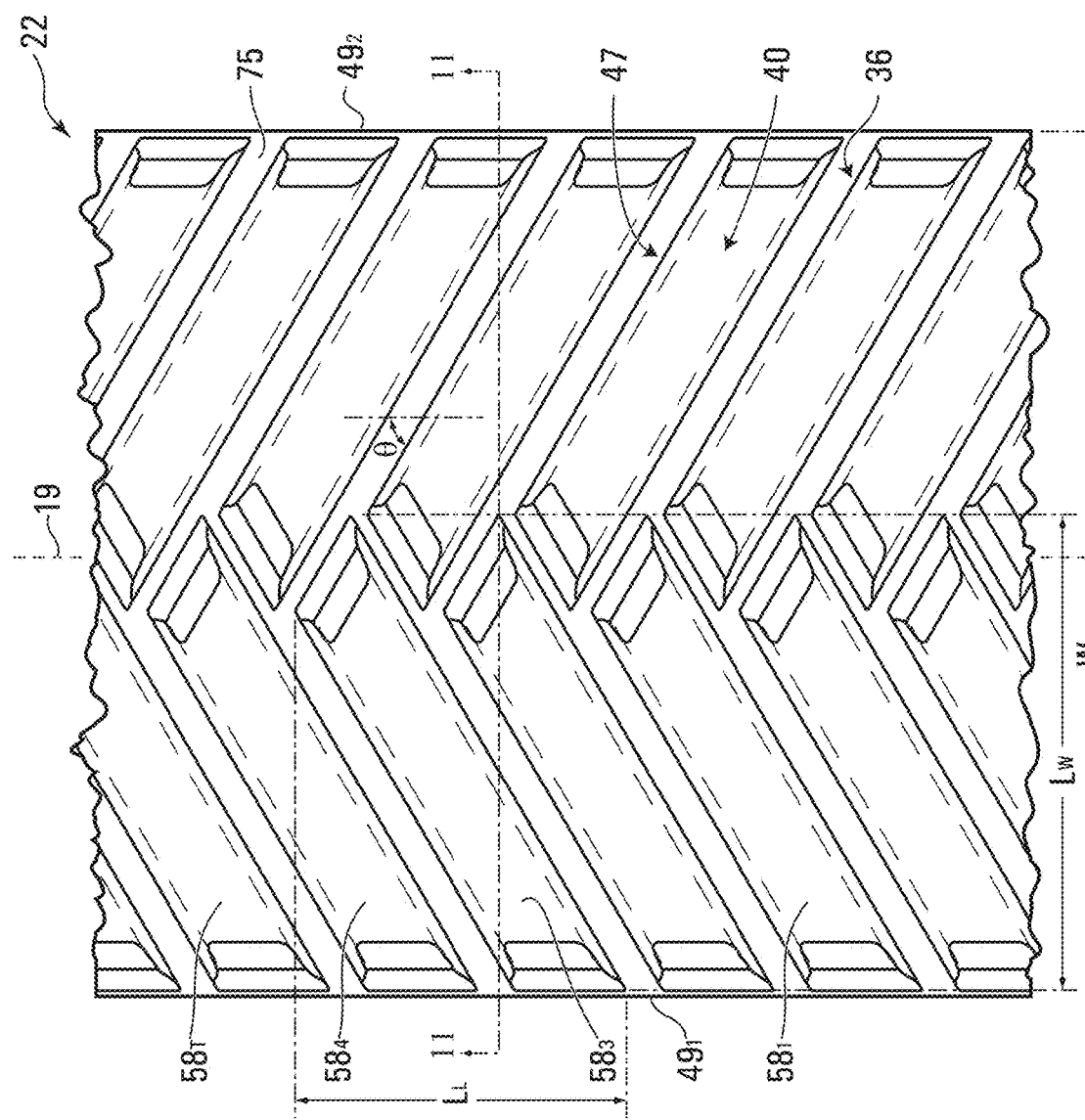

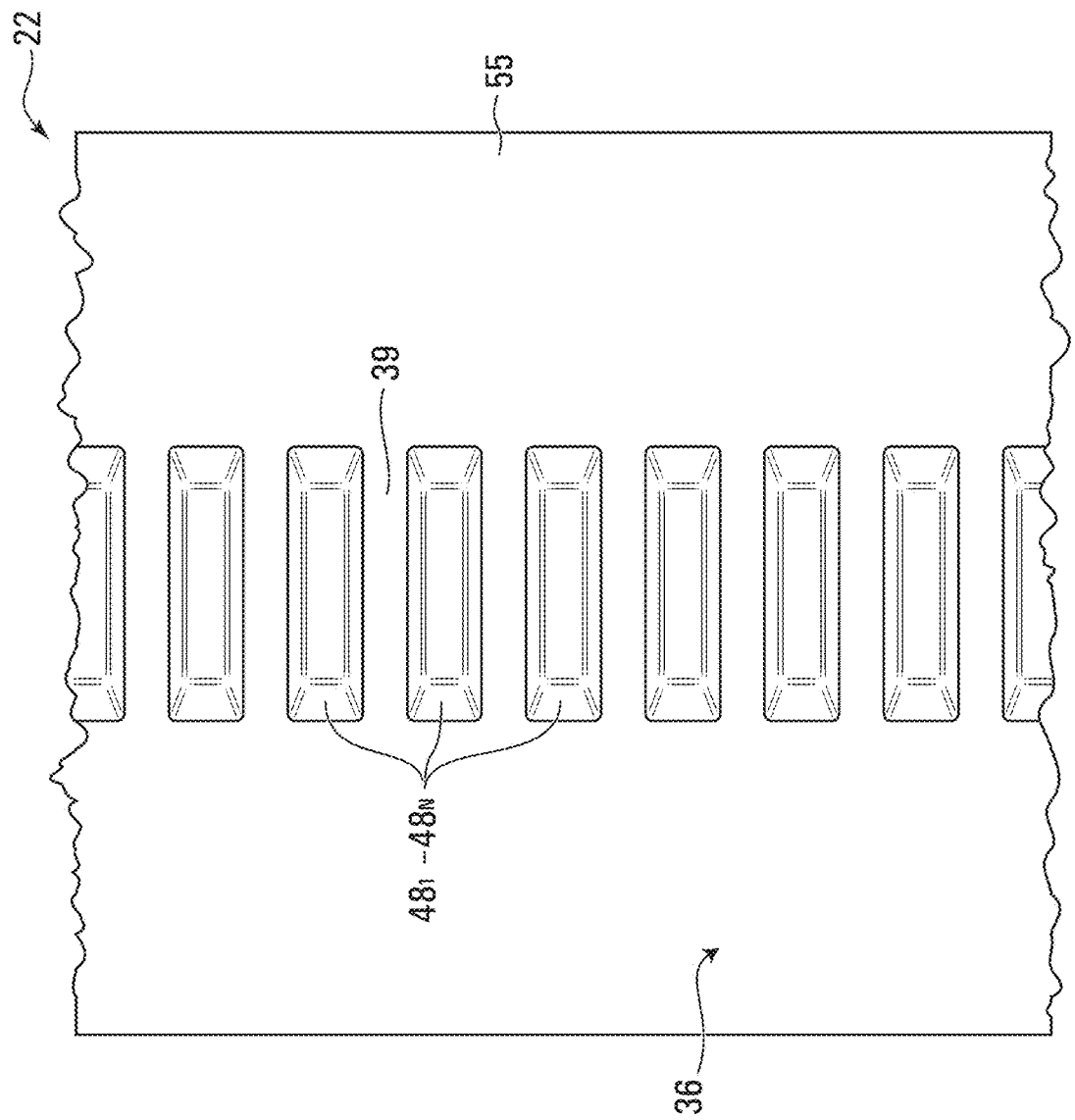

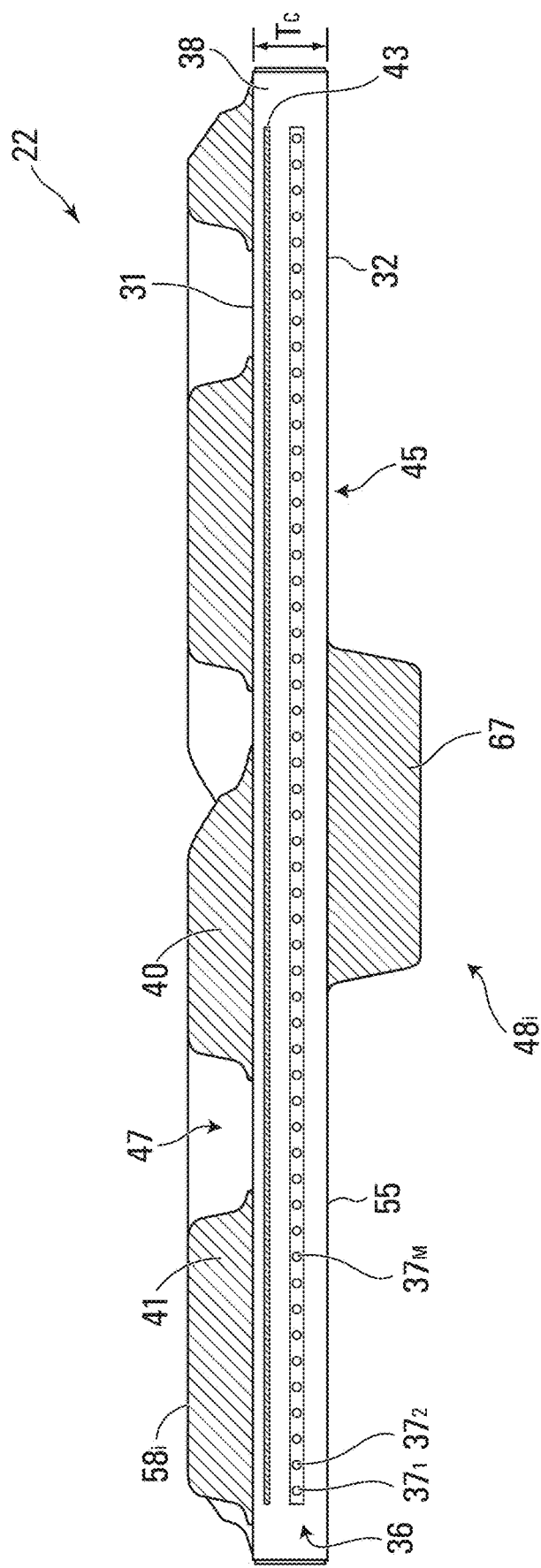

Narrow Tread Setting

Wide Tread Setting

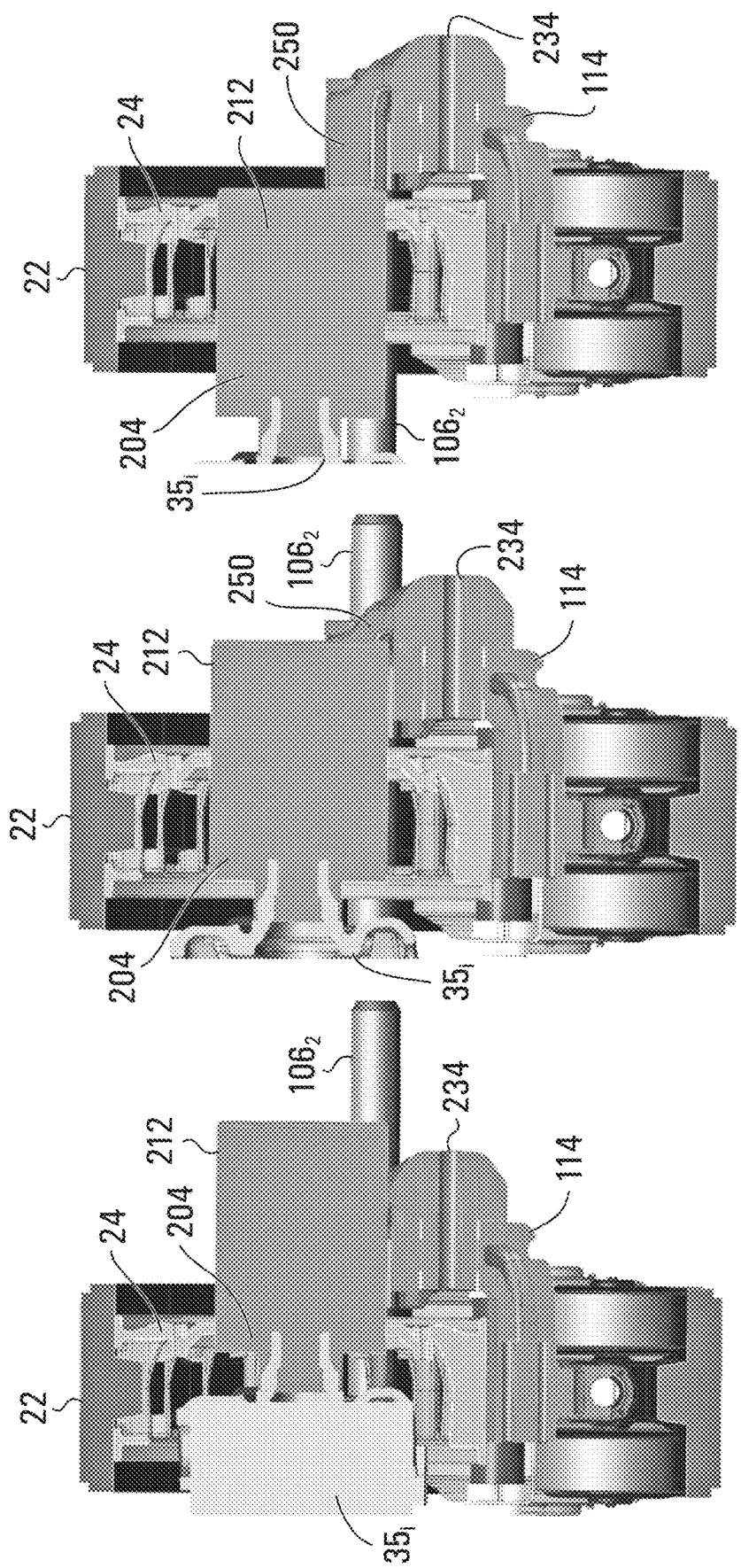

TRACKED VEHICLE WITH ADJUSTABLE TRACK SPACING

CROSS-REFERENCE TO RELATED APPLICATIONS

This application is a continuation of U.S. patent application Ser. No. 16/076,537, filed on Aug. 8, 2018, and issued as U.S. Pat. No. 11,173,971 on Nov. 16, 2021, which is a national stage patent application of International Patent Application No. PCT/US2017/016980 filed on Feb. 8, 2017, which claims priority from U.S. Provisional Patent Applications 62/292,856, 62/328,965 and 62/348,369 respectively filed on Feb. 8, 2016, Apr. 28, 2016 and Jun. 10, 2016. The contents of the aforementioned applications are incorporated by reference herein.

FIELD

The invention relates generally to off-road vehicles comprising track systems (e.g., agricultural vehicles such as tractors, harvesters, combines, etc.).

BACKGROUND

Agricultural vehicles (e.g., tractors, harvesters, combines, etc.) sometimes comprise track systems (instead of wheels with tires) to enhance their traction and floatation in agricultural fields, which may be soft, slippery, and/or uneven (e.g., soil, mud, etc.).

The agricultural fields on which agricultural vehicles are designed to travel may have different field configurations, such as different configurations of row crops. For example, some agricultural fields may have a "narrow" configuration of row crops (i.e., row crops that are relatively close to one another), while other agricultural fields may have a "wide" configuration of row crops (i.e., row crops that are relatively distant from one another). This may be problematic for an agricultural vehicle since a spacing between laterally-adjacent track systems of the agricultural vehicle may have to vary in order to accommodate such different row crop configurations.

Other off-road vehicles, such as construction vehicles (e.g., loaders, bulldozers, excavators, etc.), forestry vehicles (e.g., feller-bunchers, tree chippers, knuckleboom loaders, etc.) and other industrial vehicles, may be affected by similar considerations in some cases.

For these and other reasons, there is a need to improve vehicles comprising track systems.

SUMMARY

According to various aspects of the invention, there are provided track systems for traction of a vehicle in which a spacing of laterally-adjacent ones of the track systems in a widthwise direction of the vehicle is adjustable. This may facilitate use of the vehicle in different conditions (e.g., in different field configurations, such as in different configurations of row crops, where the vehicle is an agricultural vehicle). For instance, the spacing of the laterally-adjacent ones of the track systems may be adjustable while the laterally-adjacent ones of the track systems are connected to a powertrain of the vehicle and/or without requiring use of additional parts (e.g. spacers).

For example, according to an aspect of the invention, there is provided a track system of a plurality of track systems for traction of a vehicle. The vehicle comprises a frame and a powertrain. The track system is mountable on a first side of the vehicle. A laterally-adjacent one of the track systems is mountable on a second side of the vehicle. The track system comprises a track and a track-engaging assembly for driving and guiding the track around the track-engaging assembly. The track-engaging assembly comprises a drive wheel for driving the track when an axle of the vehicle rotates, a plurality of idler wheels for guiding the track, and a frame supporting the idler wheels. The plurality of idler wheels includes a leading idler wheel and a trailing idler wheel spaced apart in a longitudinal direction of the track system. The plurality of idler wheels also includes a plurality of roller wheels between the leading idler wheel and the trailing idler wheel in the longitudinal direction of the track system. The drive wheel is unsupported by the frame of the track system and is supportable entirely by the axle of the vehicle. A spacing of the track system and the laterally-adjacent one of the track systems in a widthwise direction of the vehicle is adjustable.

According to another aspect of the invention, there is provided a vehicle comprising a frame, a powertrain, and a plurality of track systems for traction of the vehicle. A first one of the track systems is mounted on a first side of the vehicle and a second one of the track systems is mounted on a second side of the vehicle. Each track system comprises a track and a track-engaging assembly for driving and guiding the track around the track-engaging assembly. The track-engaging assembly comprises a drive wheel for driving the track when an axle of the vehicle rotates, a plurality of idler wheels for guiding the track and a frame supporting the idler wheels. The plurality of idler wheels includes a leading idler wheel and a trailing idler wheel spaced apart in a longitudinal direction of the track system. The plurality of idler wheels also includes a plurality of roller wheels between the leading idler wheel and the trailing idler wheel in the longitudinal direction of the track system. The drive wheel is unsupported by the frame of the track system and is supported entirely by the axle of the vehicle. A spacing of the first one of the track systems and the second one of the track systems in a widthwise direction of the vehicle is adjustable.

According to another aspect of the invention, there is provided a track system of a plurality of track systems for traction of a vehicle. The vehicle comprises a frame and a powertrain. The track system is mountable on a first side of the vehicle. A laterally-adjacent one of the track systems is mountable on a second side of the vehicle. The track system comprises a track and a track-engaging assembly for driving and guiding the track around the track-engaging assembly. The track-engaging assembly comprises a drive wheel for driving the track when an axle of the vehicle rotates, a plurality of idler wheels for guiding the track, and a frame supporting the idler wheels. The plurality of idler wheels includes a leading idler wheel and a trailing idler wheel spaced apart in a longitudinal direction of the track system. The plurality of idler wheels also includes a plurality of roller wheels between the leading idler wheel and the trailing idler wheel in the longitudinal direction of the track system. The drive wheel is supportable by a transmission mountable between the drive wheel and the axle of the vehicle. The transmission comprises planetary gearing. A spacing of the track system and the laterally-adjacent one of the track systems in a widthwise direction of the vehicle is adjustable. The transmission remains fixed in the widthwise direction of the vehicle while the spacing of the track system and the laterally-adjacent one of the track systems in the widthwise direction of the vehicle is adjusted.

According to another aspect of the invention, there is provided a vehicle. The vehicle comprises a frame, a powertrain, and a plurality of track systems for traction of the vehicle. A first one of the track systems is mounted on a first side of the vehicle and a second one of the track systems is mounted on a second side of the vehicle. Each track system comprises a track and a track-engaging assembly for driving and guiding the track around the track-engaging assembly. The track-engaging assembly comprises a drive wheel for driving the track when an axle of the vehicle rotates, a plurality of idler wheels for guiding the track, and a frame supporting the idler wheels. The plurality of idler wheels includes a leading idler wheel and a trailing idler wheel spaced apart in a longitudinal direction of the track system. The plurality of idler wheels also includes a plurality of roller wheels between the leading idler wheel and the trailing idler wheel in the longitudinal direction of the track system. The drive wheel is supportable by a transmission mountable between the drive wheel and the axle of the vehicle. The transmission comprises planetary gearing. A spacing of the first one of the track systems and the second one of the track systems in a widthwise direction of the vehicle is adjustable. The transmission remains fixed in the widthwise direction of the vehicle while the spacing of the first one of the track systems and the second one of the track systems in the widthwise direction of the vehicle is adjusted.

According to another aspect of the invention, there is provided a track system of a plurality of track systems for traction of a vehicle. The vehicle comprises a frame and a powertrain. The track system is mountable on a first side of the vehicle. A laterally-adjacent one of the track systems is mountable on a second side of the vehicle. The track system comprises a track and a track-engaging assembly for driving and guiding the track around the track-engaging assembly. The track-engaging assembly comprises a drive wheel for driving the track when an axle of the vehicle rotates, a plurality of idler wheels for guiding the track, and a frame supporting the idler wheels. The plurality of idler wheels includes a leading idler wheel and a trailing idler wheel spaced apart in a longitudinal direction of the track system. The plurality of idler wheels also includes a plurality of roller wheels between the leading idler wheel and the trailing idler wheel in the longitudinal direction of the track system. The drive wheel is supportable by a transmission mountable between the drive wheel and the axle of the vehicle. A spacing of the track system and the laterally-adjacent one of the track systems in a widthwise direction of the vehicle is adjustable. The transmission remains fixed in the widthwise direction of the vehicle while the spacing of the track system and the laterally-adjacent one of the track systems in the widthwise direction of the vehicle is adjusted.

According to another aspect of the invention, there is provided a vehicle. The vehicle comprises a frame, a powertrain, and a plurality of track systems for traction of the vehicle. A first one of the track systems is mounted on a first side of the vehicle and a second one of the track systems is mounted on a second side of the vehicle. Each track system comprises a track and a track-engaging assembly for driving and guiding the track around the track-engaging assembly. The track-engaging assembly comprises a drive wheel for driving the track when an axle of the vehicle rotates, a plurality of idler wheels for guiding the track, and a frame supporting the idler wheels. The plurality of idler wheels includes a leading idler wheel and a trailing idler wheel spaced apart in a longitudinal direction of the track system. The plurality of idler wheels also includes a plurality of roller wheels between the leading idler wheel and the trailing idler wheel in the longitudinal direction of the track system. The drive wheel is supportable by a transmission mountable between the drive wheel and the axle of the vehicle. A spacing of the first one of the track systems and the second one of the track systems in a widthwise direction of the vehicle is adjustable. The transmission remains fixed in the widthwise direction of the vehicle while the spacing of the first one of the track systems and the second one of the track systems in the widthwise direction of the vehicle is adjusted.

According to another aspect of the invention, there is provided a track system of a plurality of track systems for traction of a vehicle. The vehicle comprises a frame and a powertrain. The track system is mountable on a first side of the vehicle. A laterally-adjacent one of the track systems is mountable on a second side of the vehicle. The track system comprises a track and a track-engaging assembly for driving and guiding the track around the track-engaging assembly. The track-engaging assembly comprises a drive wheel for driving the track when an axle of the vehicle rotates, a plurality of idler wheels for guiding the track, and a frame supporting the idler wheels. The plurality of idler wheels includes a leading idler wheel and a trailing idler wheel spaced apart in a longitudinal direction of the track system. The plurality of idler wheels also includes a plurality of roller wheels between the leading idler wheel and the trailing idler wheel in the longitudinal direction of the track system. The track-engaging assembly also comprises a wheel carrier carrying respective ones of the roller wheels and configured to allow the respective ones of the roller wheels to rotate relative to the frame of the track system about an axis transversal to axes of rotation of the respective ones of the roller wheels. A spacing of the track system and the laterally-adjacent one of the track systems in a widthwise direction of the vehicle is adjustable.

According to another aspect of the invention, there is provided a vehicle. The vehicle comprises a frame, a powertrain, and a plurality of track systems for traction of the vehicle. A first one of the track systems is mounted on a first side of the vehicle and a second one of the track systems is mounted on a second side of the vehicle. Each track system comprises a track and a track-engaging assembly for driving and guiding the track around the track-engaging assembly. The track-engaging assembly comprises a drive wheel for driving the track when an axle of the vehicle rotates, a plurality of idler wheels for guiding the track, and a frame supporting the idler wheels. The plurality of idler wheels includes a leading idler wheel and a trailing idler wheel spaced apart in a longitudinal direction of the track system. The plurality of idler wheels also includes a plurality of roller wheels between the leading idler wheel and the trailing idler wheel in the longitudinal direction of the track system. The track-engaging assembly also comprises a wheel carrier carrying respective ones of the roller wheels and configured to allow the respective ones of the roller wheels to rotate relative to the frame of the track system about an axis transversal to axes of rotation of the respective ones of the roller wheels. A spacing of the first one of the track systems and the second one of the track systems in a widthwise direction of the vehicle is adjustable.

According to another aspect of the invention, there is provided a track system of a plurality of track systems for traction of a vehicle. The vehicle comprises a frame and a powertrain. The track system is mountable on a first side of the vehicle. A laterally-adjacent one of the track systems is mountable on a second side of the vehicle. The track system comprises a track and a track-engaging assembly for driving and guiding the track around the track-engaging assembly. The track-engaging assembly comprises a drive wheel for driving the track when an axle of the vehicle rotates, a plurality of idler wheels for guiding the track, and a frame supporting the idler wheels. The plurality of idler wheels includes a leading idler wheel and a trailing idler wheel spaced apart in a longitudinal direction of the track system. The plurality of idler wheels also includes a plurality of roller wheels between the leading idler wheel and the trailing idler wheel in the longitudinal direction of the track system. A given one of the roller wheels is rotatable relative to the frame of the track system about an axis transversal to an axis of rotation of the given one of the roller wheels. A spacing of the track system and the laterally-adjacent one of the track systems in a widthwise direction of the vehicle is adjustable.

According to another aspect of the invention, there is provided a vehicle. The vehicle comprises a frame, a powertrain, and a plurality of track systems for traction of the vehicle. A first one of the track systems is mounted on a first side of the vehicle and a second one of the track systems is mounted on a second side of the vehicle. Each track system comprises a track and a track-engaging assembly for driving and guiding the track around the track-engaging assembly. The track-engaging assembly comprises a drive wheel for driving the track when an axle of the vehicle rotates, a plurality of idler wheels for guiding the track, and a frame supporting the idler wheels. The plurality of idler wheels includes a leading idler wheel and a trailing idler wheel spaced apart in a longitudinal direction of the track system. The plurality of idler wheels also includes a plurality of roller wheels between the leading idler wheel and the trailing idler wheel in the longitudinal direction of the track system. A given one of the roller wheels is rotatable relative to the frame of the track system about an axis transversal to an axis of rotation of the given one of the roller wheels. A spacing of the first one of the track systems and the second one of the track systems in a widthwise direction of the vehicle is adjustable.

According to another aspect of the invention, there is provided a track system of a plurality of track systems for traction of a vehicle. The vehicle comprises a frame and a powertrain. The track system is mountable on a first side of the vehicle. A laterally-adjacent one of the track systems is mountable on a second side of the vehicle. The track system comprises a track and a track-engaging assembly for driving and guiding the track around the track-engaging assembly. The track-engaging assembly comprises a drive wheel for driving the track when an axle of the vehicle rotates and a plurality of idler wheels for guiding the track. The plurality of idler wheels includes a leading idler wheel and a trailing idler wheel spaced apart in a longitudinal direction of the track system, and a plurality of roller wheels between the leading idler wheel and the trailing idler wheel in the longitudinal direction of the track system. The track-engaging assembly also comprises a frame supporting the idler wheels. The track system also comprises a movable joint allowing the frame of the track system to move relative to the frame of the vehicle when travelling on an uneven terrain. The movable joint is located inboard of the drive wheel. A spacing of the track system and the laterally-adjacent one of the track system in a widthwise direction of the vehicle is adjustable.

According to another aspect of the invention, there is provided a vehicle. The vehicle comprises a frame, a powertrain, and a plurality of track systems for traction of the vehicle. A first one of the track systems is mounted on a first side of the vehicle and a second one of the track systems is mounted on a second side of the vehicle. Each track system comprises a track and a track-engaging assembly for driving and guiding the track around the track-engaging assembly. The track-engaging assembly comprises a drive wheel for driving the track when an axle of the vehicle rotates, a plurality of idler wheels for guiding the track, and a frame supporting the idler wheels. The plurality of idler wheels includes a leading idler wheel and a trailing idler wheel spaced apart in a longitudinal direction of the track system. The plurality of idler wheels also includes a plurality of roller wheels between the leading idler wheel and the trailing idler wheel in the longitudinal direction of the track system. The track system also comprises a movable joint allowing the frame of the track system to move relative to the frame of the vehicle when travelling on an uneven terrain. The movable joint is located inboard of the drive wheel. A spacing of the first one of the track systems and the second one of the track systems in a widthwise direction of the vehicle is adjustable.

According to another aspect of the invention, there is provided a track system of a plurality of track systems for traction of a vehicle. The vehicle comprises a frame and a powertrain. The track system comprises a track and a track-engaging assembly for driving and guiding the track around the track-engaging assembly. The track-engaging assembly comprises a drive wheel for driving the track when an axle of the vehicle rotates, and a plurality of idler wheels for guiding the track. The plurality of idler wheels includes a leading idler wheel and a trailing idler wheel spaced apart in a longitudinal direction of the track system, and a plurality of roller wheels between the leading idler wheel and the trailing idler wheel in the longitudinal direction of the track system. The track-engaging assembly also comprises a frame supporting the idler wheels. The track system comprises a movable joint allowing the frame of the track system to move relative to the frame of the vehicle when travelling on an uneven ground area. The movable joint is located inboard of the drive wheel.

According to another aspect of the invention, there is provided a vehicle. The vehicle comprises a frame, a powertrain, and a plurality of track systems for traction of the vehicle. A first one of the track systems is mounted on a first side of the vehicle and a second one of the track systems is mounted on a second side of the vehicle. Each track system comprises a track and a track-engaging assembly for driving and guiding the track around the track-engaging assembly. The track-engaging assembly comprises a drive wheel for driving the track when an axle of the vehicle rotates, a plurality of idler wheels for guiding the track, and a frame supporting the idler wheels. The plurality of idler wheels includes a leading idler wheel and a trailing idler wheel spaced apart in a longitudinal direction of the track system. The plurality of idler wheels also includes a plurality of roller wheels between the leading idler wheel and the trailing idler wheel in the longitudinal direction of the track system. The track system also comprises a movable joint allowing the frame of the track system to move relative to the frame of the vehicle when travelling on an uneven terrain. The movable joint is located inboard of the drive wheel.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIG. 8 shows a plan view of a track of the front or rear track system;

FIG. 9 shows a side elevational view of the track;

FIG. 10 shows a plan view of an inner side of the track;

FIG. 11 shows a cross-sectional view of the track;

FIGS. 40 to 42 show cross-sectional views of the track system of FIG. 35 when adjusted at different positions relative to the transmission;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
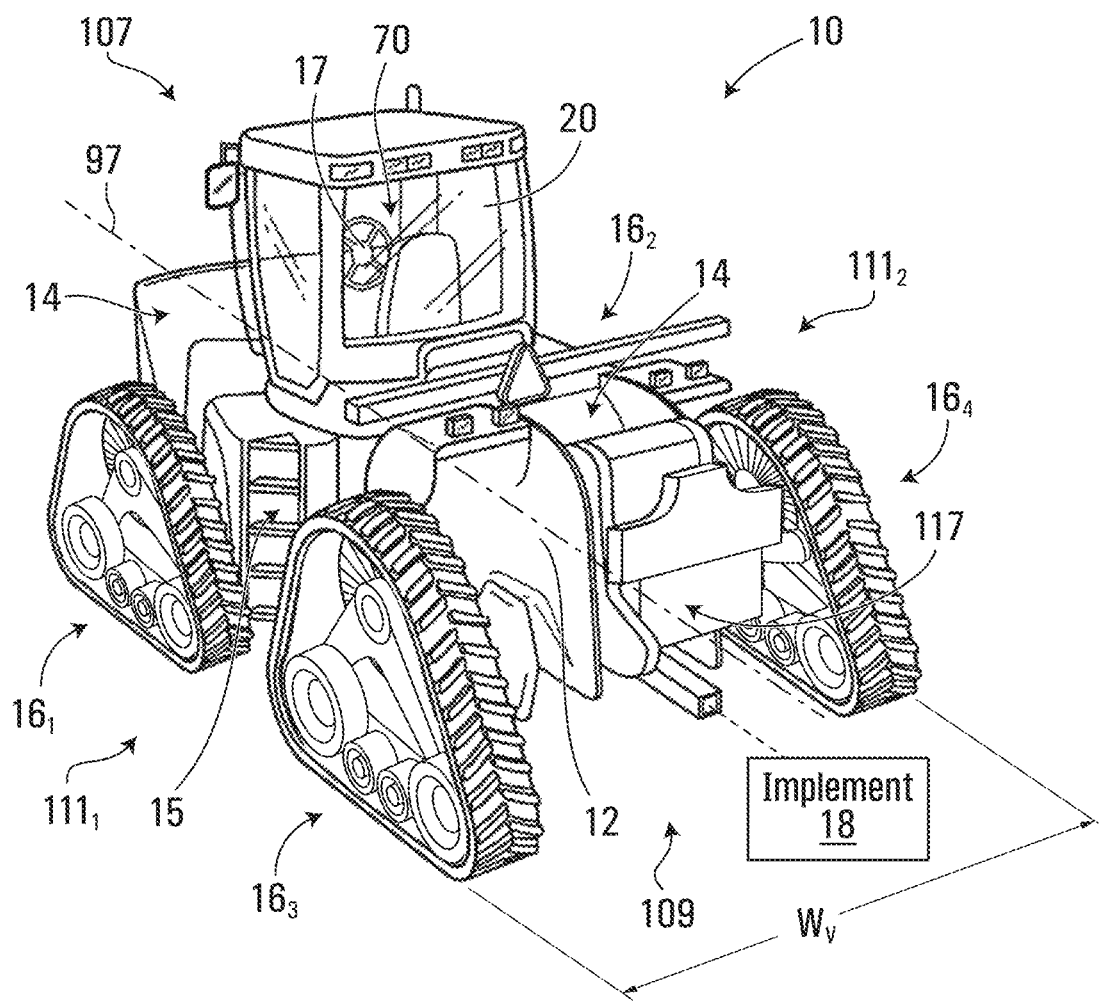
FIG. 1 shows an example of an agricultural vehicle comprising track systems in accordance with an embodiment of the invention.

FIG. 1 shows an example of an agricultural vehicle 10 in accordance with an embodiment of the invention. In this embodiment, the agricultural vehicle 10 is a tractor. In other embodiments, the agricultural vehicle 10 may be a combine harvester, another type of harvester, or any other type of agricultural vehicle.

The agricultural vehicle 10 comprises a frame 12, a powertrain 15, a steering system 17, a plurality of track systems $16_1$-$16_4$ (which can be referred to as "undercarriages"), and an operator cabin 20 that enable an operator to move the agricultural vehicle 10 on the ground. The vehicle 10 can travel in an agricultural field to perform agricultural work using a work implement 18. The vehicle 10 can also be "roading", i.e., travelling on a road (i.e., a paved road having a hard surface of asphalt, concrete, gravel, or other pavement), such as between agricultural fields. The agricultural vehicle 10 has a front 107 and a rear 109 that define a longitudinal direction of the vehicle 10, left and right sides $111_1$, $111_2$ that define a widthwise direction of the vehicle 10, and a height direction that is perpendicular to its longitudinal direction and its widthwise direction.

Figure 2:
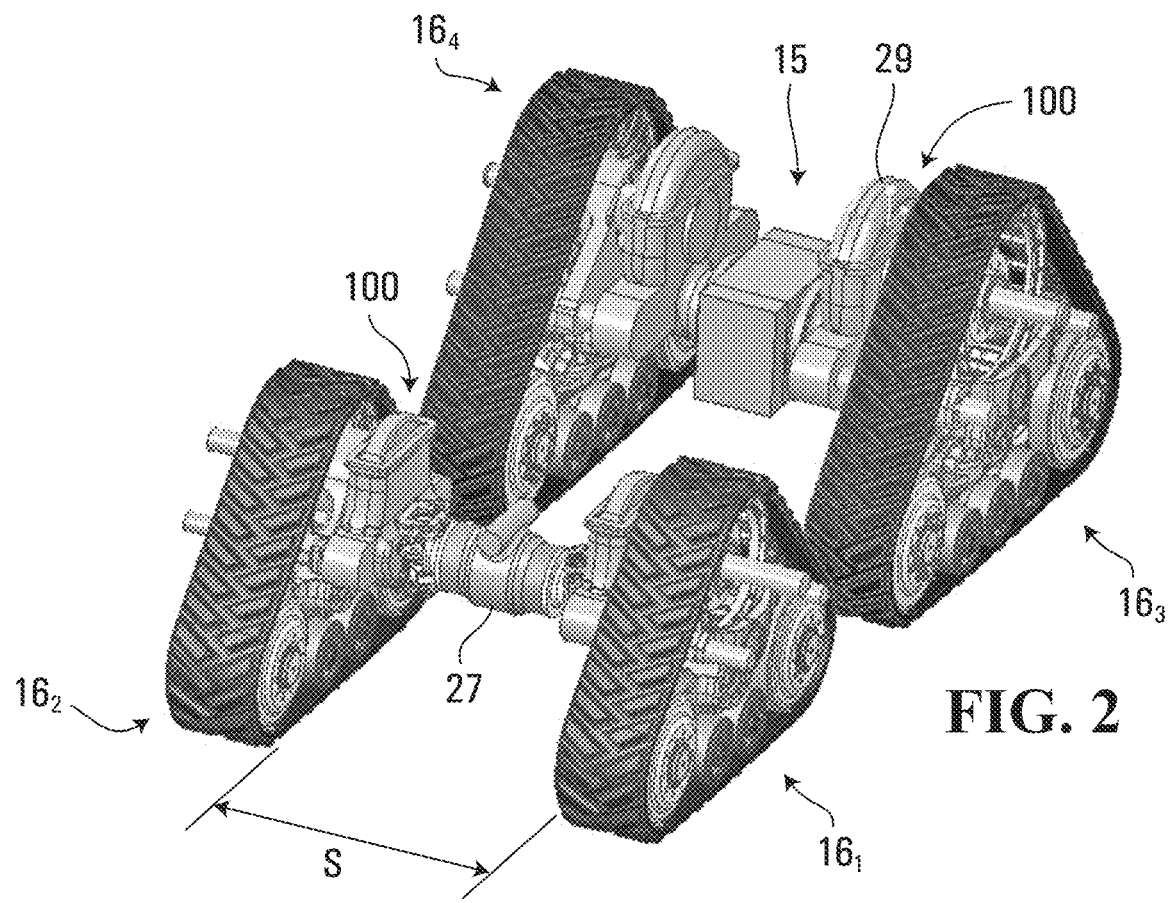
FIG. 2 shows a perspective view of a powertrain of the agricultural vehicle as connected to respective ones of the track systems, whereby a spacing of laterally-adjacent ones of the track systems is in a narrow tread setting.
Figure 3:
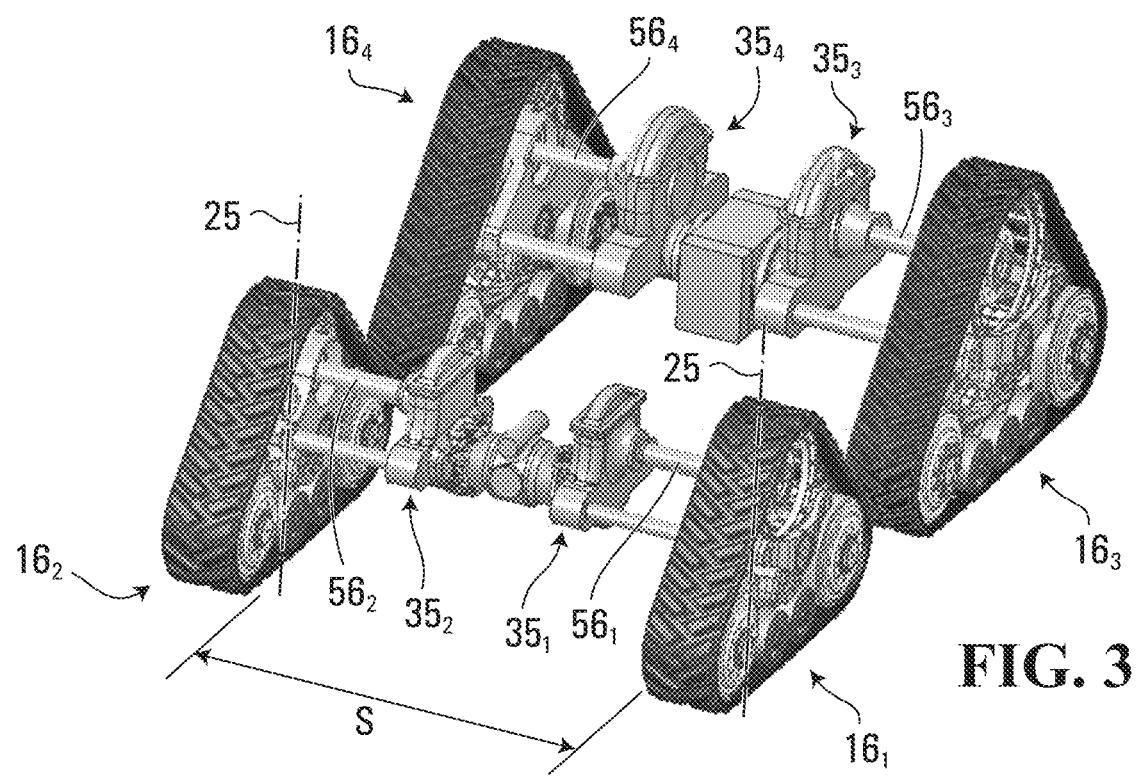
FIG. 3 shows a perspective view of the powertrain of the agricultural vehicle as connected to respective ones of the track systems, whereby the spacing of laterally-adjacent one of the track systems is in a wide tread setting.

As will be further discussed later, in this embodiment, a spacing S of laterally-adjacent ones of the track systems $16_1$-$16_4$ of the agricultural vehicle 10 in the widthwise direction of the vehicle 10, such as the spacing S of the track systems $16_1$, $16_2$ in the front 107 of the agricultural vehicle 10 and/or the spacing S of the track systems $16_3$, $16_4$ in the rear 109 of the vehicle 10, is adjustable so as to facilitate use of the agricultural vehicle 10 in different field configurations, such as in different configurations of row crops (e.g., different "tread settings" for different field configurations). Notably, in this embodiment, as shown in FIGS. 2 and 3, the spacing S of the laterally-adjacent ones of the track systems $16_1$-$16_4$ of the agricultural vehicle 10 is adjustable while the laterally-adjacent ones of the track systems $16_1$-$16_4$ of the agricultural vehicle 10 are connected to the powertrain 15 and/or without requiring use of additional parts (e.g. spacers).

The powertrain 15 is configured for generating motive power and transmitting motive power to the track systems $16_1$-$16_4$ to propel the agricultural vehicle 10 on the ground. To that end, the powertrain 15 comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor).

The prime mover 14 is in a driving relationship with the track systems $16_1$-$16_4$. That is, the powertrain 15 transmits motive power generated by the prime mover 14 to one or more of the track systems $16_1$-$16_4$ in order to drive (i.e., impart motion to) these one or more of the track systems $16_1$-$16_4$. The powertrain 15 may transmit power from the prime mover 14 to the track systems $16_1$-$16_4$ in any suitable way. In this embodiment, the powertrain 15 comprises a front differential 27, a rear differential 29, and final drive units $35_1$-$35_4$ including final drive axles $56_1$-$56_4$ between the prime mover 14 and the track systems $16_1$-$16_4$ for transmitting motive power from the prime mover 14 to the track systems $16_1$-$16_4$. An automatic transmission (e.g., a continuously variable transmission (CVT)) or any other suitable type of transmission may be used.

The work implement 18 is used to perform agricultural work. For example, in some embodiments, the work implement 18 may be a combine head, a cutter, a scraper pan, a tool bar, a planter, or any other type of agricultural work implement.

The operator cabin 20 is where the operator sits and controls the agricultural vehicle 10. More particularly, the operator cabin 20 comprises a user interlace 70 including a set of controls that allow the operator to steer the agricultural vehicle 10 on the ground and operate the work implement 18. For example, in this embodiment, the user interlace 70 comprises an accelerator, a brake control, and a steering device that are operable by the operator to control motion of the agricultural vehicle 10 on the ground and operation of the work implement 18. The user interlace 70 also comprises an instrument panel (e.g., a dashboard) which provides indicators (e.g., a speedometer indicator, a tachometer indicator, etc.) to convey information to the operator.

Figure 4:
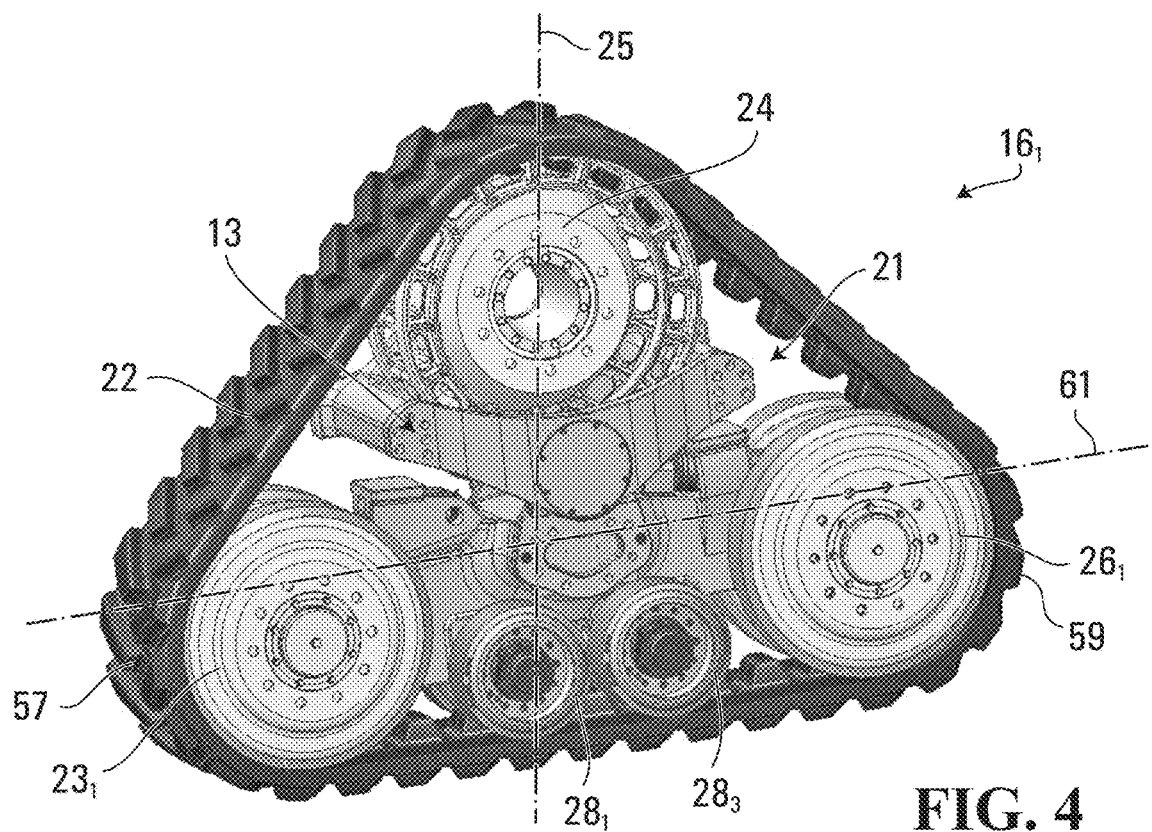
FIG. 4 shows a perspective view of a front one of the track systems.
Figure 5:
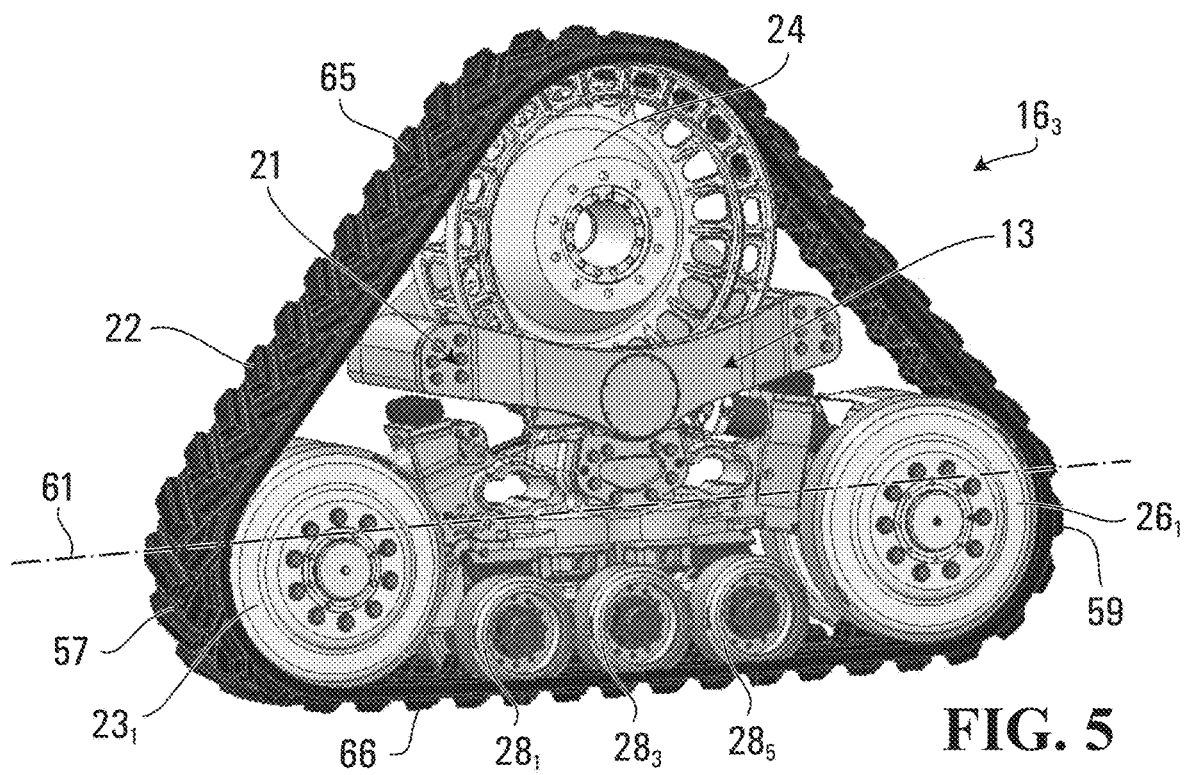
FIG. 5 shows a perspective view of a rear one of the track systems.
Figure 6:
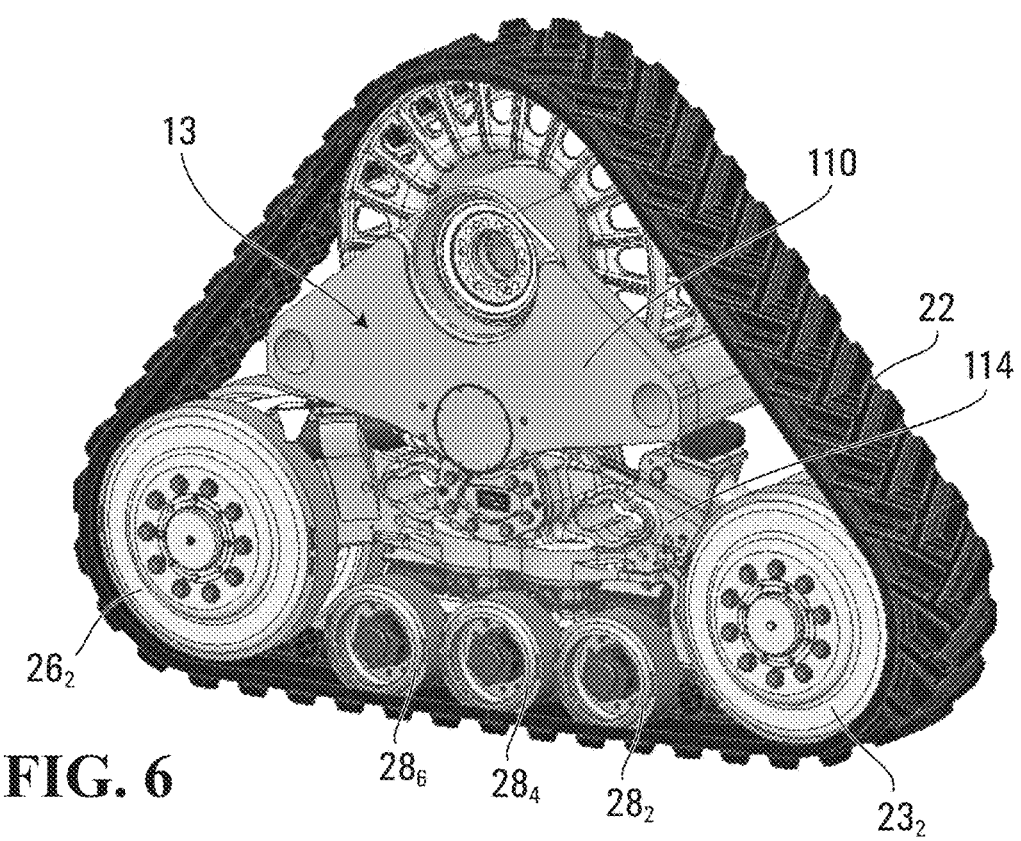
FIG. 6 shows another perspective view of the track system of FIG. 5.
Figure 7:
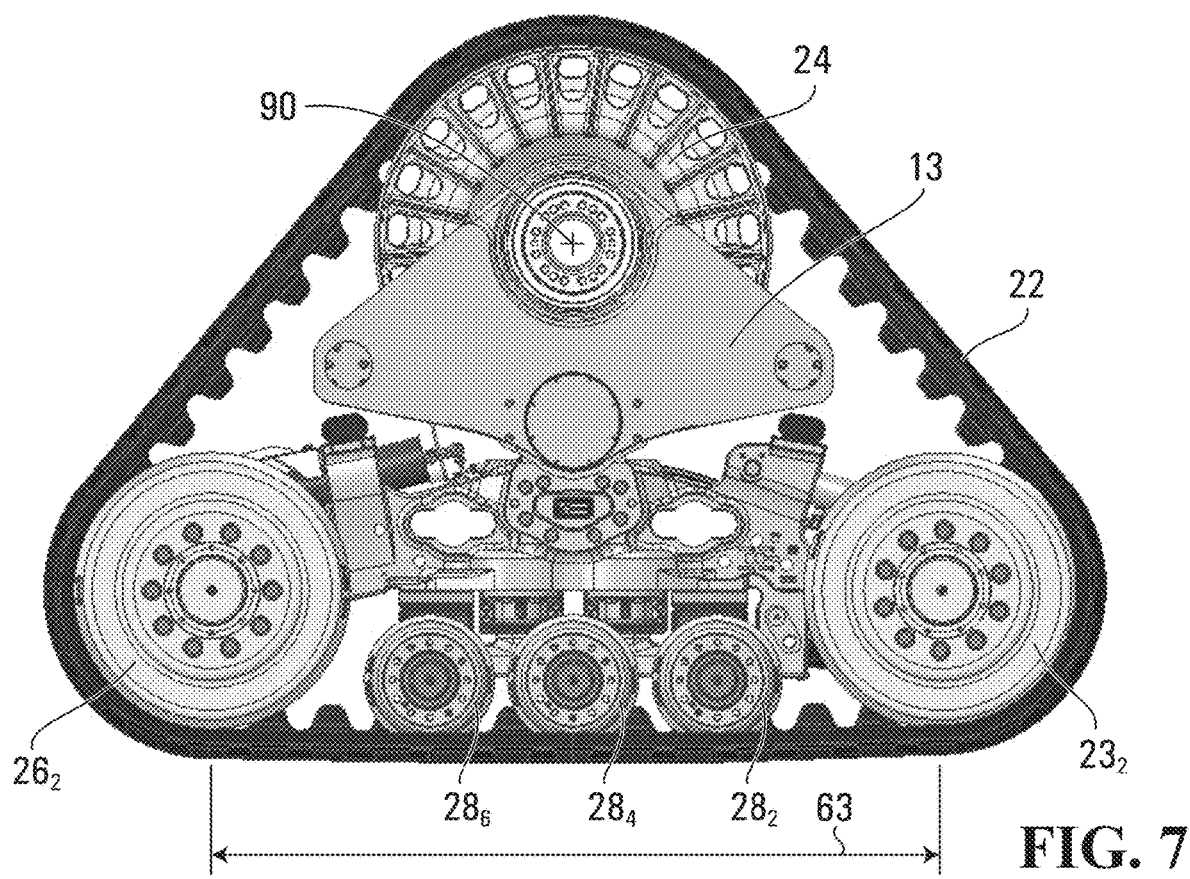
FIG. 7 shows a side view of the track system of FIG. 5.

The track systems $16_1$-$16_4$ engage the ground to propel the agricultural vehicle 10. Respective ones of the track systems $16_1$-$16_4$ are located on the left and right sides $111_1$, $111_2$ of the vehicle 10. With additional reference to FIGS. 4 and 5, which depict the front track system $16_1$ and the rear track system $16_3$ respectively, each track system $16_i$ comprises a track-engaging assembly 21 and a track 22 disposed around the track-engaging assembly 21. In this embodiment, the track-engaging assembly 21 comprises a plurality of wheels which, in this example, includes a drive wheel 24 and a plurality of idler wheels that includes front (i.e., leading) idler wheels $23_1$, $23_2$, rear (i.e., trailing) idler wheels $26_1$, $26_2$, and roller wheels $28_1$-$28_R$ (i.e., the roller wheels $28_1$-$28_4$ in the case of the track systems $16_1$, $16_2$ and the roller wheels $28_1$-$28_6$ in the case of the rear track systems $16_3$, $16_4$). The track system $16_i$ also comprises a frame 13 which supports various components of the track system $16_i$, including the idler wheels $23_1$, $23_2$, $26_1$, $26_2$, $28_1$-$28_R$. The track system $16_i$ has a longitudinal direction and a first longitudinal end 57 and a second longitudinal end 59 that define a length $L_T$ of the track system $16_i$ along a longitudinal axis 61 that defines the longitudinal direction of the track system $16_i$. The track system $16_i$ has a widthwise direction and a width that is defined by a width W of the track 22. The track system $16_i$ also has a height direction that is normal to its longitudinal direction and its widthwise direction.

Each of the front ones of the track systems $16_1$-$16_4$ is steerable by the steering system 17 of the agricultural vehicle 10 in response to input of the user at the steering device to change an orientation of that track system relative to the frame 12 of the agricultural vehicle 10 in order to steer the agricultural vehicle 10 on the ground. To that end, each of the front ones of the track systems $16_1$-$16_4$ is pivotable about a steering axis 25 of the agricultural vehicle 10. An orientation of the longitudinal axis 61 of each of the front ones of the track systems $16_1$-$16_4$ is thus changeable relative to a longitudinal axis 97 of the agricultural vehicle 10.

The track 22 engages the ground to provide traction to the agricultural vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 8 to 11, the track 22 comprises an inner side 45, a ground-engaging outer side 47, and lateral edges $49_1$, $49_2$. The inner side 45 faces the wheels $23_1$, $23_2$, 24, $26_1$, $26_2$, $28_1$-$28_R$, while the ground-engaging outer side 47 engages the ground. A top run 65 of the track 22 extends between the longitudinal ends 57, 59 of the track system $16_i$ and over the wheels $23_1$, $23_2$, 24, $26_1$, $26_2$, $28_1$-$28_R$, while a bottom run 66 of the track 22 extends between the longitudinal ends 57, 59 of the track system $16_i$ and under the wheels $23_1$, $23_2$, 24, $26_1$, $26_2$, $28_1$-$28_R$. The bottom run 66 of the track 22 defines an area of contact 63 of the track 22 with the ground which generates traction and bears a majority of a load on the track system $16_i$, and which will be referred to as a "contact patch" of the track 22 with the ground. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thickness direction normal to its longitudinal and widthwise directions.

In this embodiment, the track 22 is relatively narrow. For instance, this may be helpful to allow the track 22 to fit between rows of crops such as to leave the crops undisturbed when the agricultural vehicle 10 traverses an agricultural field. In turn, this may allow the agricultural field to have a greater crop density. For instance, in some embodiments, a ratio of a width $W_v$ of the agricultural vehicle 10 (measured between laterally-outwardmost ones of the track systems $16_1$-$16_4$) over the width W of the track 22 may be at least 5, in some cases at least 7, in some cases at least 10, in some cases at least 12, and in some cases even more. For example, in some embodiments, the width W of the track 22 may be no more than 30 inches, in some cases no more than 25 inches, in some cases no more than 20 inches, in some cases no more than 18 inches, in some cases no more than 16 inches, and in some cases even less (e.g., 14.5 inches). The width W of the track 22 may have any other suitable value in other embodiments.

The track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21.

In this embodiment, the carcass 36 comprises a plurality of reinforcements embedded in its elastomeric material 38. These reinforcements can take on various forms.

For example, in this embodiment, the carcass 36 comprises a layer of reinforcing cables $37_1$-$37_M$ that are adjacent to one another and extend generally in the longitudinal direction of the track 22 to enhance strength in tension of the track 22 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the rubber 38 is cured. For example, in this embodiment, a mold may be used to consolidate layers of rubber providing the rubber 38 of the carcass 36, the reinforcing cables $37_1$-$37_M$ and the layer of reinforcing fabric 43.

The inner side 45 of the endless track 22 comprises an inner surface 55 of the carcass 36 and a plurality of wheel-contacting projections $48_1$-$48_N$ that project from the inner surface 55 and are positioned to contact at least some of the wheels $23_1$, $23_2$, 24, $26_1$, $26_2$, $28_1$-$28_R$ to do at least one of driving (i.e., imparting motion to) the track 22 and guiding the track 22. The wheel-contacting projections $48_1$-$48_N$ can be referred to as "wheel-contacting lugs". Furthermore, since each of them is used to do at least one of driving the track 22 and guiding the track 22, the wheel-contacting lugs $48_1$-$48_N$ can be referred to as "drive/guide projections" or "drive/guide lugs". In some examples of implementation, a drive/guide lug $48_i$ may interact with the drive wheel 24 to drive the track 22, in which case the drive/guide lug $48_i$ is a drive lug. In other examples of implementation, a drive/guide lug $48_i$ may interact with the front and rear idler wheels $23_1$, $23_2$, $26_1$, $26_2$ and/or the roller wheels $28_1$-$28_R$ to guide the track 22 to maintain proper track alignment and prevent de-tracking without being used to drive the track 22, in which case the drive/guide lug $48_i$ is a guide lug. In yet other examples of implementation, a drive/guide lug $48_i$ may both (i) interact with the drive wheel 24 to drive the track and (ii) interact with the idler wheels $23_1$, $23_2$, $26_1$, $26_2$ and/or the roller wheels $28_1$-$28_R$ to guide the track 22 to maintain proper track alignment and prevent de-tracking, in which case the drive/guide lug $48_i$ is both a drive lug and a guide lug.

In this embodiment, the drive/guide lugs $48_1$-$48_N$ interact with the drive wheel 24 in order to cause the track 22 to be driven, and also interact with the idler wheels $23_1$, $23_2$, $26_1$, $26_2$ and the roller wheels $28_1$-$28_R$ in order to guide the track 22 as it is driven by the drive wheel 24 to maintain proper track alignment and prevent de-tracking. The drive/guide lugs $48_1$-$48_N$ are thus used to both drive the track 22 and guide the track 22 in this embodiment.

In this example of implementation, the drive/guide lugs $48_1$-$48_N$ are arranged in a single row disposed longitudinally along the inner side 45 of the track 22. The drive/guide lugs $48_1$-$48_N$ may be arranged in other manners in other examples of implementation (e.g., in a plurality of rows that are spaced apart along the widthwise direction of the track 22).

In this embodiment, each drive/guide lug $48_i$ is an elastomeric drive/guide lug in that it comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide lug $48_i$. In other embodiments, the elastomeric material 67 may include another elastomer in addition to or instead of rubber (e.g., polyurethane elastomer). The drive/guide lugs $48_1$-$48_N$ may be provided on the inner side 45 in various ways. For example, in this embodiment, the drive/guide lugs $48_1$-$48_N$ are provided on the inner side 45 by being molded with the carcass 36.

The ground-engaging outer side 47 comprises a ground-engaging outer surface 31 of the carcass 36 and a tread pattern 40 to enhance traction on the ground. The tread pattern 40 comprises a plurality of traction projections $58_1$-$58_T$ projecting from the ground-engaging outer surface 31, spaced apart in the longitudinal direction of the endless track 22 and engaging the ground to enhance traction. The traction projections $58_1$-$58_T$ may be referred to as "tread projections" or "traction lugs".

The traction lugs $58_1$-$58_T$ may have any suitable shape. In this embodiment, each of the traction lugs $58_1$-$58_T$ has an elongated shape and is angled, i.e., defines an oblique angle θ (i.e., an angle that is not a right angle or a multiple of a right angle), relative to the longitudinal direction of the track 22. The traction lugs $58_1$-$58_T$ may have various other shapes in other examples (e.g., curved shapes, shapes with straight parts and curved parts, etc.).

Figure 12:
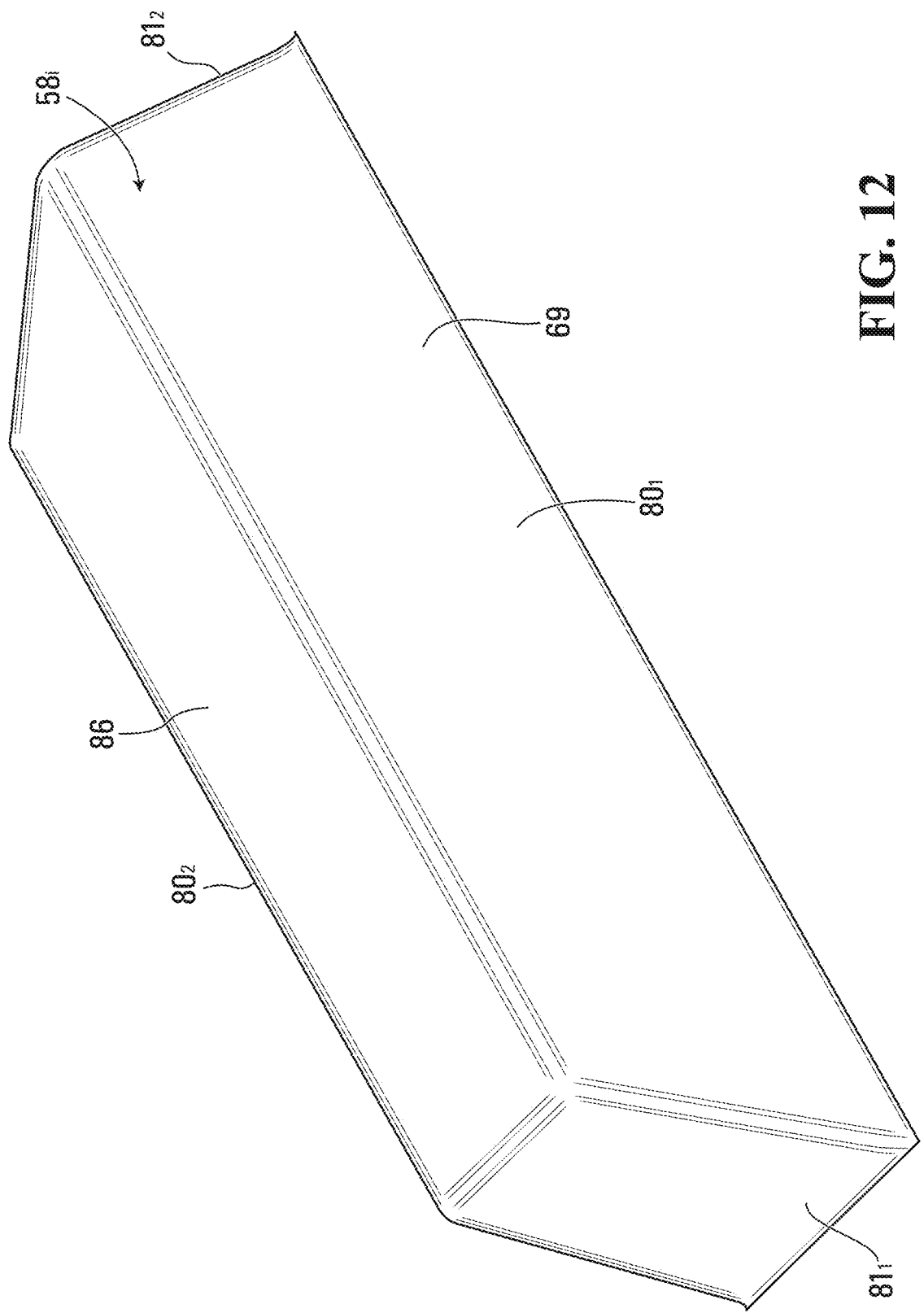
FIG. 12 shows a perspective view of a traction projection of the track.

As shown in FIG. 12, each traction lug $58_i$ has a periphery 69 which includes a front surface $80_1$, a rear surface $80_2$, two lateral surfaces $81_1$, $81_2$, and a top surface 86. The front surface $80_1$ and the rear surface $80_2$ are opposed to one another in the longitudinal direction of the track 22. The two lateral faces $81_1$, $81_2$ are opposed to one another in the widthwise direction of the track 22. In this embodiment, the front surface $80_1$, the rear surface $80_2$, and the lateral surfaces $81_1$, $81_2$ are substantially straight. The periphery 69 of the traction lug $58_i$ may have any other shape in other embodiments (e.g., the front surface $80_1$, the rear surface $80_2$, and/or the lateral surfaces $81_1$, $81_2$ may be curved). The traction lug $58_i$ has a front-to-rear dimension $L_L$ in the longitudinal direction of the track 22, a side-to-side dimension $L_W$ in the widthwise direction of the track 22, and a height H in the thickness direction of the track 22.

In this embodiment, each traction lug $58_i$ is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug $58_i$. In other embodiments, the elastomeric material 41 may include another elastomer in addition to or instead of rubber (e.g., polyurethane elastomer).

The traction lugs $58_1$-$58_T$ may be provided on the ground-engaging outer side 47 in various ways. For example, in this embodiment, the traction lugs $58_1$-$58_T$ are provided on the ground-engaging outer side 47 by being molded with the carcass 36.

The track 22 may be constructed in various other manners in other embodiments. For example, in some embodiments, the track 22 may have recesses or holes that interact with the drive wheel 24 in order to cause the track 22 to be driven (e.g., in which case the drive/guide lugs $48_1$-$48_N$ may be used only to guide the track 22 without being used to drive the track 22, i.e., they may be "guide lugs" only), and/or the ground-engaging outer side 47 of the track 22 may comprise various patterns of traction lugs.

The drive wheel 24 is rotatable by power derived from the prime mover 14 to drive the track 22. That is, power generated by the prime mover 14 and delivered over the powertrain 15 of the agricultural vehicle 10 can rotate a final drive axle $56_i$ of a final drive unit $35_i$, which causes rotation of the drive wheel 24, which in turn imparts motion to the track 22.

Figure 13:
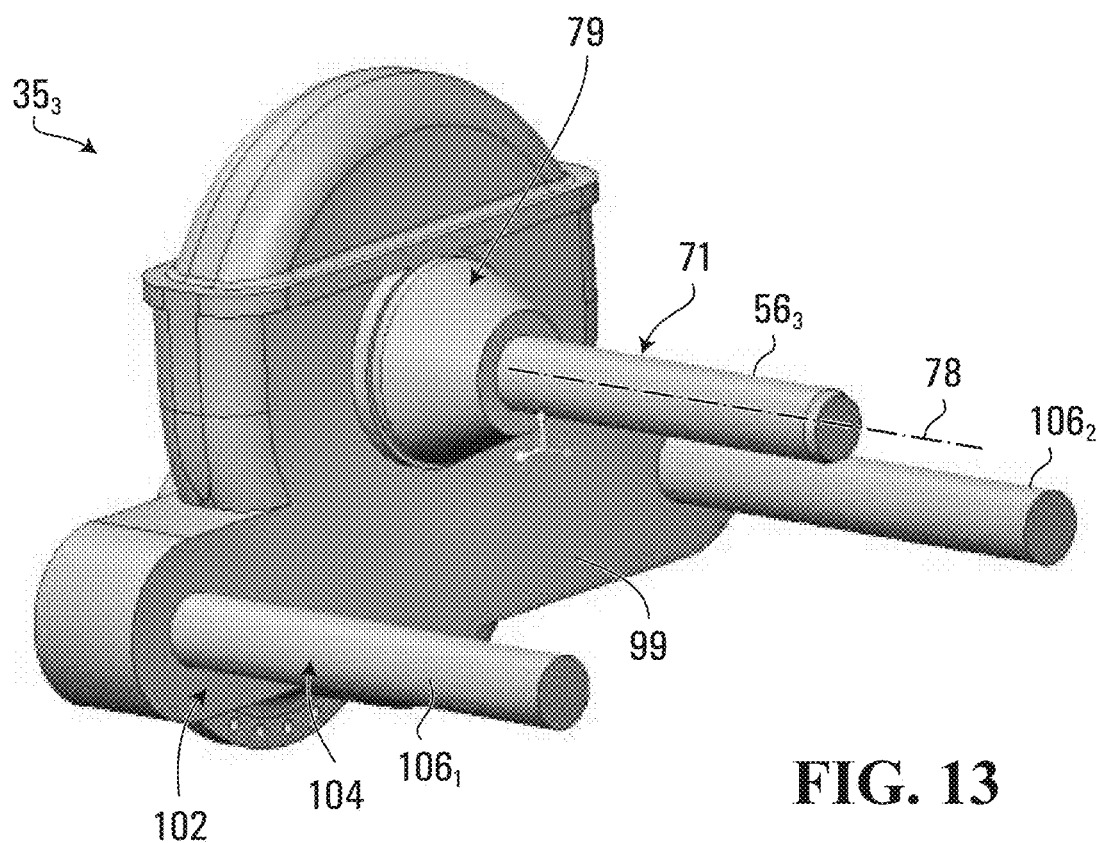
FIGS. 13 and 14 show perspective views of a rear final drive unit of the powertrain of the agricultural vehicle.
Figure 14:
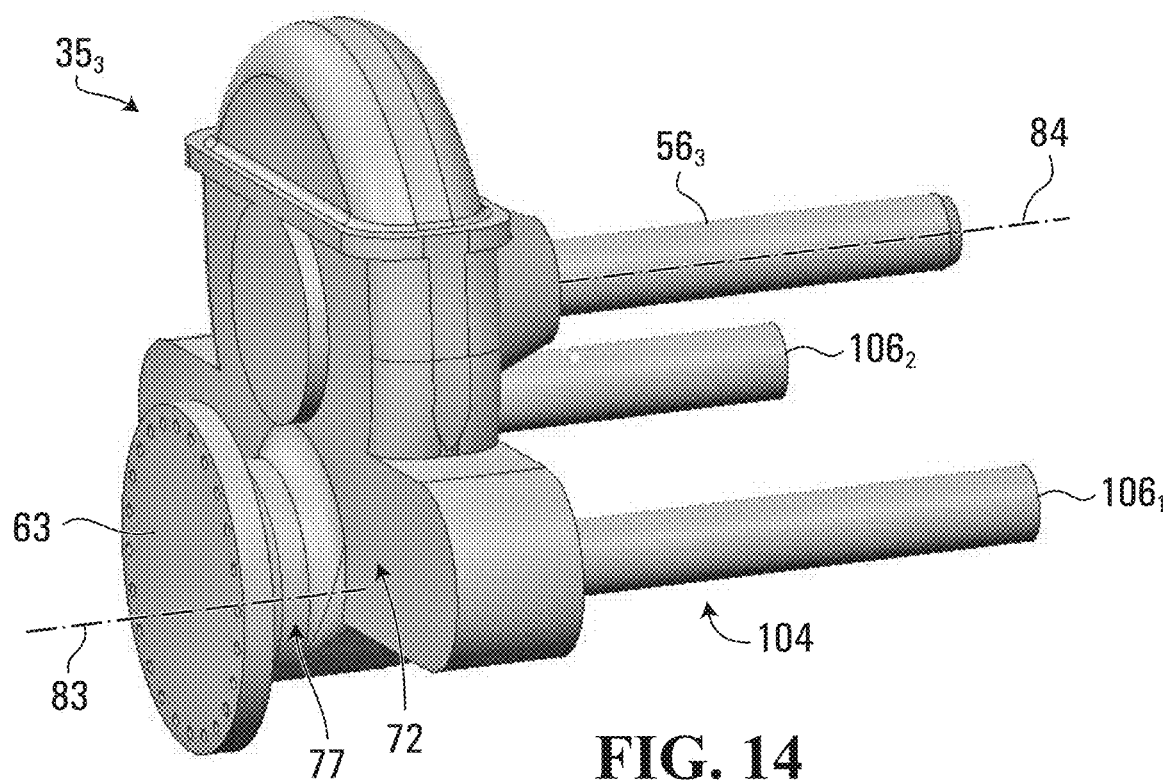
Figure 15:
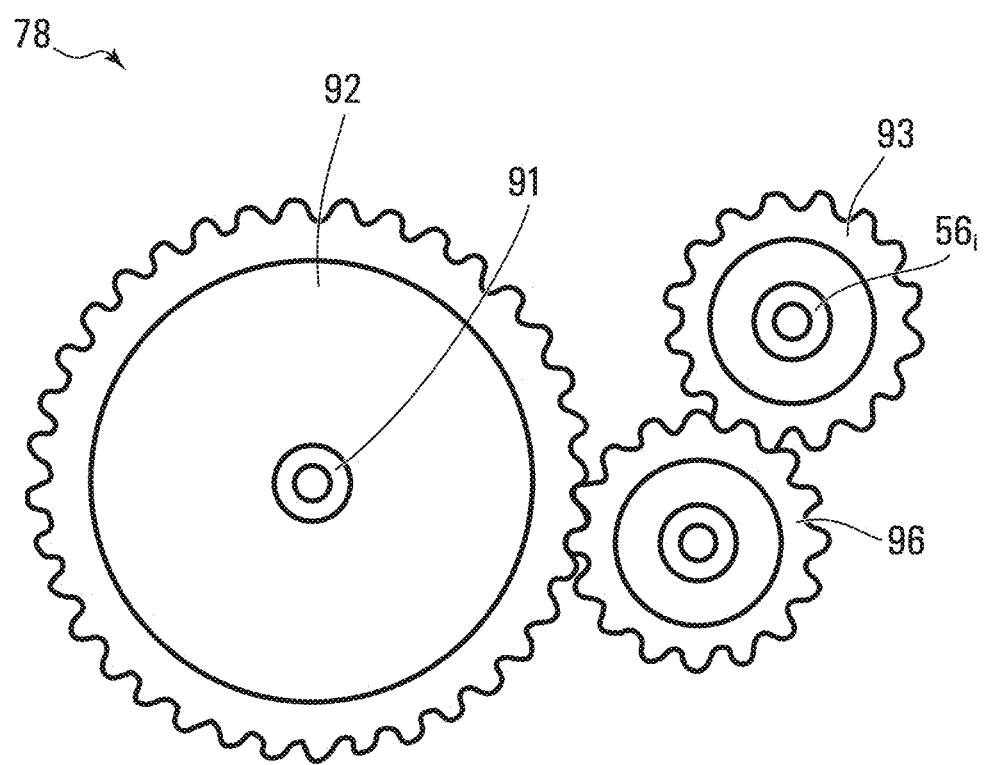
FIG. 15 shows part of a transmission of the rear final drive unit of FIGS. 13 and 14.

In this embodiment, as shown in FIGS. 13 to 15, the final drive unit $35_i$ comprises an input 63 connectable to a given one of the front and rear differentials 27, 29 of the agricultural vehicle 10, an output 71 constituting the final drive axle $56_i$, and a transmission 72 between its input 63 and its output 71.

In this embodiment, the transmission 72 of the final drive unit $35_i$ comprises a first portion 77 associated with the input 63 of the final drive unit $35_i$ and a second portion 79 associated with the output 71 the final drive unit $35_i$. The first portion 77 of the transmission 72 has an axis 83 defined by the front or rear differential 27, 29, while the second portion 79 of the transmission 72 has an axis 84 coaxial with an axis of rotation 78 of the final drive axle $56_i$ which in this example is coaxial with an axis of rotation 90 of the drive wheel 24. In this case, the axis 84 of the second portion 79 of the transmission 72 is spaced apart from the axis 83 of the first portion 77 of the transmission 72 in the height direction of the track system $16_i$. Thus, in this case, the axis of rotation 90 of the drive wheel 24 is spaced apart from an axis of rotation of the front or rear differential 27, 29 in the height direction of the track system $16_i$. In other cases, the axis of rotation 90 of the drive wheel 24 may be aligned with the axis of rotation of the front or rear differential 27, 29 in the longitudinal direction of the track system $16_i$ and/or in the height direction of the track system $16_i$.

In this embodiment, as shown in FIG. 15, the first portion 77 of the transmission 72 comprises an input shaft 91 connectable to the front or rear differential 27, 29 and leading to an input transmission wheel 92 and the second portion 79 of the transmission 72 comprises an output transmission wheel 93 leading to the final drive axle $56_i$ that drives the drive wheel 24. In this example, the transmission wheels 92, 93 are interconnected by an intermediate transmission member 96. More particularly, in this embodiment, the transmission 72 comprises a gearbox, the first transmission wheel 92 is an input gear, the second transmission wheel 93 is an output gear, and the intermediate transmission member 96 comprises an idler gear.

In the embodiment depicted in FIG. 15, the transmission 72 comprises a multiplier gear set such that a rotational speed of the output gear 93 is greater than that of the input gear 92. However, in other embodiments, the transmission 72 may comprise a reduction gear such that the rotational speed of the output gear 93 is less than that of the input gear 92 (e.g., by varying a size of respective ones of the input and output gears 92, 93).

Figure 16:
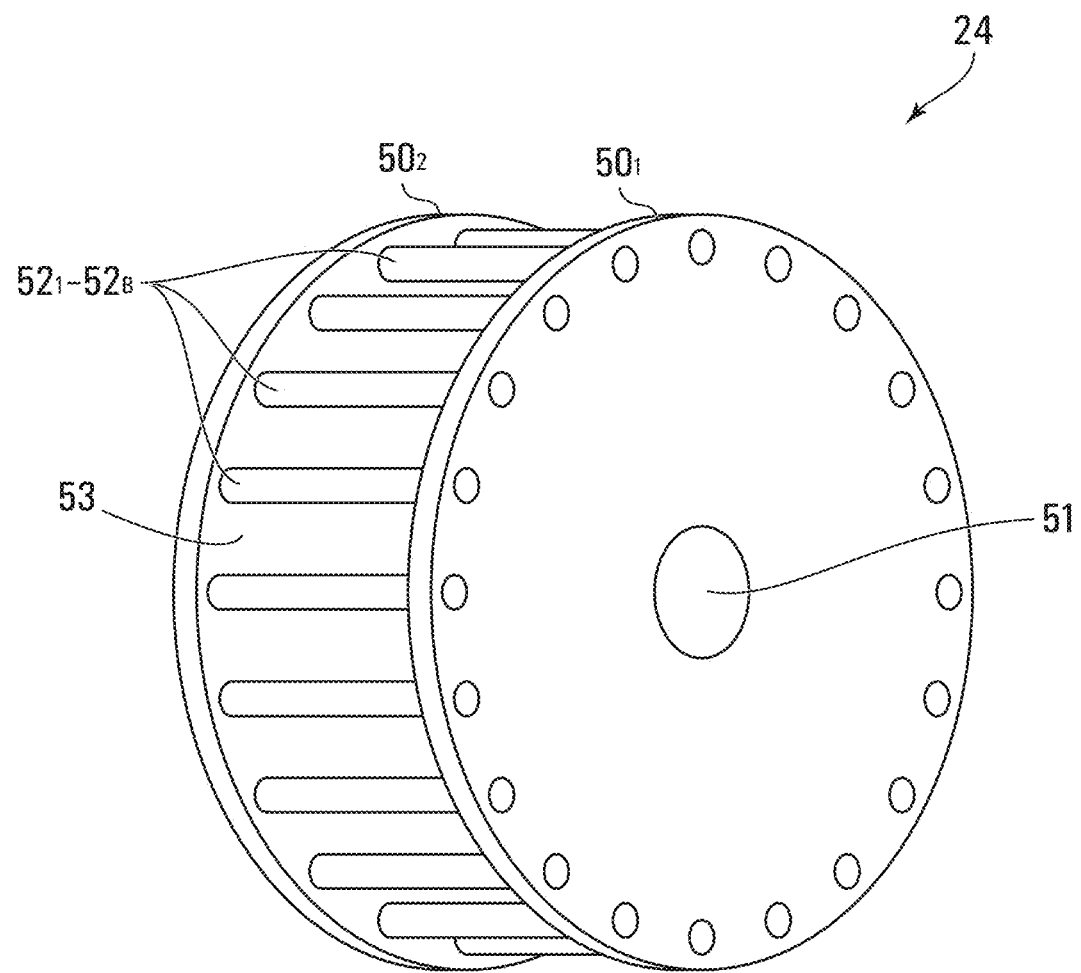
FIG. 16 shows a drive wheel of a track-engaging assembly of the track system.

With additional reference to FIG. 16, in this embodiment, the drive wheel 24 comprises a drive sprocket comprising a plurality of drive members $52_1$-$52_B$ spaced apart along a circular path to engage the drive/guide lugs $48_1$-$48_N$ of the track 22 in order to drive the track 22. The drive wheel 24 and the track 22 thus implement a "positive drive" arrangement. More particularly, in this embodiment, the drive wheel 24 comprises two side discs $50_1$, $50_2$ which are co-centric and turn about a common axle 51 and between which the drive members $52_1$-$52_B$ extend near respective peripheries of the side discs $50_1$, $50_2$. In this example, the drive members $52_1$-$52_B$ are thus drive bars that extend between the side discs $50_1$, $50_2$. The drive wheel 24 and the track 22 have respective dimensions allowing interlocking of the drive bars $52_1$-$52_B$ of the drive wheel 24 and the drive/guide lugs $48_1$-$48_N$ of the track 22. Adjacent ones of the drive bars $52_1$-$52_B$ define an interior space 53 between them to receive one of the drive/guide lugs $48_1$-$48_N$. Adjacent ones of the drive/guide lugs $48_1$-$48_N$ define an inter-lug space 39 between them to receive one of the drive bars $52_1$-$52_B$. The drive/guide lugs $48_1$-$48_N$ and the drive bars $52_1$-$52_B$ have a regular spacing that allows interlocking of the drive/guide lugs $48_1$-$48_N$ and the drive bars $52_1$-$52_B$ over a certain length of the drive wheel's circumference. Moreover, in this embodiment, the drive wheel 24 comprises a hub 115 for affixing the drive wheel 24 to the frame 13 of the track system $16_i$.

The drive wheel 24 may be configured in various other ways in other embodiments. For example, in other embodiments, the drive wheel 24 may not have any side discs such as the side discs $50_1$, $50_2$. As another example, in other embodiments, instead of being drive bars, the drive members $52_1$-$52_B$ may be drive teeth that are distributed circumferentially along the drive wheel 24 or any other type of drive members. As another example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 45 of the track 22 in order to frictionally drive the track 22 (i.e., the drive wheel 24 and the track 22 may implement a "friction drive" arrangement).

As described above, in this embodiment, the final drive axle $56_i$ of each final drive unit $35_i$ is offset in the height direction of the track system $16_i$. This may allow an increased angle of wrap of the track 22 about the drive wheel 24.

Figure 17:
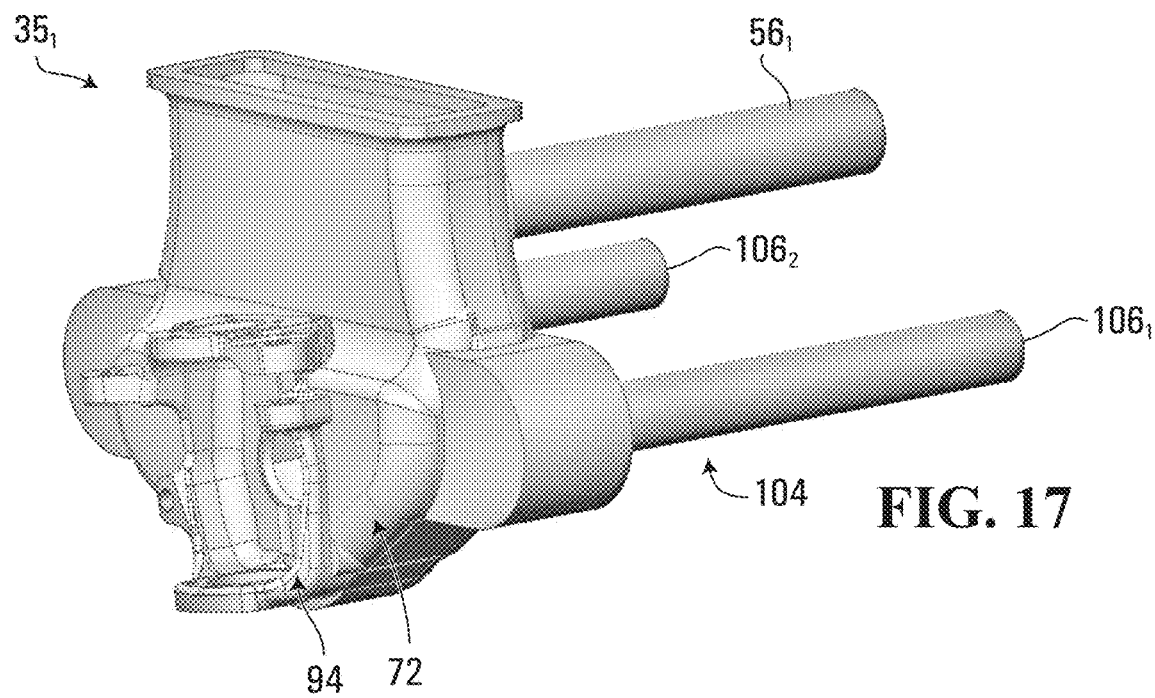
FIGS. 17 and 18 show a perspective view and a side view of a front final drive unit of the powertrain of the agricultural vehicle.

As shown in FIG. 17, the final drive units $35_1$, $35_2$ associated with the front track systems $16_1$, $16_2$ are similar to the final drive units $35_3$, $35_4$ associated with the rear track systems $16_3$, $16_4$. However, each of the final drive units $35_1$, $35_2$ associated with the front track systems $16_1$, $16_2$ additionally comprises a steering knuckle 94 for steering a respective front track system $16_i$. For instance, the steering knuckle 94 may be integrated with (i.e., integrally made with or fastened to another part of) the final drive unit $35_i$.

Figure 18:
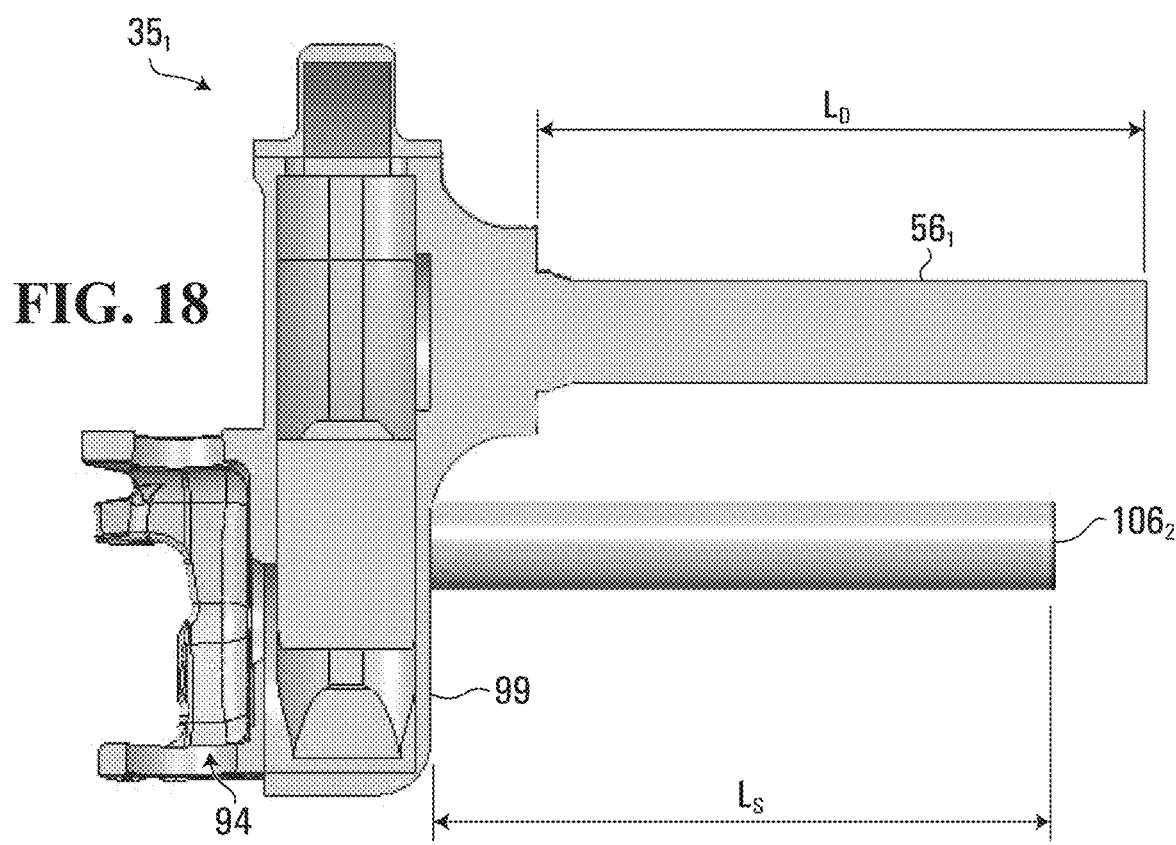
Figure 19:
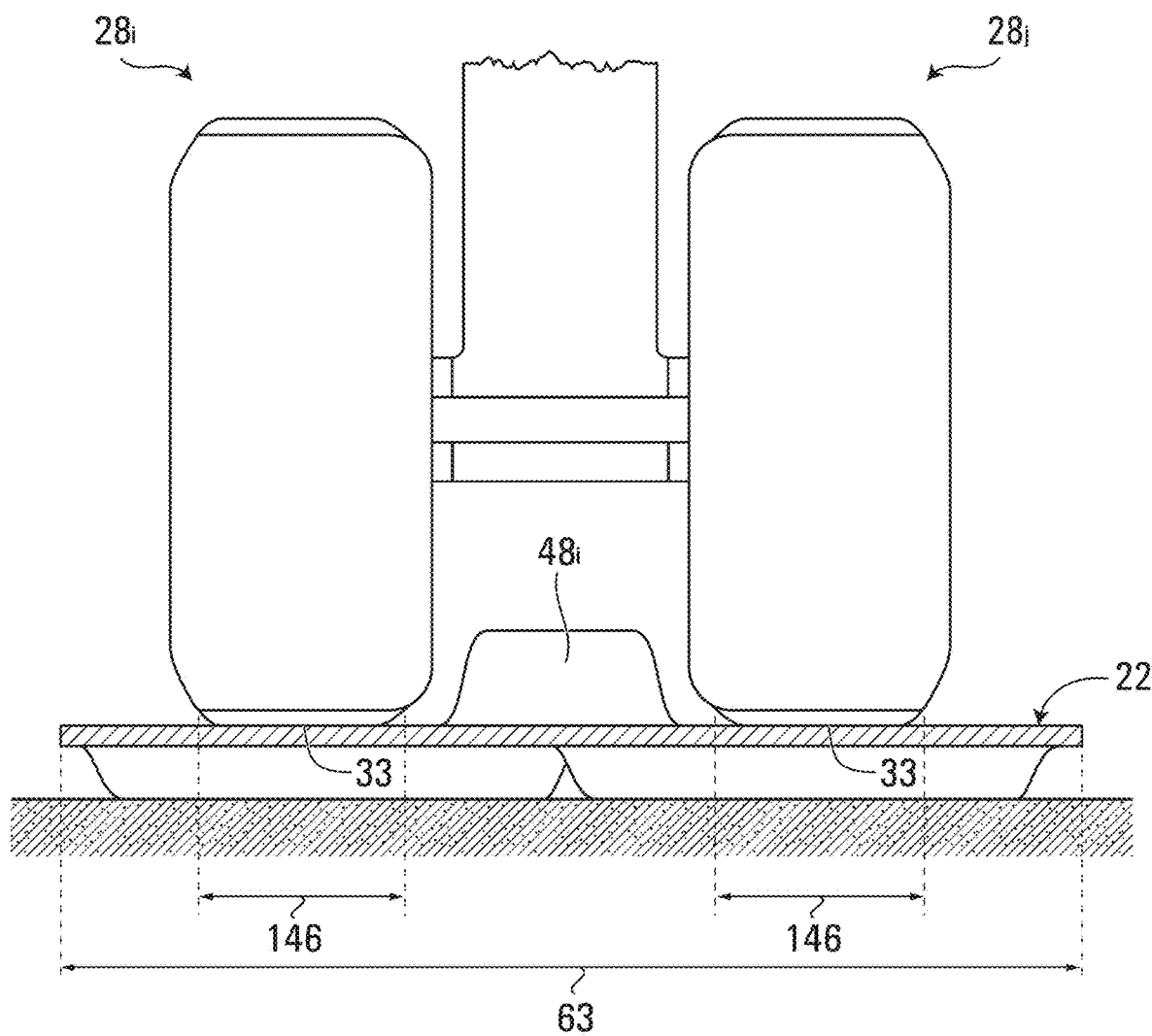
FIG. 19 shows mid-rollers of the track-engaging assembly engaging the inner side the track.
Figure 20:
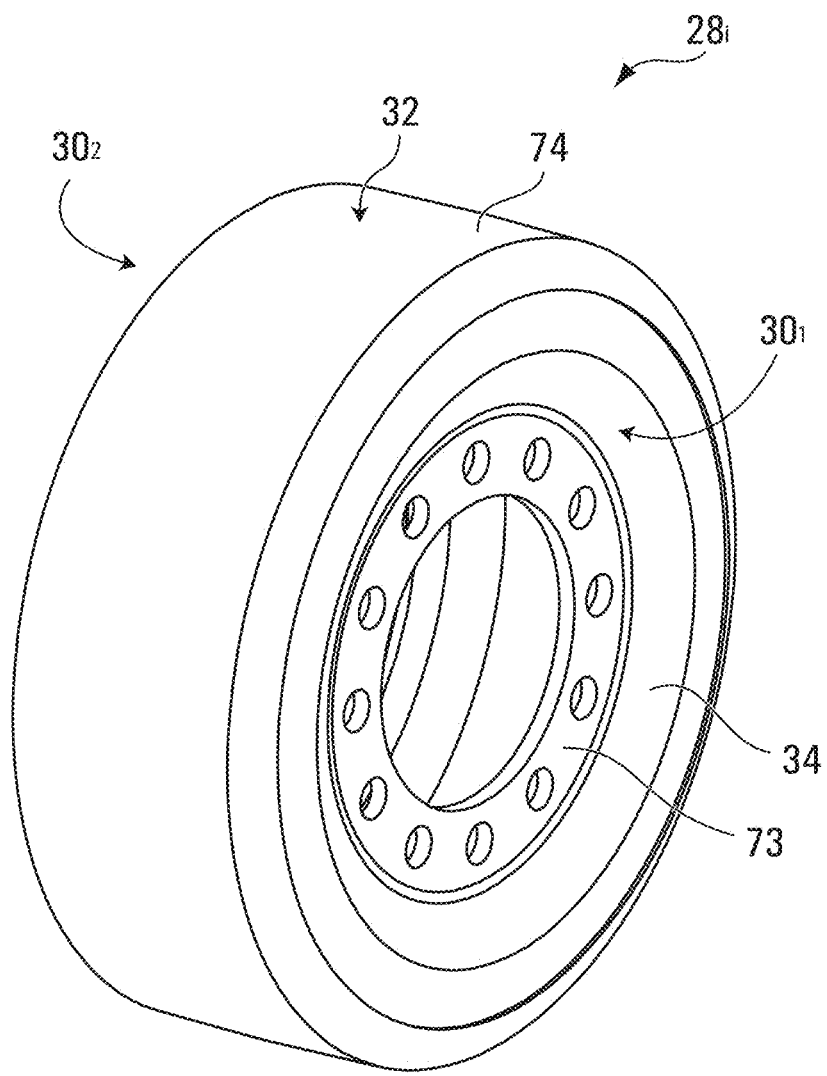
FIGS. 20 and 21 show perspective views of a mid-roller of the track-engaging assembly.
Figure 21:
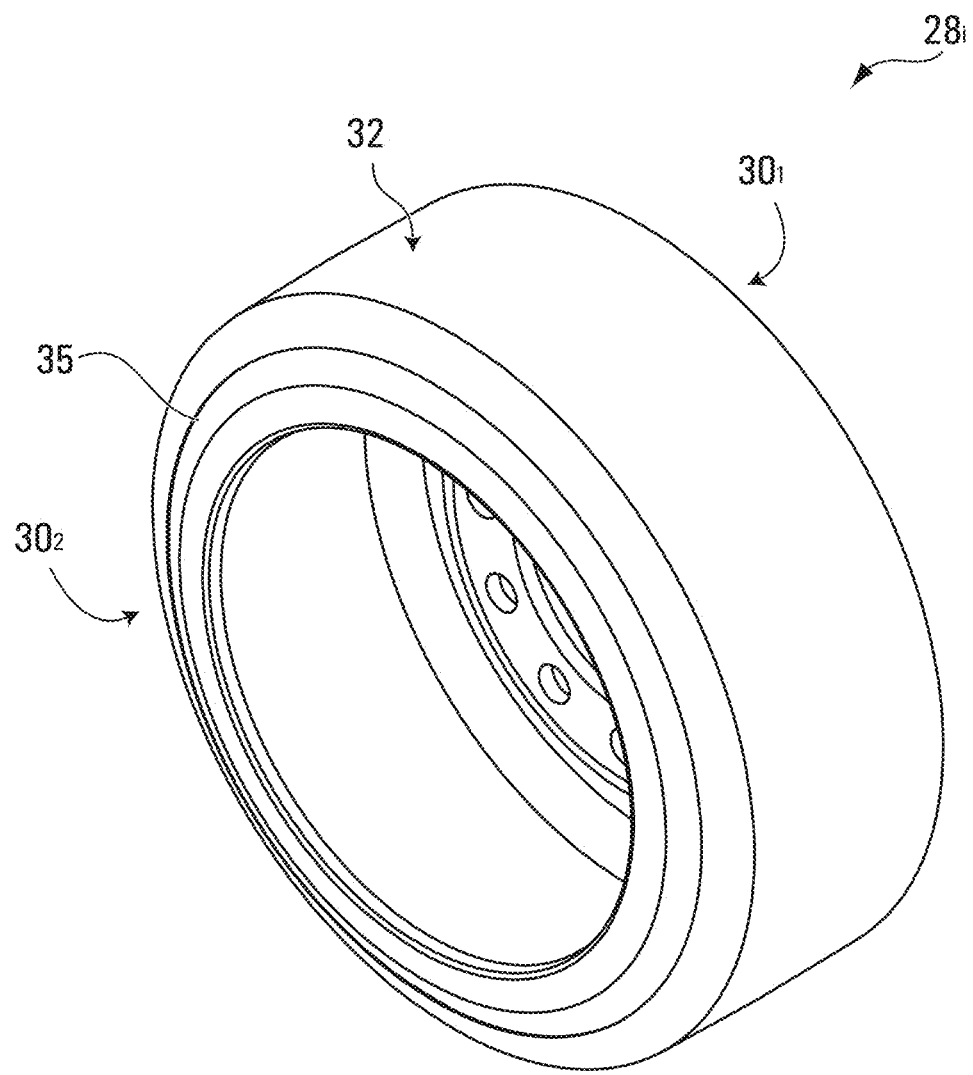
Figure 22:
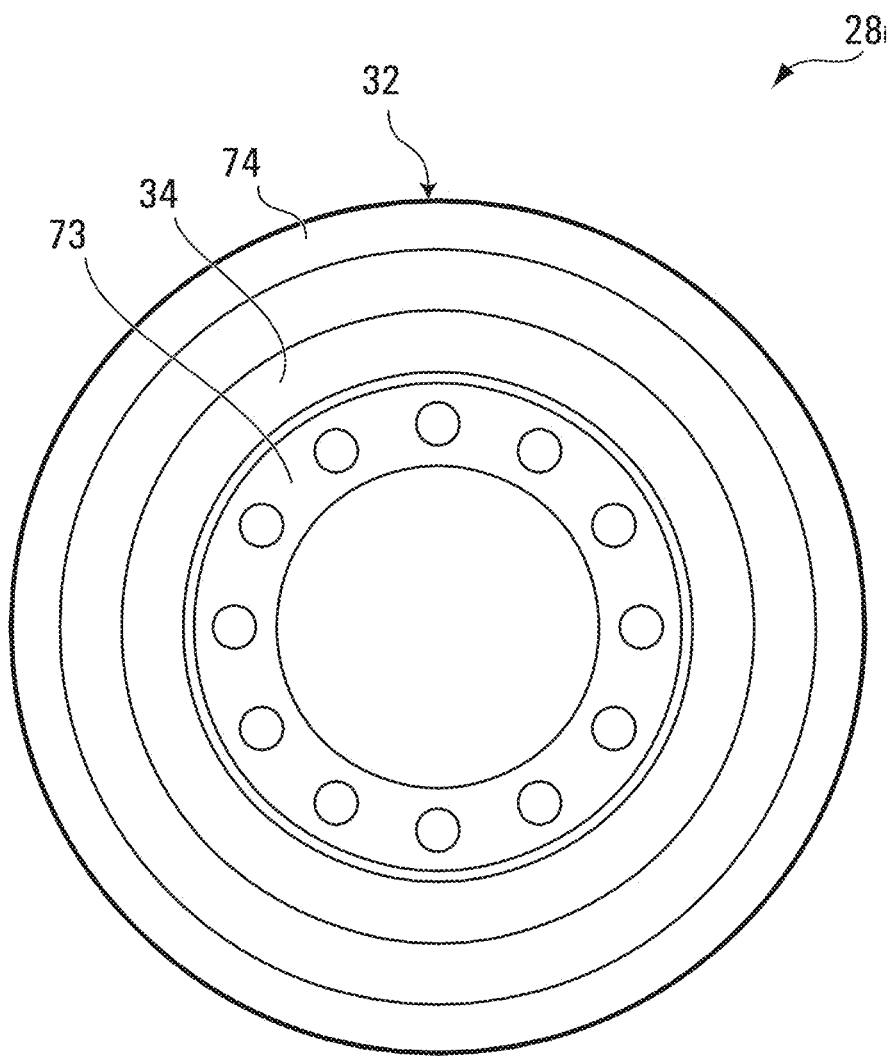
FIGS. 22 and 23 show a front view and a side view of the mid-roller.
Figure 23:
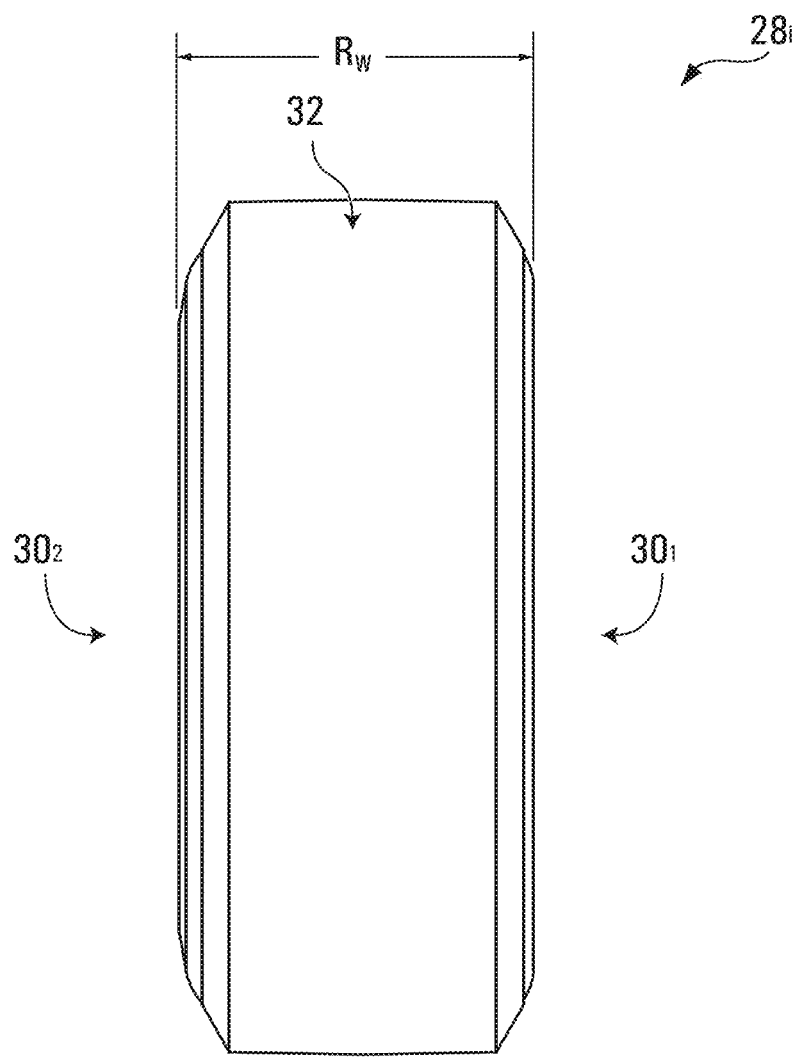

The idler wheels $23_1$, $23_2$, $26_1$, $26_2$, $28_1$-$28_R$ are not driven by power supplied by the prime mover 14, but are rather used to do at least one of supporting part of the weight of the agricultural vehicle 10 on the ground via the track 22, guiding the track 22 as it is driven by the drive wheel 24, and tensioning the track 22. More particularly, in this embodiment, the front and rear idler wheels $23_1$, $23_2$, $26_1$, $26_2$ maintain the track 22 in tension and help to support part of the weight of the agricultural vehicle 10 on the ground via the track 22. As shown in FIG. 18, the roller wheels $28_1$-$28_R$ roll on a rolling path 33 of the inner side 45 of the track 22 along the bottom run 66 of the track 22 to apply the bottom run 66 on the ground. In this case, as they are located between frontmost and rearmost ones of the wheels of the track system $16_i$, the roller wheels $28_1$-$28_R$ can be referred to as "mid-rollers".

With additional reference to FIGS. 19 to 23, each mid-roller $28_i$ comprises a hub portion 73, a rim portion 74, and a radially-extending portion 34 between the hub portion 73 and the rim portion 74. The hub portion 73 is an inner portion of the mid-roller $28_i$ which is associated with a hub 75 receiving an axle 76 for the mid-roller $28_i$. The rim portion 74 is an outer portion of the mid-roller $28_i$ which contacts the inner side 45 of the endless track 22. The radially-extending portion 34 is an intermediate portion of the mid-roller $28_i$ which extends radially between the hub portion 73 and the rim portion 74.

The mid-roller $28_i$ comprises a pair of lateral sides $30_1$, $30_2$ opposite one another and a peripheral side 32 between the lateral sides $30_1$, $30_2$. The peripheral side 32 rolls on the inner side 45 of the track 22 to apply the bottom run 66 of track 22 on the ground. More particularly, in this embodiment, the mid-roller $28_i$ rolls on the rolling path 33 which is delimited by some of the drive/guide lugs $48_1$-$48_N$ such that, as the mid-roller $28_i$ rolls, these drive/guide lugs pass next to the mid-roller $28_i$.

In this embodiment, the mid-roller $28_i$ may engage a significant extent of the width W of the track 22. For example, in some embodiments, a ratio of a width $R_w$ of the mid-roller $28_i$ over the width W of the track 22 may be at least 0.2, in some cases at least 0.3, in some cases at least 0.4, and in some cases even more.

Figure 24:
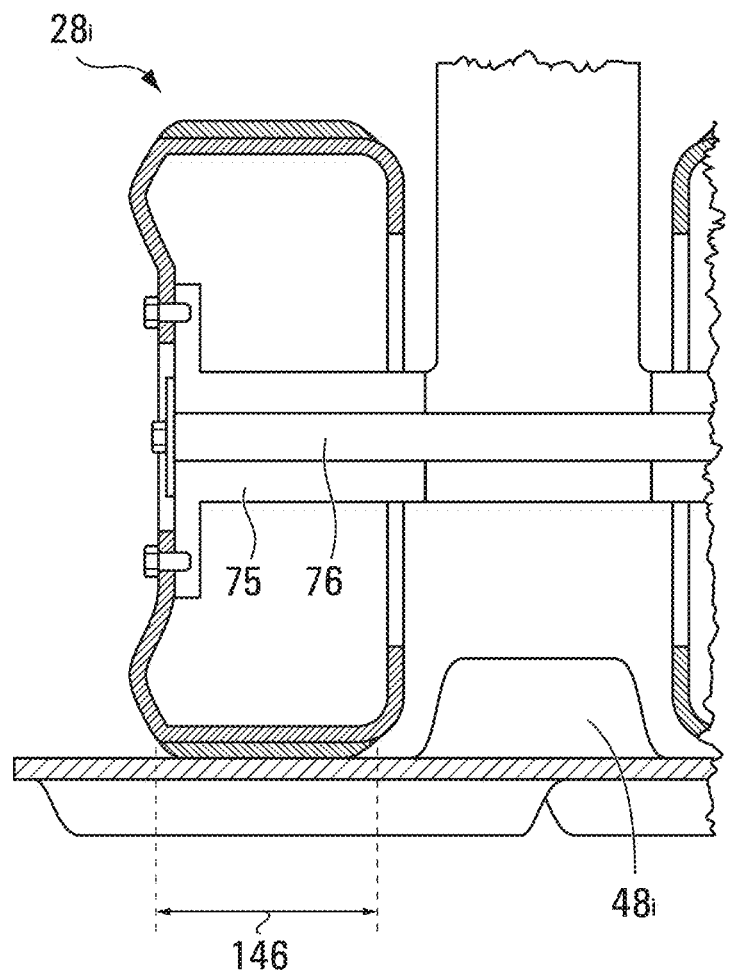
FIG. 24 shows the mid-roller wheel mounted on an axle via a hub.
Figure 25:
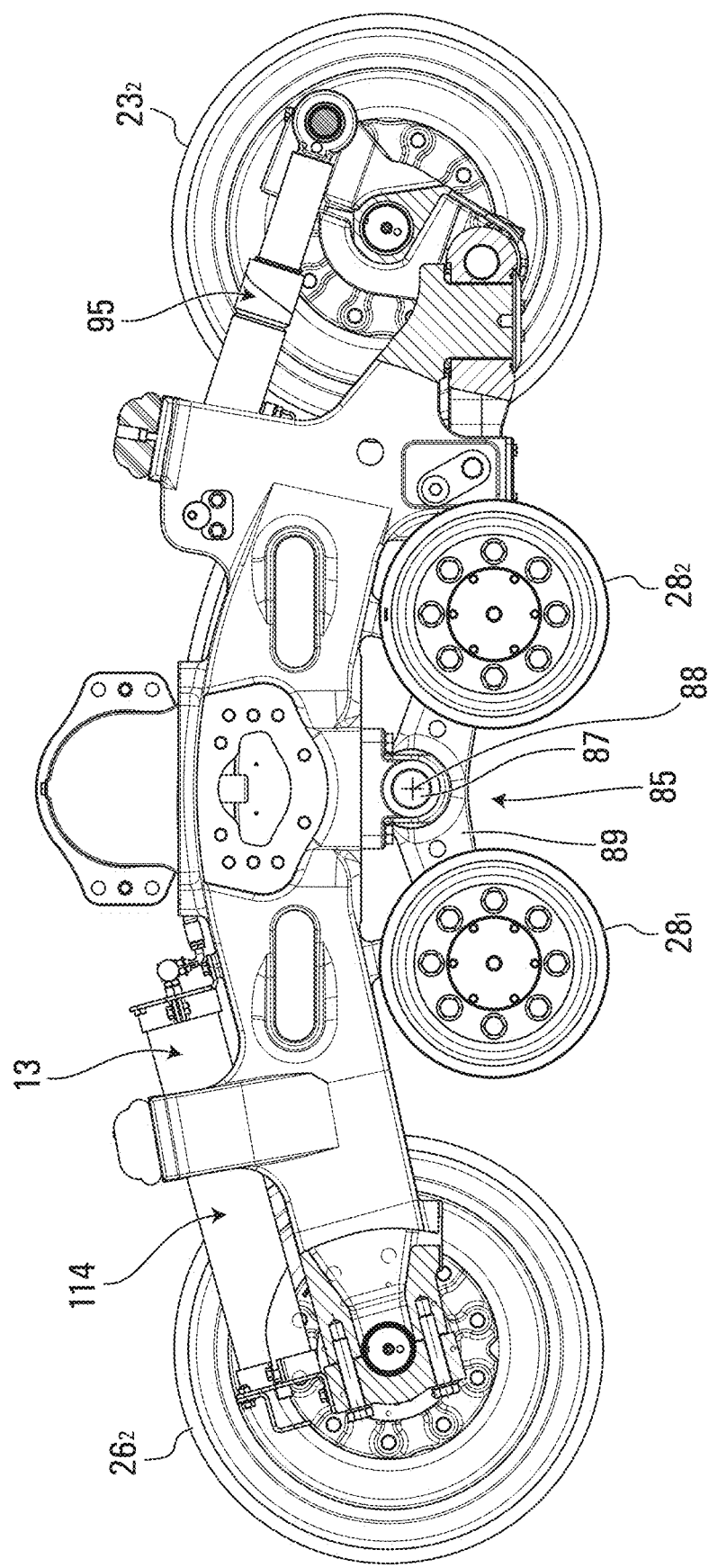
FIG. 25 shows a partial cross-sectional side view of a lower portion of the track system, including a bogie carrying the mid-rollers.
Figure 26:
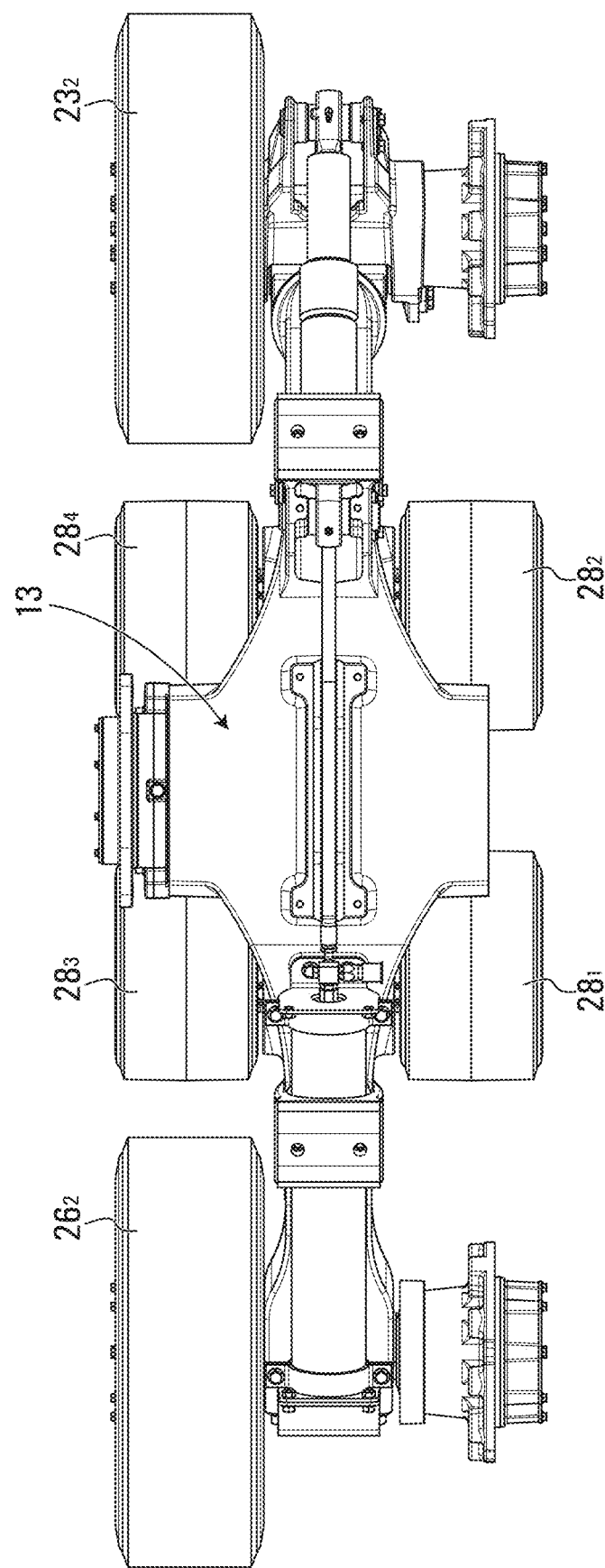
FIG. 26 shows a top view of the lower portion of the track system with two idler wheels being omitted.
Figure 27:
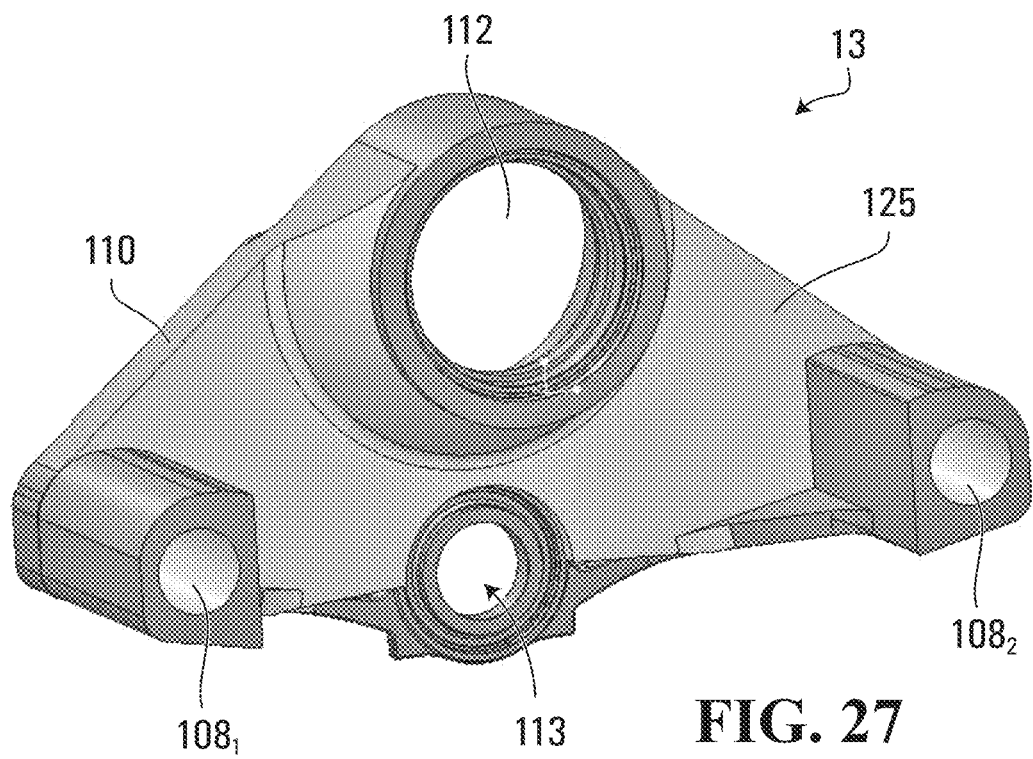
FIGS. 27 and 28 show front and rear perspective views of an upper portion of a frame of the track-engaging assembly of the track system.
Figure 28:
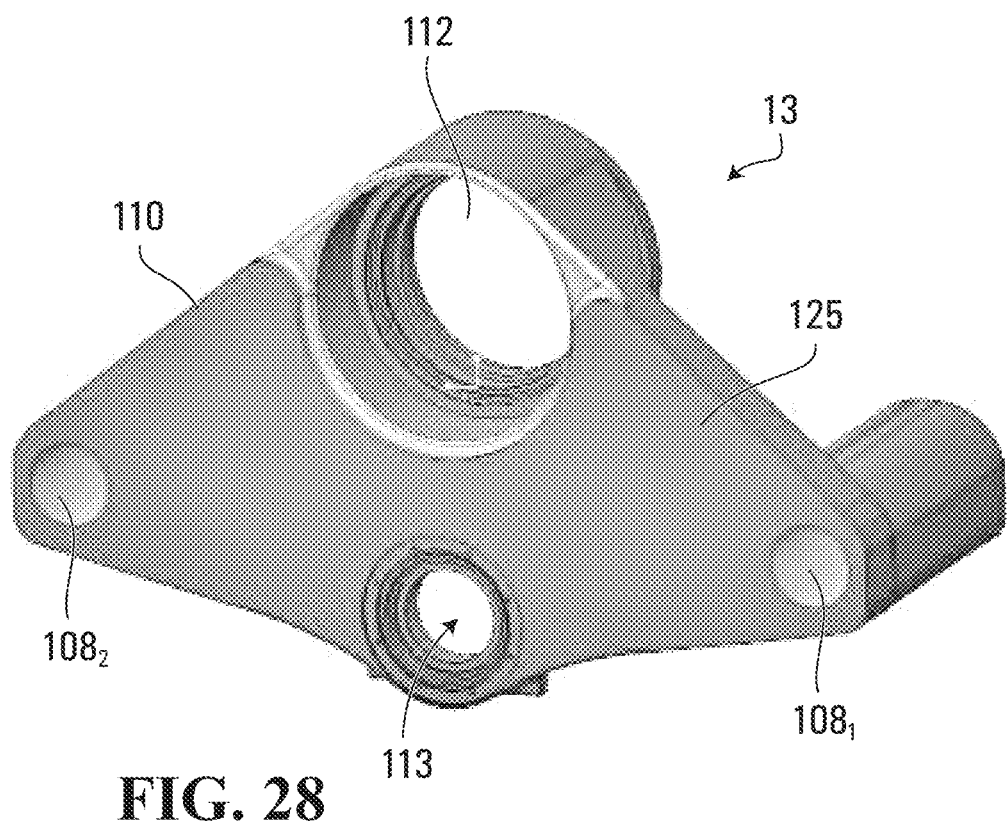

In addition, in this embodiment, as shown in FIGS. 24 and 25, the track system $16_i$ comprises a wheel carrier 85 carrying the mid-rollers $28_1$-$28_R$ and configured to allow movement of the mid-rollers $28_1$-$28_R$ relative to the frame 13 of the track system $16_i$. The wheel carrier 85, which may be referred to as a "bogie", comprises a wheel-carrying structure 89 to which are mounted the mid-rollers $28_1$-$28_R$.

More particularly, in this embodiment, the bogie 85 is pivotable relative to the frame 13 of the track system $16_i$ about a pivot 87 defining an axis of rotation 88 that is transversal, in this case perpendicular, to the longitudinal axis 61 of the track system $16_i$. The bogie 85 thus imparts the mid-rollers $28_1$-$28_R$ with a pivoting motion capability which may be referred to as a "pitch" motion.

Figure 56:
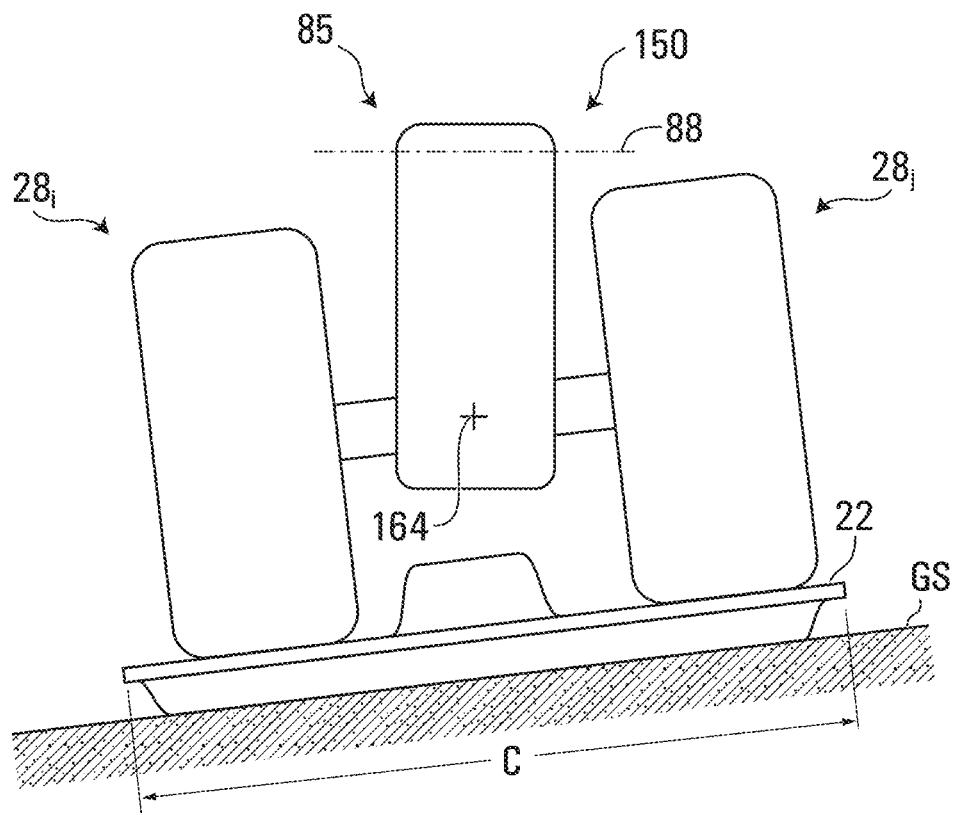
FIG. 56 shows an example of an embodiment of a lateral load distribution mechanism of the bogie of FIG. 25 in which the bogie has a roll motion capability to cause the mid-rollers to engage the track evenly in a widthwise direction of the track.

Also, in this embodiment, with additional reference to FIGS. 30 and 56 to 58, the bogie 85 comprises a lateral load distribution mechanism 150 configured to increase a lateral extent C of the contact patch 63 of the track 22 on a ground surface GS. This may be particularly useful when the ground surface GS is sloped or uneven (e.g., uneven terrain in an agricultural field or a sloped road), such as shown in FIG. 56 for example.

In this embodiment, the lateral load distribution mechanism 150 is configured to apply the mid-rollers $28_1$-$28_R$ onto the bottom run 66 of the track 22 such as to increase the lateral extent C of the contact patch 63 of the track 22. For example, in some embodiments, the lateral load distribution mechanism 150 may be configured to apply laterally-adjacent ones of the mid-rollers $28_1$-$28_R$ onto the bottom run 66 of the track 22 to increase the lateral extent C of the contact patch 63 of the track 22. The laterally-adjacent ones of the mid-rollers $28_1$-$28_R$ are respective ones of these wheels that are generally aligned with respect to one another or otherwise closest to one another in the longitudinal direction of the track system $16_i$ (e.g., the mid-rollers $28_1$, $28_2$, and/or the mid-rollers $28_3$, $28_4$, and/or the mid-rollers $28_5$, $28_6$).

The lateral load distribution mechanism 150 may be configured such that bottom track-contacting areas 146 of laterally-adjacent ones of the mid-rollers $28_1$-$28_R$ are vertically movable relative to one another (i.e., movable relative to one another in the height direction of the track system $16_i$). The bottom track-contacting area 146 of a given one of the mid-rollers $28_1$-$28_R$ is that area of the given one of the mid-rollers $28_1$-$28_R$ which contacts the bottom run 66 of the track 22.

In some embodiments, the lateral load distribution mechanism 150 may allow a "roll" motion of respective ones of the mid-rollers $28_1$-$28_R$. That is, the lateral load distribution mechanism 150 may be configured to allow a motion of respective ones of the mid-rollers $28_1$-$28_R$ relative to the frame 12 of the agricultural vehicle 10 that includes a rotation about a roll axis 164 which is transverse to their axes of rotation. In this case, the roll axis 164 is generally parallel to the longitudinal axis 61 of the track system $16_i$.

For example, in some embodiments, the roll motion enabled by the lateral load distribution mechanism 150 may be implemented by the bogie 85. More specifically, the bogie 85 may be movable relative to the frame 12 of the vehicle 10 to cause the mid-rollers $28_1$-$28_R$ to rotate about the roll axis 164 as they engage the bottom run 66 of the track 22.

More particularly, in some embodiments, as shown in FIG. 56, the bogie 85 is configured to define the roll motion and the pitch motion of respective ones of the mid-rollers $28_1$-$28_R$. That is, the bogie 85 can define a rotation about the roll axis 164 parallel to the longitudinal axis 61 of the track system $16_i$ and about the pitch axis 88 parallel to the widthwise direction of the track system $16_i$.

Figure 57:
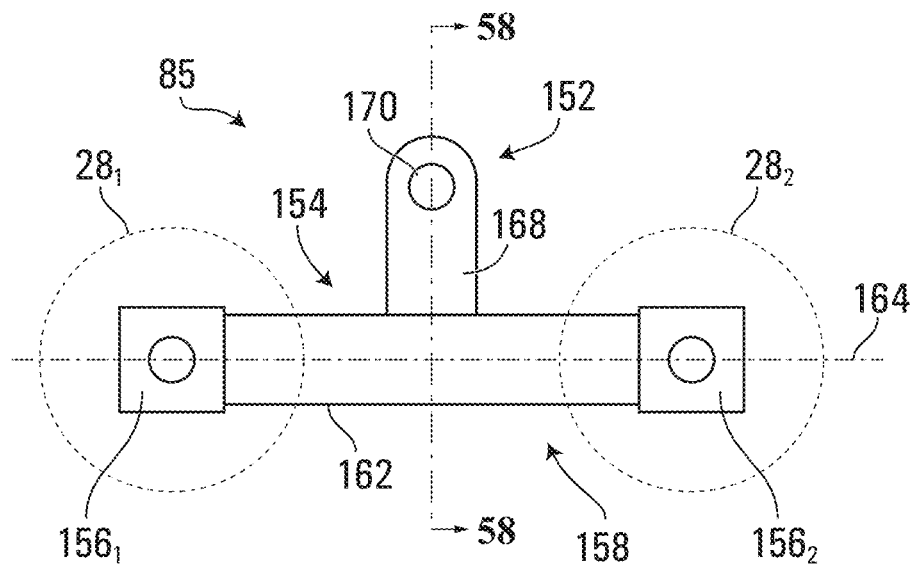
FIG. 57 shows the bogie of FIG. 56 including upper and lower structures of the bogie.
Figure 58:
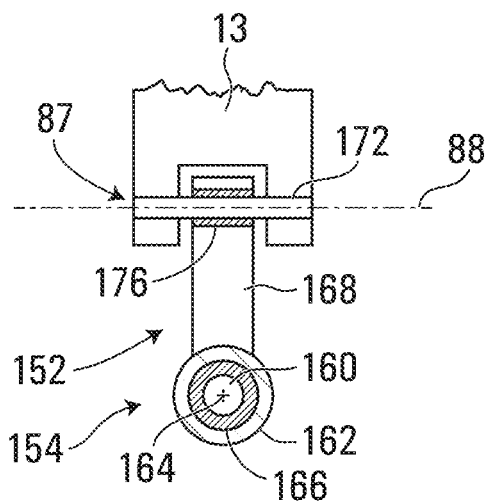
FIG. 58 shows a cross-sectional view of the bogie taken along line 58-58 as shown in FIG. 57.

As shown in FIGS. 57 and 58, in this embodiment, the bogie 85 comprises an upper structure 152 and a lower structure 154 connected to the upper structure 154. The lower structure 154 is configured to provide the bogie 85 with its roll motion capability. The lower structure 154 comprises a pair of axle-retaining members $156_1$, $156_2$ spaced apart in the longitudinal direction of the track system $16_i$, and a roll motion mechanism 158 connecting the axle-retaining members $156_1$, $156_2$ to one another. The axle-retaining members $156_1$, $156_2$ are configured to receive the axles 76 of the mid-rollers $28_1$-$28_4$ (e.g., via a hole traversing each axle-retaining member $156_i$). Each axle 76 receives two laterally adjacent mid-rollers $28_i$, $28_j$ thereon.

The roll motion mechanism 158 comprises a shaft 160 and an outer tube 162 receiving the shaft 160 therein. The shaft 160 extends in the longitudinal direction of the track system $16_i$ and is connectable to the axle-retaining members $156_1$, $156_2$. For example, the shaft 160 may be connected to the axle-retaining members $156_1$, $156_2$ via an interference fit. In other embodiments, the shaft 160 may be connected to the axle-retaining members $156_1$, $156_2$ in any other suitable way (e.g., via welding, fasteners, etc.). The outer tube 162 is mounted on the shaft 160 and extends between the axle-retaining members $156_1$, $156_2$. The shaft 160 is rotatable within the outer tube 162 about an axis of rotation of the outer tube 162 which corresponds to the roll axis 164. In this embodiment, the shaft 160 rotates within the outer tube 162 via a bearing 166 (e.g., a roller bearing) disposed between a peripheral surface of the shaft 160 and an inner surface of the outer tube 162. The shaft 160 may rotate within the outer tube 162 via any other suitable mechanism in other embodiments.

The upper structure 152 of the bogie 85 is configured to provide the bogie 85 with its pitch motion capability. More particularly, the upper structure 152 comprises the pivot 87. The upper structure 152 comprises a body 168 affixed to the lower structure 154 (e.g., via welding). The body 168 comprises a shaft-receiving aperture 170 for receiving therein a shaft 172. The shaft 172 is rotatable within the shaft-receiving aperture 170 about an axis of rotation that corresponds to the pitch axis 88 defined by the pivot 87. For example, the shaft-receiving aperture 170 may comprise a bearing 176 (e.g., a roller bearing) for enabling rotation of the shaft 172 within the shaft-receiving aperture 170. As shown in FIG. 58, the shaft 172 is connected at its longitudinal end portions to the frame 13 of the track system $16_i$ which supports the bogie 85.

Thus, in this embodiment, the lateral load distribution mechanism 150 allows the bogie 85 to define the roll motion and the pitch motion about the roll and pitch axes 164, 88 respectively. Therefore, the bogie 85 allows the mid-rollers $28_1$-$28_4$ to pivot about the roll axis 164 causing the mid-rollers $28_1$-$28_4$ to apply the bottom run 66 of the track 22 more evenly on the ground surface GS.

The roll motion of respective ones of the mid-rollers $28_1$-$28_4$ may be implemented by the lateral load distribution mechanism 150 in any other suitable way in other embodiments.

The mid-rollers $28_1$-$28_4$ may not be mounted to a bogie in other embodiments. For example, the mid-rollers $28_1$-$28_R$ may be mounted directly to the frame 13 of the track system $16_i$ without any intervening bogie in other embodiments.

In this example of implementation, as shown in FIG. 25, the track system $16_i$ may comprise a tensioner 95 for tensioning the track 22. For instance, in this embodiment, the tensioner 95 comprises an actuator mounted at one end to the frame 13 of the track system $16_i$ and at another end to a hub of the front idler wheels $23_1$, $23_2$. This allows the tensioning mechanism 95 to modify a distance between the front idler wheels $23_1$, $23_2$ and the rear idler wheels $26_1$, $26_2$ in the longitudinal direction of the track system $16_i$.

With reference to FIGS. 2, 3 and 27 to 32, in this embodiment, the agricultural vehicle 10 comprises a lateral track spacing adjustment mechanism 100 configured to adjust the spacing S of laterally-adjacent ones of the track $16_1$-$16_4$ in the widthwise direction of the agricultural vehicle 10. The lateral track spacing adjustment mechanism 100 thus allows the spacing S of the track systems $16_1$, $16_2$ and/or the spacing S of the track systems $16_3$, $16_4$ to be adjusted in order to facilitate use of the agricultural vehicle 10 in different field configurations, such as in different configurations of row crops (e.g., different "tread settings" for different field configurations). Notably, in this embodiment, the spacing S of the laterally-adjacent ones of the track systems $16_1$-$16_4$ of the agricultural vehicle 10 is adjustable while the laterally-adjacent ones of the track systems $16_1$-$16_4$ of the agricultural vehicle 10 are connected to the powertrain 15 and/or without requiring use of additional parts (e.g. spacers).

For purposes of this example, the lateral track spacing adjustment mechanism 100 will be discussed in relation to the spacing S of the track systems $16_1$, $16_2$, although a similar discussion applies to the spacing S of the track systems $16_3$, $16_4$.

The lateral track spacing adjustment mechanism 100 allows the spacing S of the track systems $16_1$, $16_2$ to be increased, i.e., by moving one or both of the track systems $16_1$, $16_2$ away from a center 117 of the vehicle 10 in the widthwise direction of the vehicle 10 such that the track systems $16_1$, $16_2$ are moved away from one another, and decreased, i.e., by moving one or both of the track systems $16_1$, $16_2$ towards the center 117 of the vehicle 10 in the widthwise direction of the vehicle 10 such that the track systems $16_1$, $16_2$ are moved towards one another.

In this embodiment, the lateral track spacing adjustment mechanism 100 comprises a portion 102 of each of the final drive units $35_1$, $35_2$. Notably, in this embodiment, the lateral track spacing adjustment mechanism 100 is configured such that the spacing S of the track systems $16_1$, $16_2$ is adjustable while the final drive units $35_1$, $35_2$ remain fixed. That is, the final drive units $35_1$, $35_2$ do not have to be moved in order to adjust the spacing S of the track systems $16_1$, $16_2$. Rather, the track systems $16_1$, $16_2$ are movable relative to the final drive units $35_1$, $35_2$ in the widthwise direction of the vehicle 10.

More particularly, in this embodiment, the portion 102 of each final drive unit $35_i$ that implements the lateral track spacing adjustment mechanism 100 comprises the final drive axle $56_i$ and a support 104 for engaging the frame 13 of the track system $16_i$.

In this embodiment, the support 104 comprises a plurality of support arms $106_1$, $106_2$ that protrude from a body 99 of the final drive unit $35_i$ towards the track system $16_i$. In this case, the body 99 of the final drive unit $35_i$ comprises gearing of the transmission 72. Each support arm $106_i$ of the support 104 has a length $L_s$ that is significant. For example, the length $L_s$ of the support arm $106_i$ may be greater than the width W of the track 22. For example, in some cases, a ratio $L_s/W$ of the length $L_s$ of the support arm $106_i$ over the width W of the track 22 may be at least 1.1, in some cases at least 1.2, in some cases at least 1.3, in some cases at least 1.4, in some cases at least 1.5, and in some cases even more (e.g., 1.6, 1.7, 2, etc.).

The drive axle $56_i$ of the final drive unit $35_i$ has a length LD that is also significant. For example, the length LD of the drive axle $56_i$ may be greater than the width W of the track 22. For example, in some cases, a ratio of the length of the drive axle $56_i$ over the width W of the track 22 may be at least 1.1, in some cases at least 1.2, in some cases at least 1.3, in some cases at least 1.4, in some cases at least 1.5, and in some cases even more (e.g., 1.6, 1.7, 2, etc.).

In this embodiment, the frame 13 of the track system $16_i$ comprises an upper frame member 110 constituting a nonrotatable support 125 configured to receive the support arms $106_1$, $106_2$ of the support 104. To that end, in this embodiment, the nonrotatable support 125 comprises a plurality of openings 1081, 1082 that are configured for receiving the support arms $106_1$, $106_2$. In this embodiment, each support arm $106_i$ is generally cylindrical and, accordingly, each opening $108_i$ is also generally cylindrical. In this embodiment, the nonrotatable support 125 also comprises an opening 112 that is disposed centrally relative to the openings $108_1$, $108_2$ in the longitudinal direction of the track system $16_i$. The opening 112 is configured for receiving therein the final drive axle $56_i$ of the final drive unit $35_i$. This will be described in more detail further below. The upper frame member 110 of the frame 13 may also comprise a connector 113 for connecting the upper frame member 110 of the frame 13 to a lower frame member 114 of the frame 13 which supports the idler wheels $23_1$, $23_2$, $26_1$, $26_2$, $28_1$-$28_R$ as depicted in FIG. 25. In this example, the connector 113 comprises a pivot about which the lower frame member 114 may pivot relative to the upper frame member 110.

The support arms $106_1$, $106_2$ and the drive axle $56_i$ of the final drive unit $35_i$ allow movement of the track system $16_i$ relative to the final drive unit $35_i$ in the widthwise direction of the vehicle 10.

In this embodiment, the frame 13 is configured such that a tension of the track 22 is distributed more evenly throughout the frame 13. For instance, in this embodiment, the shape of the upper frame member 110 of the frame 13, which extends frontwardly and rearwardly of the drive wheel 24, may allow distribution of the tension of the track 22 towards a front and a rear portion of the upper frame member 110 of the frame 13 in order to minimize stress at the final drive axle $56_i$.

Figure 29:
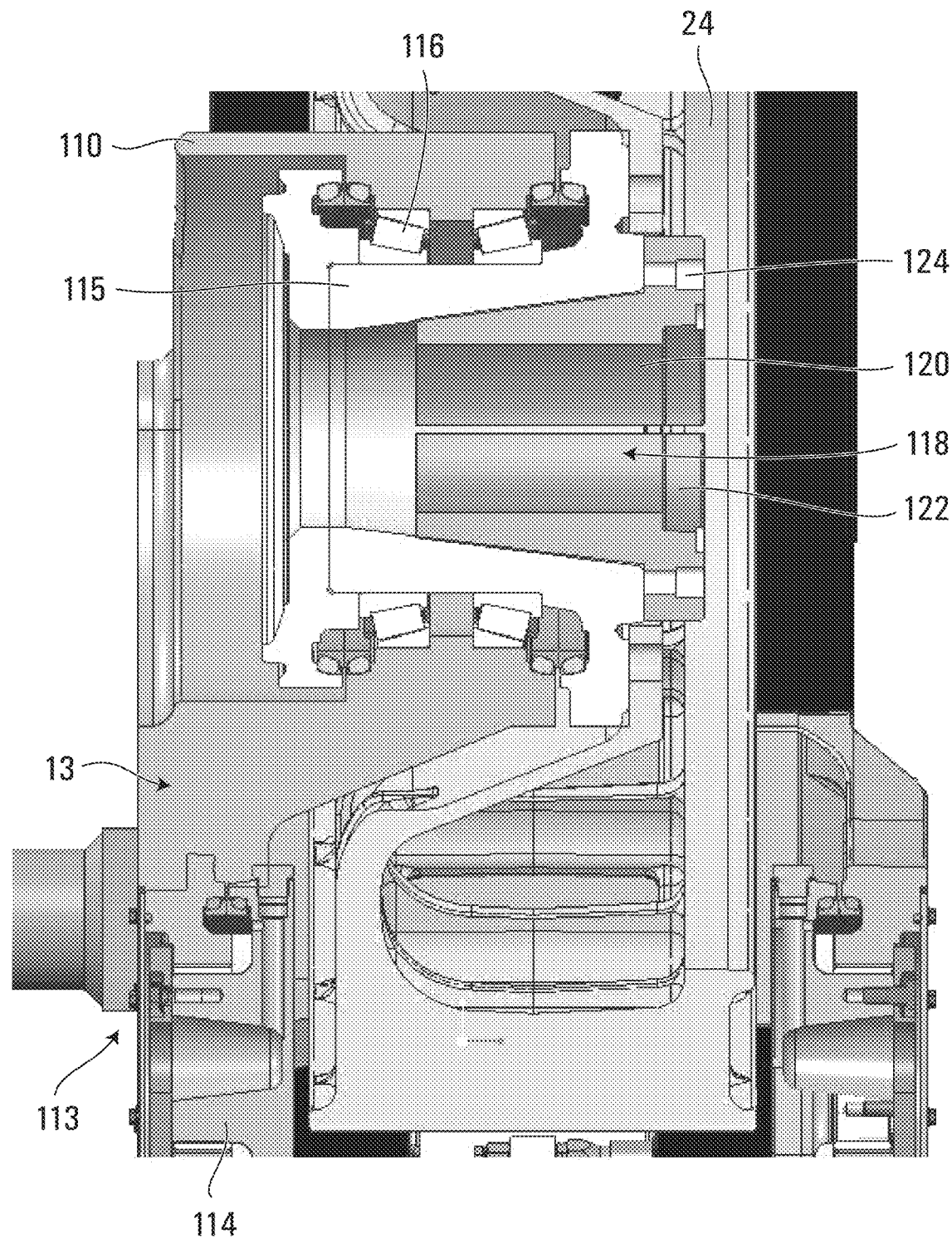
FIG. 29 shows a partial cross-sectional view of a retaining mechanism of the track system.
Figure 30:
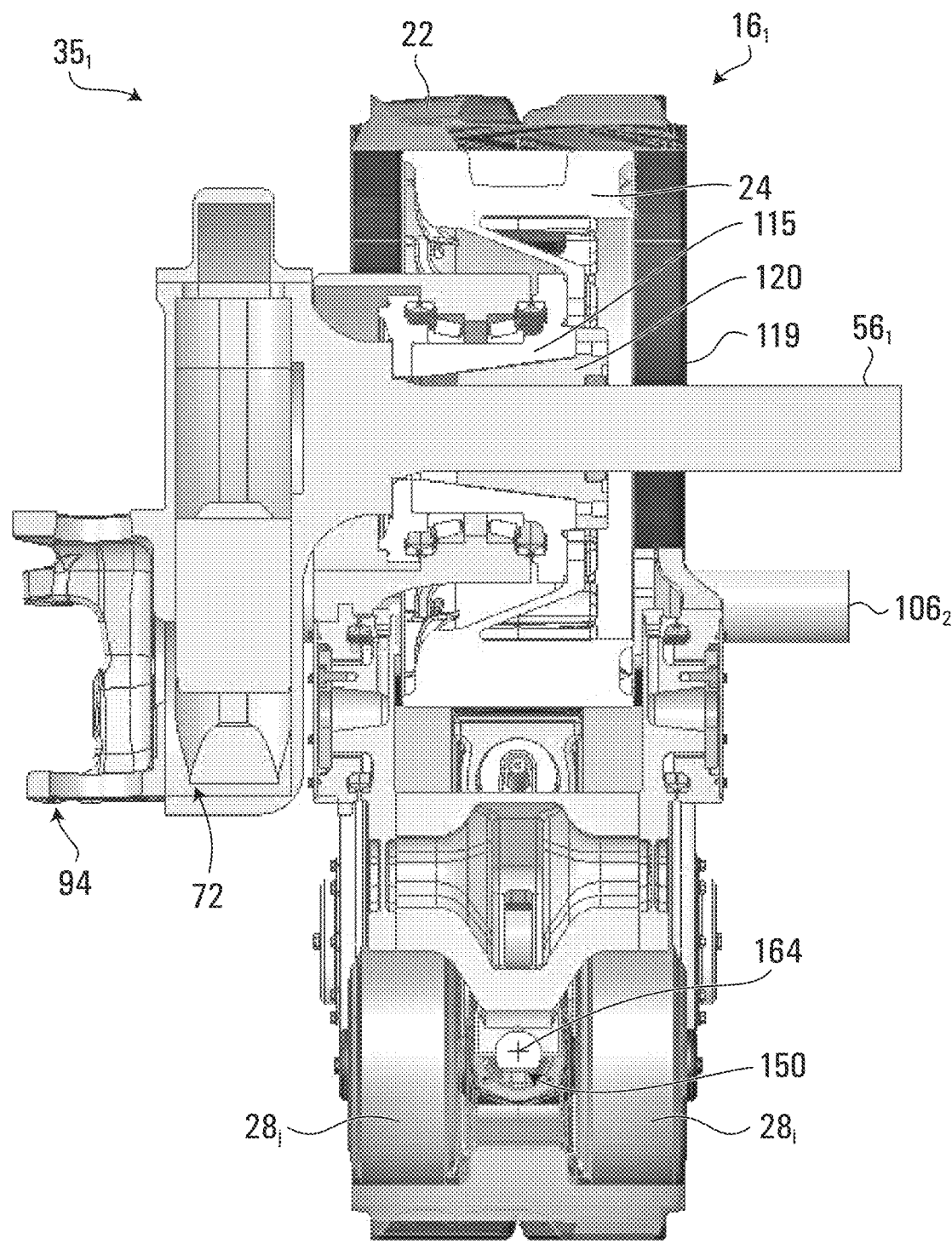
FIG. 30 shows a cross-sectional view of the front track system as it is engaged by the front final drive unit.

As shown in FIGS. 29 and 30, in this example, the hub 115 of the drive wheel 24 is received in the opening 112 of the upper frame member 110 of the frame 13 and is rotatable relative to the upper frame member 110 of the frame 13. For example, to that end, a bearing 116 may be disposed in the opening 112, between the hub 115 and the upper member 110 of the frame 113. A sealing member may also be disposed between the hub 115 and the upper member 110 of the frame 13 to seal the bearing 116 from exterior contaminants.

In this embodiment, the track system $16_i$ comprises a retaining mechanism 118 for selectively securing the track system $16_i$ to the final drive unit $35_i$. More specifically, in this embodiment, the retaining mechanism 118 comprises a retaining member 120 that is configured to receive and selectively retain the final drive axle $56_i$ of the final drive unit $35_i$. In particular, the retaining member 120 may be adjusted to prevent relative movement between the final drive axle $56_i$ and the retaining member 120. In this example of implementation, the retaining member 120 comprises a taper lock bushing 122. Tightening of fasteners 124 of the taper lock bushing 122 causes an opening of the taper lock bushing 122, which is configured to receive the final drive axle $56_i$, to shrink. This prevents movement of the final drive axle $56_i$ relative to the taper lock bushing 122. Conversely, loosening of the fasteners 124 of the taper lock bushing 122 causes the opening of the taper lock bushing 122 to expand and therefore allow relative movement of the final drive axle $56_i$ relative to the taper lock bushing 122. The retaining mechanism 118 may comprise other retaining members 135 similar to the retaining member 120 in order to receive and selectively retain the supports arms $106_1$, $106_2$ of the support 104.

Due to the nature of its retaining members 120, in this embodiment, the retaining mechanism 118 of the track system $16_i$ can provide a continuous range of adjustment positions of the track system $16_i$ relative to the final drive unit $35_i$. In turn, this may allow the spacing S of the track systems $16_1$, $16_2$ and/or the spacing S of the track systems $16_3$, $16_4$ to have any value within a range of its minimal and maximal values. In other words, the spacing S may have any of an infinite number of values within a given range.

In order to adjust the spacing S of the track systems $16_1$, $16_2$ and/or the spacing S of the track systems $16_3$, $16_4$, a user (e.g., the operator of the vehicle 10) loosens the retaining members 120 of the retaining mechanism 116 of a selected track system $16_i$ and displaces the track system $16_i$ relative to the corresponding final drive unit $35_i$. The operator then tightens the retaining members 120 of the retaining mechanism 116 to secure the track system $16_i$ to the final drive unit $35_i$ at a selected distance therefrom. The user then repeats the same process on a laterally opposite track system $16_j$ to obtain the desired spacing S between the track systems $16_i$, $16_j$.

Figure 31:
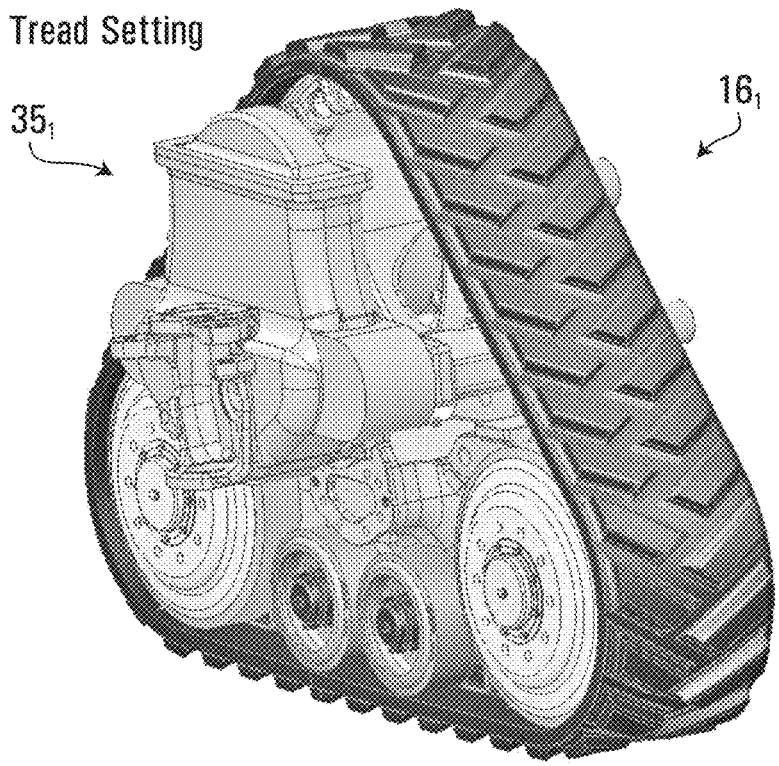
FIGS. 31 and 32 shows rear perspective views of the front track system in the narrow tread setting and in the wide tread setting, respectively.

This allows the user to adjust the spacing S of the track systems $16_1$, $16_2$ and/or the spacing S of the track systems $16_3$, $16_4$ to have a "narrow" tread setting, as shown in FIG. 31. In the narrow tread setting, the body 99 of the final drive units $35_1$, $35_2$ and/or the final drive units $35_3$, $35_4$ are relatively close to their corresponding track systems $16_1$, $16_2$ and/or $16_3$, $16_4$. Moreover, in the narrow tread setting, the final drive axle $56_i$ and the support arms $106_1$, $106_2$ of a respective final drive unit $35_i$ extend beyond the track 22 of the respective track system $16_i$ in the widthwise direction of the track system $16_i$. That is, the final drive axle $56_i$ and the support arms $106_1$, $106_2$ of a respective final drive unit $35_i$ overlap an entirety of the width W of the track 22 and extend outwardly beyond a laterally-outward edge 119 of the track 22 (i.e., a lateral edge of the track 22 facing away from the center 117 of the vehicle 10).

Figure 32:
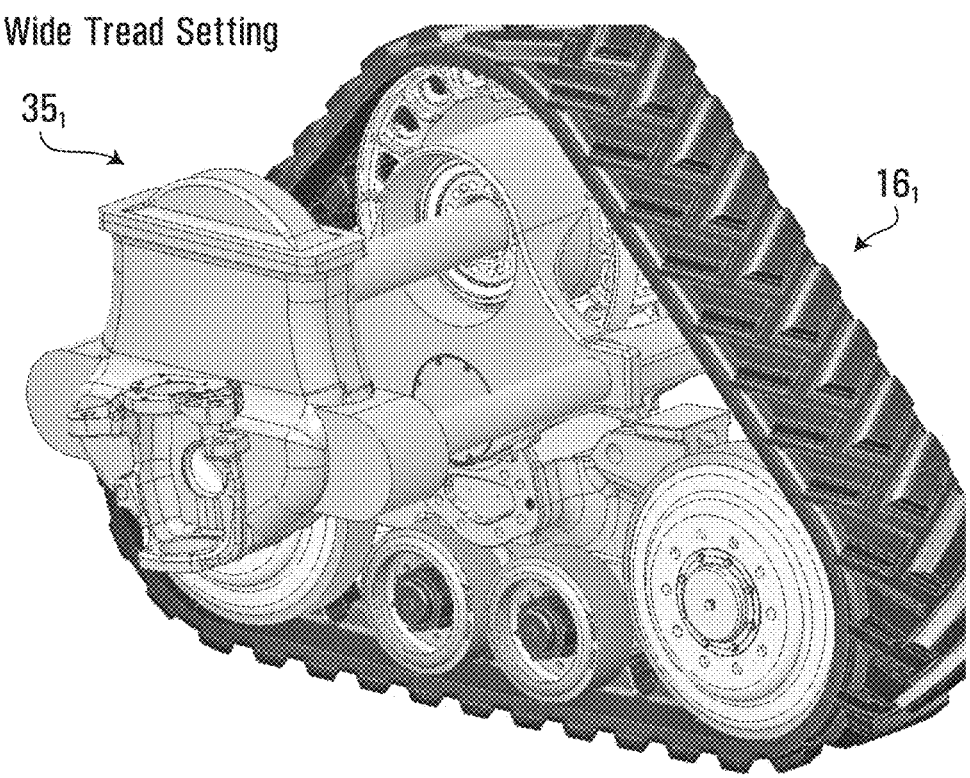

Alternatively, the user may adjust the spacing S of the track systems $16_1$, $16_2$ and/or the spacing S of the track systems $16_3$, $16_4$ to have a "wide" tread setting, as shown in FIG. 32. In the wide tread setting, the body 99 of the final drive units $35_1$, $35_2$ and/or the final drive units $35_3$, $35_4$ are relatively distant to their corresponding track systems $16_1$, $16_2$ and/or $16_3$, $16_4$. Moreover, in the wide tread setting, the final drive axle $56_i$ and the support arms $106_1$, $106_2$ of a respective final drive unit $35_i$ do not extend beyond the track 22 of the respective track system $16_i$ in the widthwise direction of the track system $16_i$. That is, the final drive axle $56_i$ and the support arms $106_1$, $106_2$ of a respective final drive unit $35_i$ do not extend outwardly of the laterally-outward edge 119 of the track 22.

The agricultural vehicle 10, including the track systems $16_1$-$16_4$, may be implemented in various other ways in other embodiments.

Figure 33:
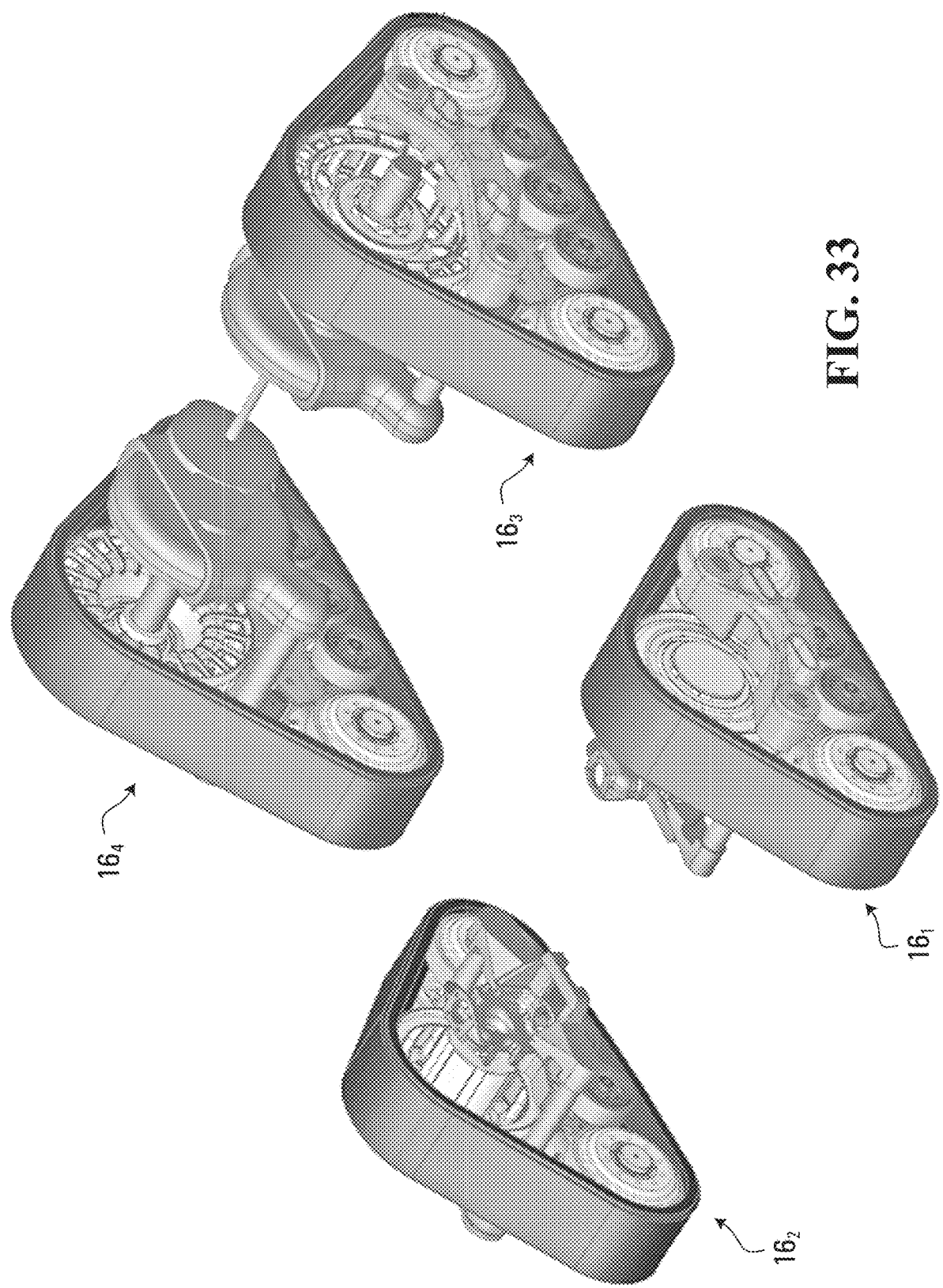
FIG. 33 shows the track systems according to another embodiment.
Figure 34:
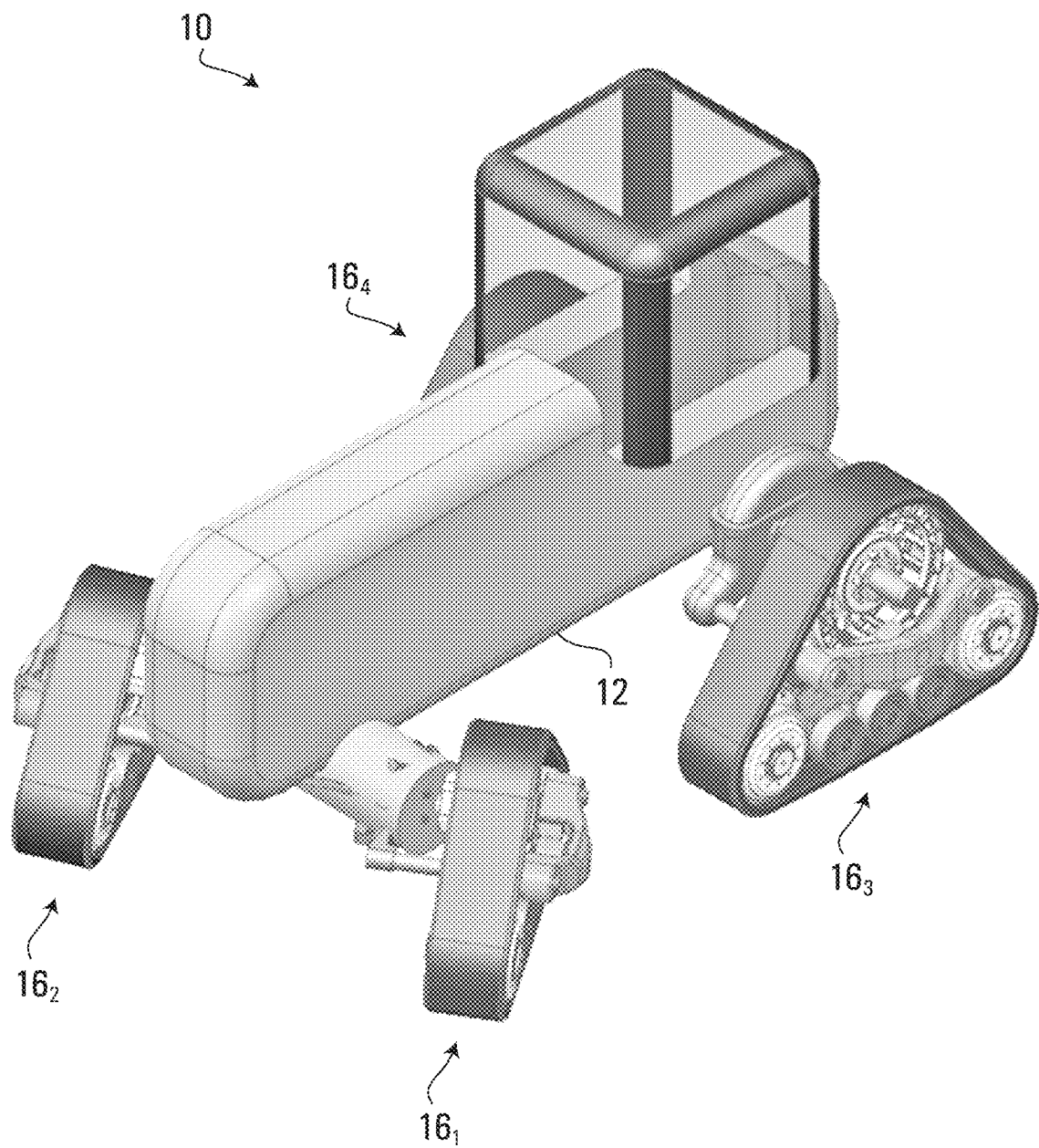
FIG. 34 shows the track systems of FIG. 33 mounted onto the agricultural vehicle as front ones of the track systems are steered.
Figure 35:
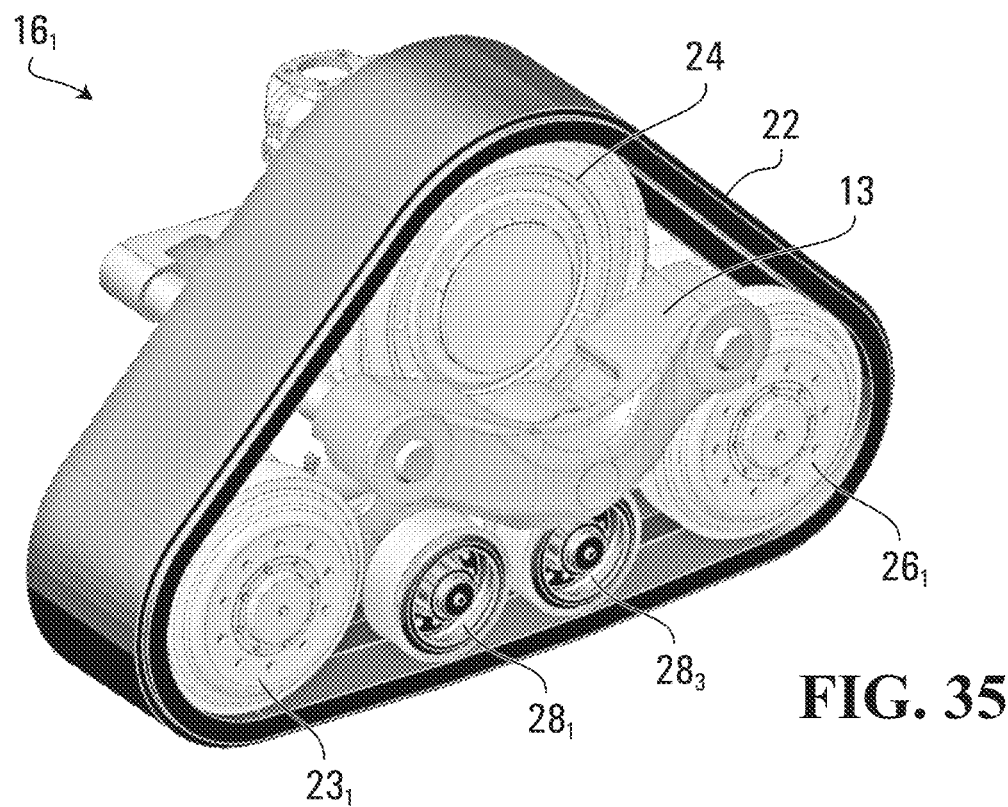
FIG. 35 shows a perspective view of a front one of the track systems of FIG. 33.

For instance, FIGS. 33 and 34 show an example of another embodiment of the track systems $16_1$-$16_4$. In this embodiment, the front ones of the track systems $16_1$-$16_4$ are implemented differently from the rear ones of the track systems $16_1$-$16_4$, but each of the track systems $16_1$-$16_4$ includes features as discussed above, including the lateral load distribution mechanism 150, the lateral track spacing adjustment mechanism 100, etc.

As shown in FIG. 34, the front track systems $16_1$, $16_2$ are steerable to change their orientation relative to the frame 12 of the vehicle 10 in order to steer the vehicle 10 on the ground. The front track system $16_1$ will be described, with an understanding that the front track system $16_2$ is similarly arranged.

In this embodiment, the drive wheel 24 of the track system $16_1$ is entirely supported by the final drive axle $56_i$ and is unsupported by the frame 13 of the track system $16_1$. All loading exerted by the drive wheel 24, including its weight, is transmitted through the final drive axle $56_i$, and thus is not transmitted through the frame 13 of the track system $16_1$. The tension of the track 22 is taken up by the drive wheel 24. The drive wheel 24 may thus be seen as a "floating" drive wheel in that it is unconnected to and isolated from the frame 13 of the track system $16_1$. To that end, in this embodiment, the drive wheel 24 is only (i.e., exclusively) supported by a rotatable support 202 that is rotatable by the final drive axle $56_i$. This is in contrast to the embodiment considered above in respect of FIGS. 4 to 7 and 27 to 32 in which the drive wheel 24 is supported by the nonrotatable support 125, namely the upper frame member 110, which transmits loading exerted by the drive wheel 24, including its weight, through the frame 13 of the track system $16_1$ and in which the tension of the track 22 is partly taken up by the upper frame member 110.

Figure 37:
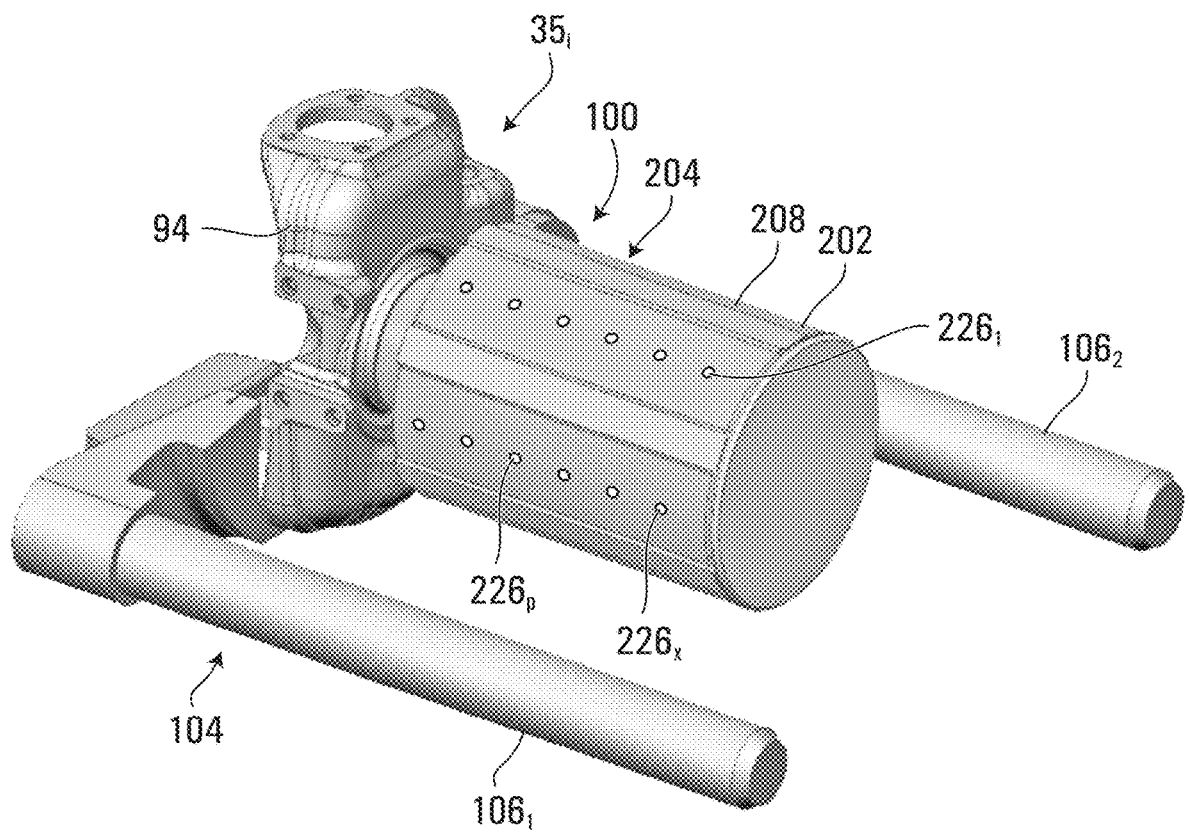
FIG. 37 shows a perspective view of a transmission and support arms connected to the track system of FIG. 35.
Figure 38:
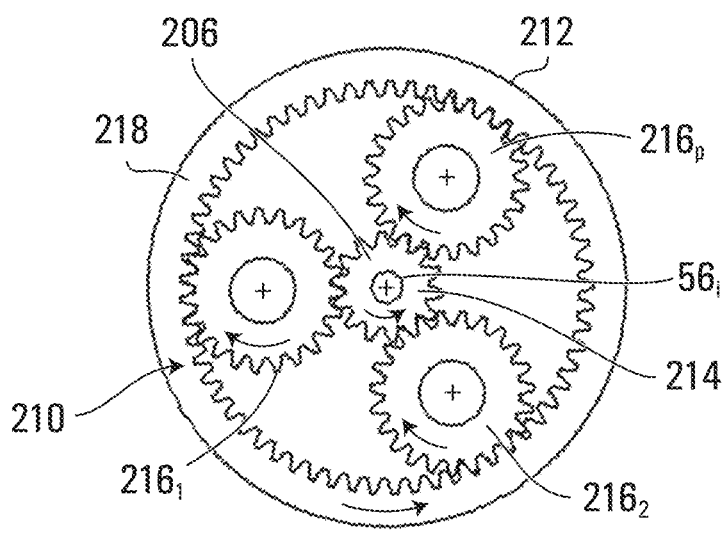
FIG. 38 shows gearing and a housing of the transmission of FIG. 37.

More particularly, in this embodiment, with additional reference to FIGS. 37 and 38, the final drive unit $35_1$ associated with the track system $16_1$ comprises a transmission 204 including an input 206 connected to the final drive axle $56_i$ and an output 208 which constitutes the rotatable support 202. In this example, the transmission 204 comprises gearing 210 and a housing 212 that houses the gearing 210. More specifically, in this case, the gearing 210 is planetary gearing including a sun gear 214, a plurality of planet gears $216_1$-$216_P$ and a ring gear 218. The sun gear 214 is coupled to the final drive axle $56_i$ in any suitable manner (e.g., via a key, a press-fit, a taper lock bushing, etc.) such as to cause the final drive axle $56_i$ to drive the sun gear 214. The planet gears $216_1$-$216_P$ are driven by the sun gear 214 and in turn drive the ring gear 218. The ring gear 218 is comprised by the housing 212 of the transmission 204 such that the planet gears $216_1$-$216_P$ drive the housing 212.

Figure 39:
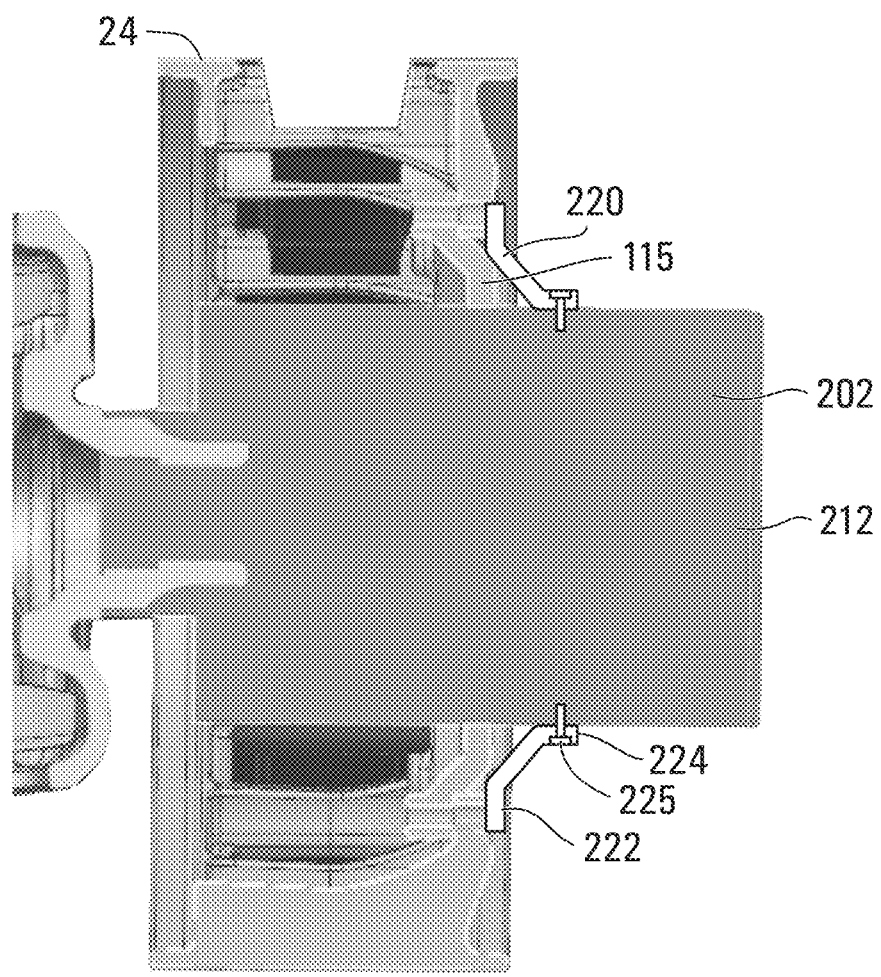
FIG. 39 shows a drive wheel of the track system of FIG. 35 coupled to the housing of the transmission.

The drive wheel 24 is mounted to the housing 212 so as to rotate with the housing 212. In this example of implementation, as shown in FIG. 39, the drive wheel 24 is mounted to the housing 212 via a connector 220 which is fastened to the housing 212 and to the drive wheel 24. In particular, in this example of implementation, the connector 220 is a generally circular member comprising a first flanged portion 222 and a second flanged portion 224. The first flanged portion 222 is fastened to the drive wheel 24 while the second flanged portion 224 is fastened to the drive wheel 24. The connector 220 is detachably fastened to the housing 212. That is, fastening of the connector 220 to the housing 212 is non-permanent (i.e., the connector 220 can also be unfastened from the housing 212). For example, the second flanged portion 224 of the connector 220 may be fastened to the housing 212 via fasteners 225 (e.g., bolts and/or nuts). To that end, in this example of implementation, as shown in FIG. 37, the housing 212 comprises a plurality of mounts $226_1$-$226_P$ (e.g., threaded holes) for receiving respective ones of the fasteners 225.

The connector 220 may be an integral part of the drive wheel 24 in some embodiments. That is, the connector 220 may be an extension of the drive wheel 24 such that the drive wheel 24 is fastened directly to the housing 212 of the transmission 204.

In this embodiment, the lateral track spacing adjustment mechanism 100 of the track system $16_1$ is configured such that the drive wheel 24, the idler wheels $23_1$, $23_2$, $26_1$, $26_2$, $28_1$-$28_4$, the frame 13, and the track 22 are movable relative to the transmission 204, the final drive axle $56_i$, and the support arms $106_1$, $106_2$ of the final drive unit $35_i$ in the widthwise direction of the track system $16_1$. More particularly, in this embodiment, the drive wheel 24 is movable relative to the transmission 204 and the final drive axle $56_i$ by sliding relative to the housing 212 of the transmission 204 in the widthwise direction of the track system $16_1$.

For instance, in this example, the drive wheel 24 is mounted onto the housing 212 by its hub 115 which defines an opening for receiving the housing 212. The mounts $226_1$-$226_P$ of the housing 212 are distributed along a length of the housing 212 (i.e., in the widthwise direction of the track system $16_i$) such as to form subsets of the mounts $226_1$-$226_P$ which are aligned with one another along the length of the housing 212. The drive wheel 24 is slidable relative to the housing 212 of the transmission 204 in the widthwise direction of the track system $16_1$ such as to align the connector 220 with a given subset of the mounts $226_1$-$226_P$. The drive wheel 24 is then fastened to the housing 212 via the connector 220 to the given subset of the mounts $226_1$-$226_P$ which imparts a fixed position to the drive wheel 24 relative to the transmission 204, the final drive axle $56_i$ and the support arms $106_1$, $106_2$ of the final drive unit $35_i$ in the widthwise direction of the track system $16_1$. If a different position of the drive wheel 24 is desired relative to the transmission 204, the final drive axle $56_i$ and the support arms $106_1$, $106_2$, the drive wheel 24 is unfastened from the housing 212, the connector 220 is aligned with a different subset of the mounts $226_1$-$226_P$ and the drive wheel 24 is fastened to the different subset of the mounts $226_1$-$226_P$. This allows the operator to adjust the spacing S of the track systems $16_1$, $16_2$ as shown in FIGS. 40 to 42. For example, the spacing S of the track systems $16_1$, $16_2$ can be adjusted to have the narrow tread setting (shown in FIG. 40), the wide tread setting (shown in FIG. 42), or a setting in between the narrow and wide tread settings (shown in FIG. 41). In this embodiment, in the narrow tread setting, the supports arms $106_1$, $106_2$ of the final drive unit $35_i$ extend beyond the track 22 in the widthwise direction of the track system $16_1$.

In this embodiment, the drive wheel 24 is thus not connected to the frame 13 of the track system $16_1$. Rather, the drive wheel 24 is movable independently from the frame 13 of the track system $16_1$ when installing the track system $16_1$ onto the vehicle 10. For instance, when installing the track system $16_1$ onto the vehicle 10, the drive wheel 24 may be placed on the final drive unit $35_i$ first and secured thereto at a desired tread setting, and then the frame 13, to which the idler wheels $23_1$, $23_2$, $26_1$, $26_2$, $28_1$-$28_4$ are mounted, may be placed on the final drive unit $35_i$, notably in engagement with the support arms $106_1$, $106_2$, and secured thereto.

Moreover, in this embodiment, the frame 13 of the track system $16_i$ comprises an upper frame member 230 for receiving the support arms $106_1$, $106_2$. In this embodiment, the upper frame member 230 is disposed on an outboard side of the track system $16_i$ (i.e., on a side of the drive wheel 24 away from the center 117 of the vehicle 10) and comprises a pivot 234 about which the lower frame member 114 of the frame 13 may pivot relative to the upper frame member 230. The upper frame member 230 comprises a retaining mechanism 232 for retaining the support arms $106_1$, $106_2$.

Figure 43:
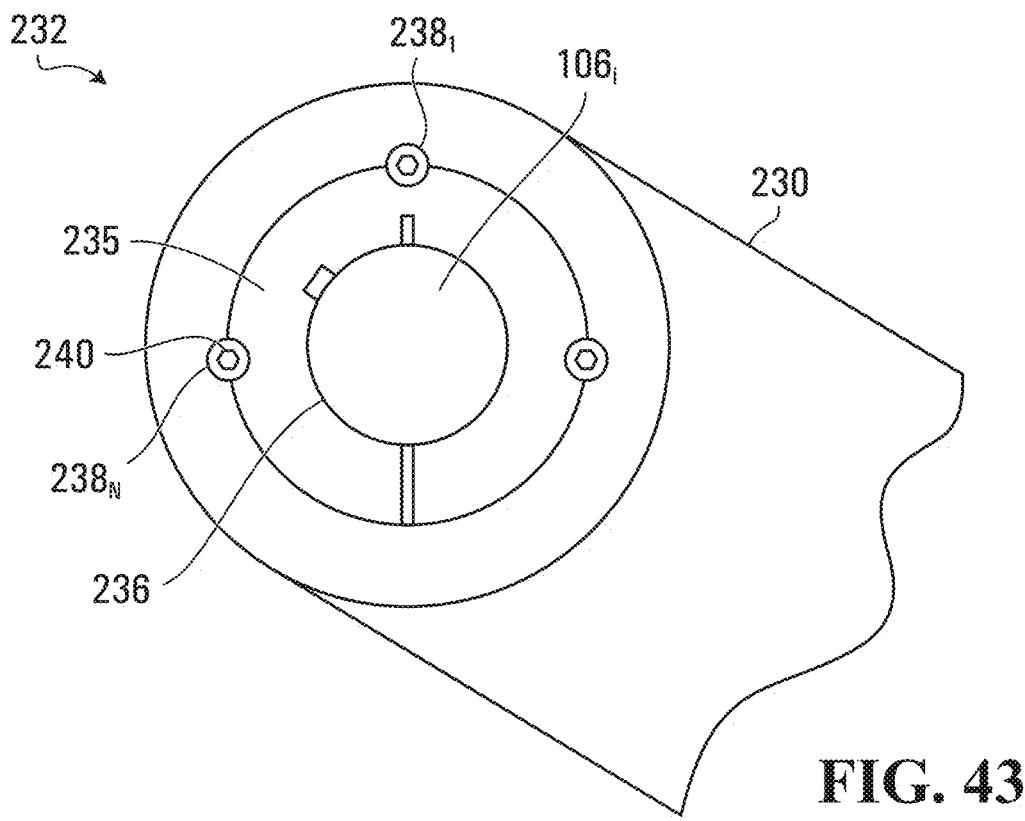
FIG. 43 shows an example of a retaining mechanism of an upper member of a frame of the track system of FIG. 35.

The retaining mechanism 232 may be implemented in various ways. In this embodiment, as shown in FIG. 43, the retaining mechanism 232 comprises a bushing 235 for receiving and retaining a respective one of the support arms $106_1$, $106_2$ therein. More specifically, the bushing 235 is a taper lock bushing comprising a central opening 236 in which the support arm $106_i$ is received and a plurality of adjustment openings $238_1$-$238_N$ on a periphery of the taper lock bushing 235 for receiving respective fasteners 240. As the fasteners 240 are engaged further into the adjustment openings $238_1$-$238_N$, the central opening 236 tightens around the support arm $106_i$. The retaining mechanism 232 comprises a taper lock bushing 235 for each of the support arms $106_1$, $106_2$.

The retaining member 135 described above with respect to the embodiment of FIGS. 4 to 7 and 27 to 32 may be configured in a similar manner to the retaining mechanism 232. The retaining mechanism 232 (or the retaining member 135) may retain the support arms $106_1$, $106_2$ in other ways in other embodiments.

Figure 44:
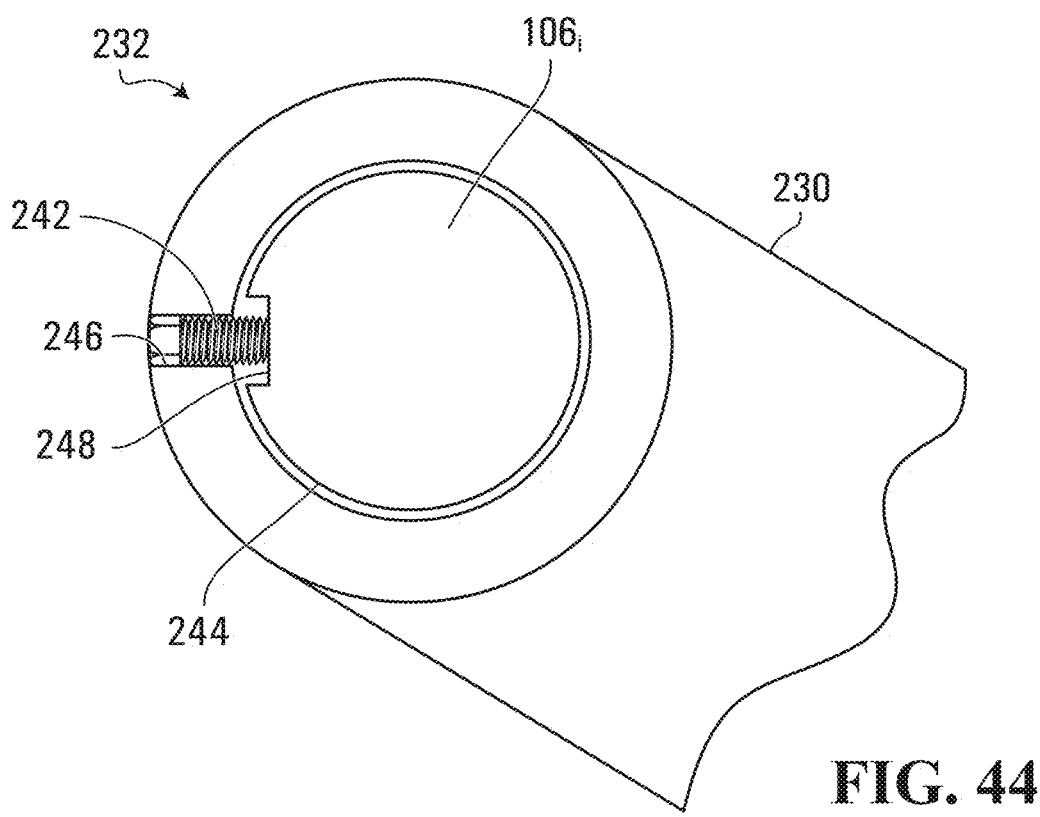
FIG. 44 shows another example of the retaining mechanism of FIG. 43.

For instance, in another embodiment, as shown in FIG. 44, the retaining mechanism 232 comprises one or more set screws 242 that engage a respective one of the support arms $106_1$, $106_2$. In particular, in such embodiments, the retaining mechanism 232 comprises an opening 244 in which a support arm $106_i$ is received and a set screw opening 246 generally transversal to the opening 244. The set screw opening 246 is configured to receive the set screw 242 and is therefore threaded accordingly. In this example of implementation, the support arm $106_i$ may have a flat 248 machined or otherwise formed onto its periphery to securely engage the set screw 242. It is noted that more set screws may be used (e.g., two or more set screws).

Figure 45:
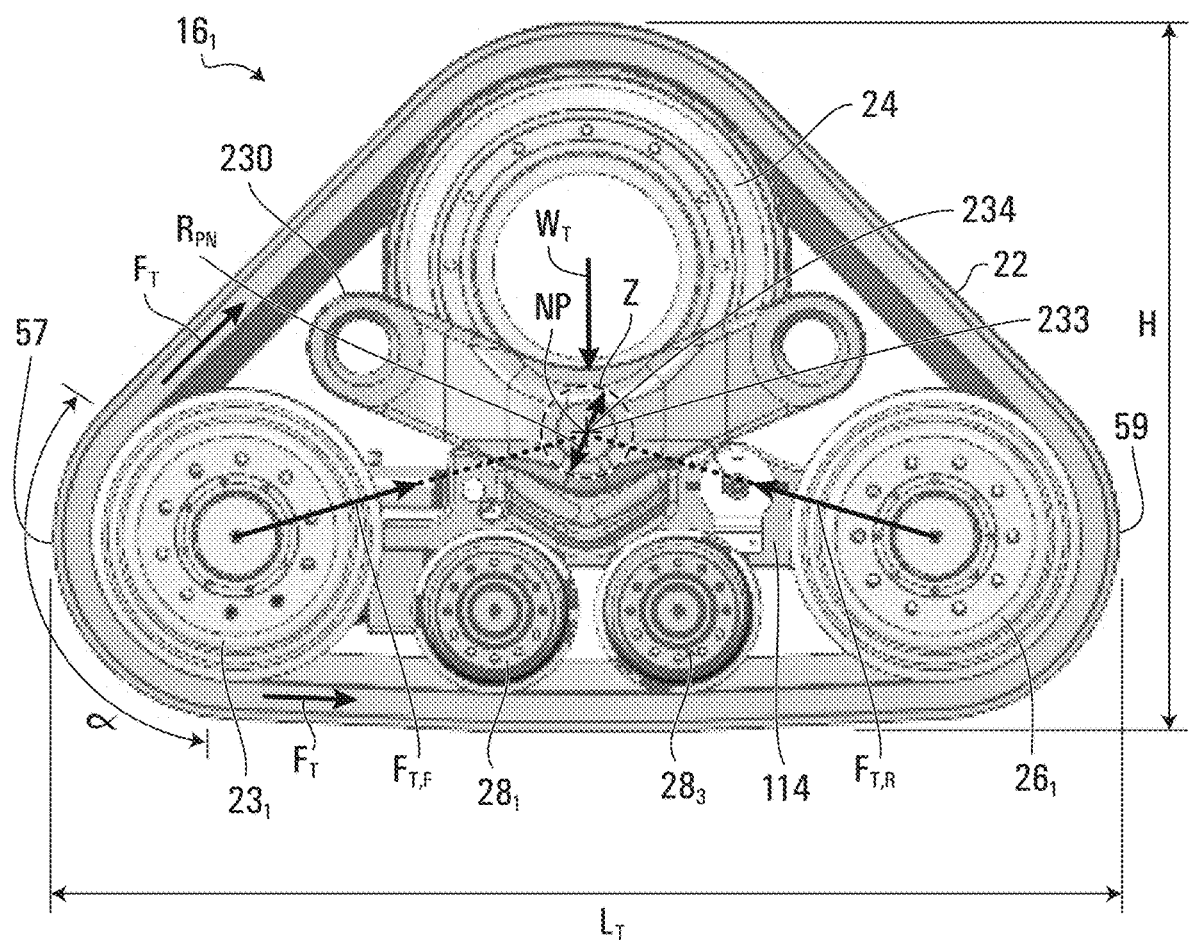
FIG. 45 shows a side elevation view of the track system of FIG. 35.

In this embodiment, as shown in FIG. 45, a pivot axis 233 of the pivot 234 of the upper frame member 230 of the track system $16_1$ is located at or close to a "neutral" position NP of the track system $16_1$ which lies at an intersection of a resultant tension force $F_{T,R}$ from the track 22 at the rear idler wheels $26_1$, $26_2$ and a resultant tension force $F_{T,F}$ from the track 22 at the front idler wheels $23_1$, $23_2$ when the track system $16_1$ is at rest (i.e., immobile). In this example, this neutral position NP is also intersected by a vertical load $W_T$ from the vehicle 10 applied by the final drive axle $56_i$. This may help to minimize generation of moments which tend to occur if and when the resultant tension forces $F_{T,F}$, $F_{T,R}$ and the load $W_T$ are not oriented to intersect the pivot 234 of the upper member 230. In that sense, the neutral position NP can be viewed as a "moment-neutralizing" position of the track system $16_1$. Each of the resultant tension forces $F_{T,F}$, $F_{T,R}$ is the sum of tension force components FT (not shown at the rear idler wheels $26_1$, $26_2$) exerted by the track 22 on respective ones of the front and rear idler wheels $23_1$, $23_2$, $26_1$, $26_2$. A line passing through the neutral position NP and the axis of rotation of the front idler wheels $23_1$, $23_2$ bisects an angle of wrap a of the track 22 on the front idler wheels $23_1$, $23_2$, and a line passing through the neutral position NP and the axis of rotation of the rear idler wheels $26_1$, $26_2$ bisects an angle of wrap of the track 22 on the rear idler wheels $26_1$, $26_2$.

More particularly, in this embodiment, the pivot axis 233 of the pivot 234 of the upper frame member 230 of the track system $16_1$ is located within a relatively small zone Z centered at the neutral position NP of the track system $16_1$. For instance, in some embodiments, a ratio $R_{PN}/H$ of a radius $R_{PN}$ of the relatively small zone Z centered at the neutral position NP of the track system $16_1$ in which the pivot 234 is located over the height H of the track system $16_i$ may be no more than 20%, in some cases no more than 15%, in some cases no more than 10%, in some cases no more than 5%, and in some cases even less.

In this example of implementation, the pivot axis 233 of the pivot 234 of the upper frame member 230 of the track system $16_1$ is located at the neutral position NP of the track system $16_1$, i.e., the ratio $R_{PN}/H$ of the radius $R_{PN}$ of the relatively small zone Z centered at the neutral position NP of the track system $16_1$ in which the pivot 234 is located over the height H of the track system $16_i$ is 0.

This neutral position of the pivot 234 at which the upper member 230 is pivotable relative to the lower member 114 may help minimize a tendency of having moments induced when the track system $16_1$ is propelled by the final drive unit $35_i$. Notably, when the track system $16_1$ is in motion (i.e., the track 22 is driven by the drive wheel 24), the traction exerted by the track 22 on the ground may result in a traction force component being complimentary to a given one of the resultant tension forces $F_{T,R}$, $F_{T,F}$. This will result in a sum of the given one of the resultant tension forces $F_{T,R}$, $F_{T,F}$ and the traction force component not being oriented to intersect the pivot 234 which in turn will cause a moment to be induced about the pivot 234. However, because the pivot 234 is at the neutral position NP, the moment that is induced may be minimal compared to a scenario where the pivot 234 would not be at the neutral position NP. This may be particularly important when the vehicle 10 is used to pull a heavy load (e.g., a work implement) from its drawbar (not shown).

Figure 36:
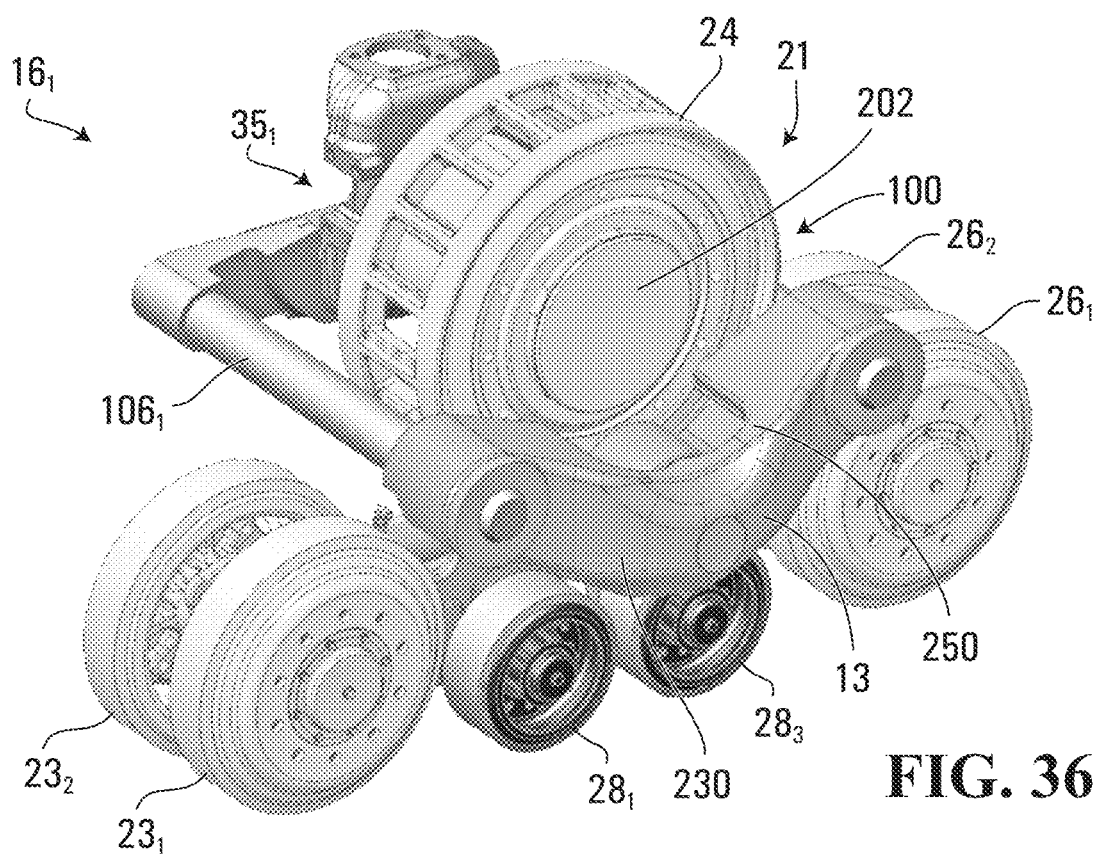
FIG. 36 shows a perspective view of a track-engaging assembly of the front one of the track systems of FIG. 35.
Figure 46:
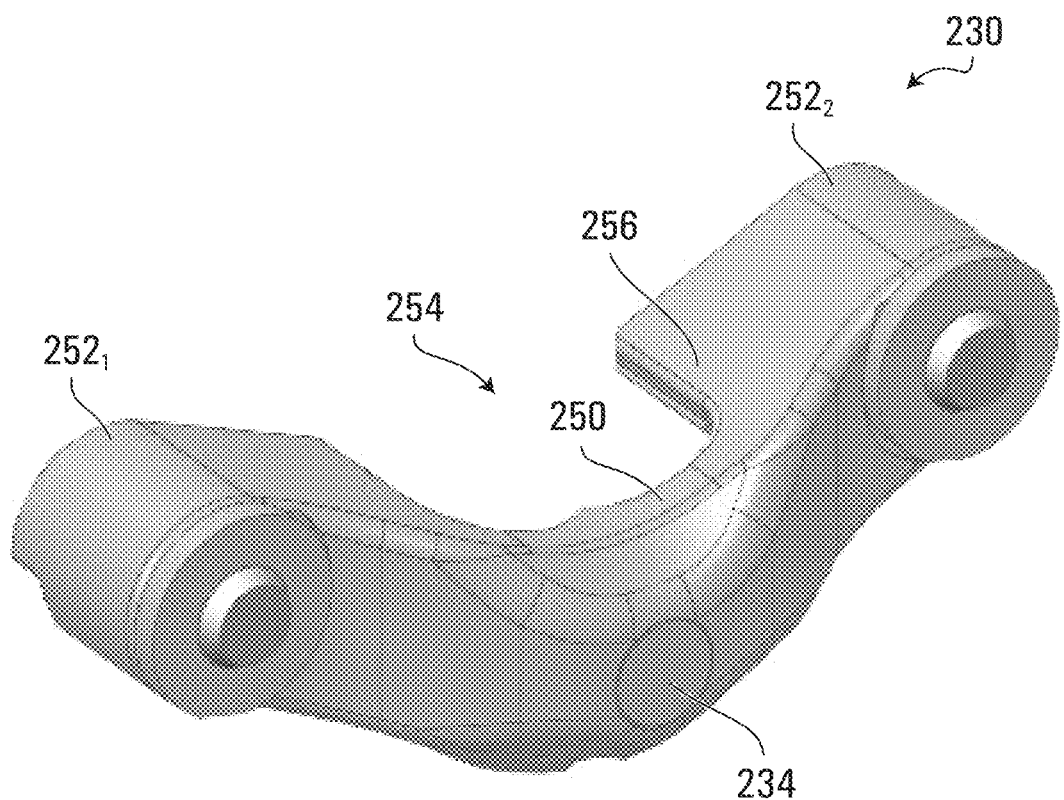
FIG. 46 shows a perspective view of the upper member of the frame of the track system of FIG. 35.

In this embodiment, as shown in FIGS. 36 and 46, the frame member 230 that is mounted to the support arms $106_1$, $106_2$ is shaped to clear the transmission 204. More particularly, in this embodiment, the frame member 230 is contoured to extend from the support arm $106_1$ to the support arm $106_2$ without interfering with the transmission 204. In this example, the frame member 230 includes a recess 250 that forms a depression to receive the transmission 204. More specifically, the frame member 230 comprises a pair of angled portions 2521, 2522 that form the recess 250 therebetween. The angled portions 2521, 2522 are oriented such as to define an obtuse angle therebetween and thus impart a V-shape to the frame member 230. Moreover, the frame member 230 comprises an opening 254 extending from a bottom surface of the frame member 230 (not shown) to a top surface 256 of the frame member 230. The opening 254 is configured to receive at least part of the lower member 114 of the frame 13.

In other words, the frame member 230 is designed geometrically such that an imaginary straight line run from centre to centre of the support arms $106_1$, $106_2$ would intersect the housing 212 of the transmission 204 to which the drive wheel 24 of the track system $16_i$ is mounted. The proposed arrangement, allows sliding the frame member 230 relative to the housing 212 of the transmission 204 without creating an interference at any one of the adjustment positions. During the adjustment process, the transmission 204 stays fixed relative to the frame 12 of the vehicle 10. It is noted that the length of the housing 212 of the transmission 204 determines the adjustment range of the track system $16_i$.

Figure 47B:
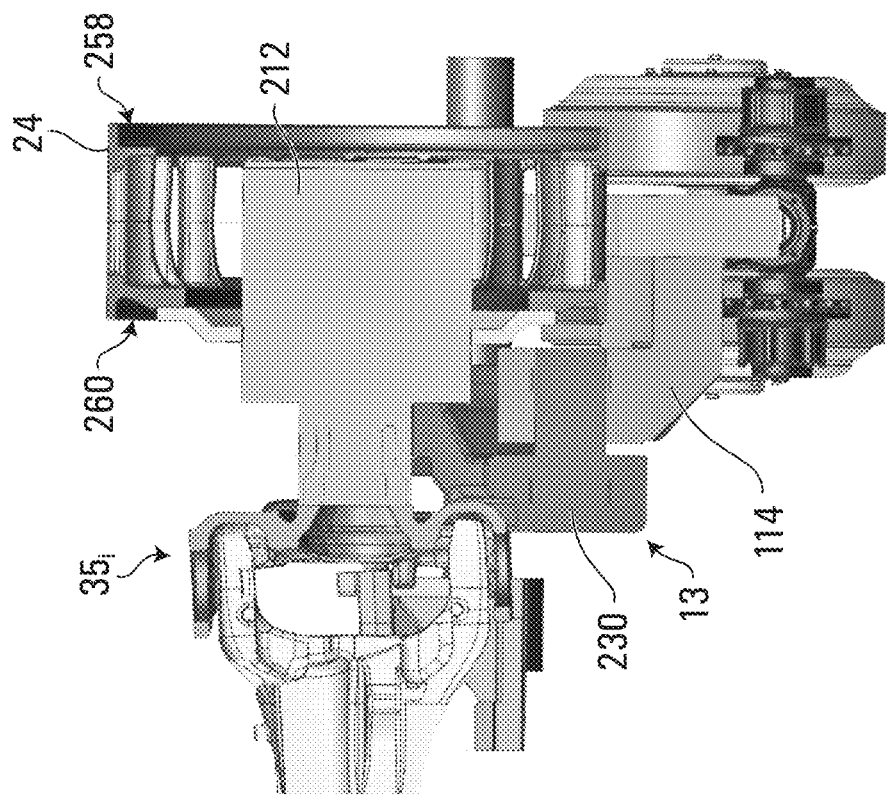
FIGS. 47A and 47B show cross-sectional views of the track system of FIG. 35 when the upper member of the frame is mounted on an outboard side and on an inboard side of the drive wheel, respectively.
Figure 47A:
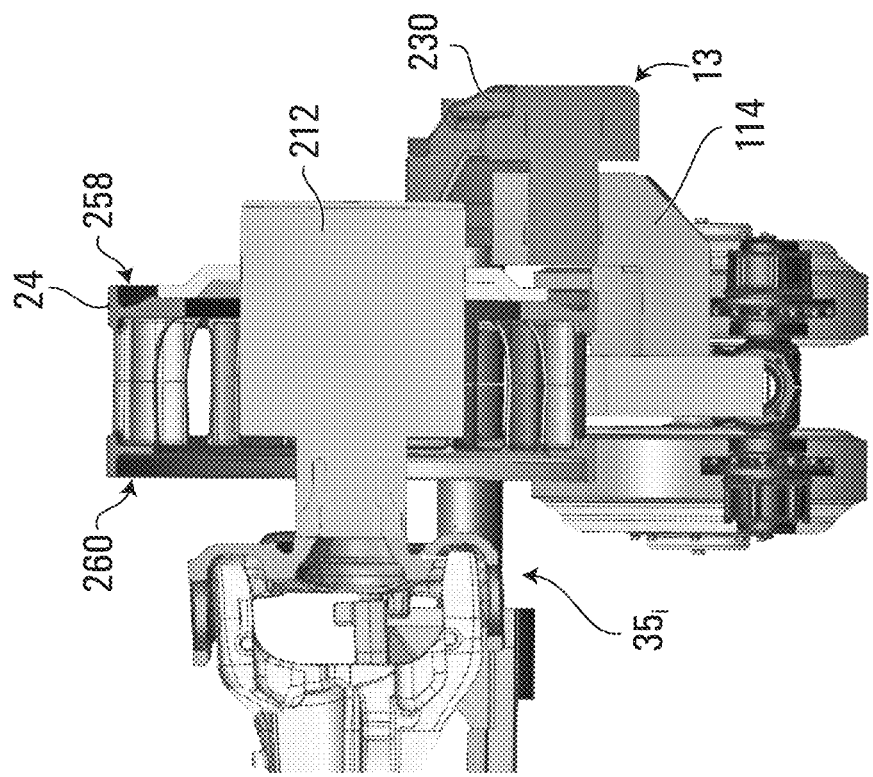

In this embodiment, the frame member 230 may be reversible to be mountable inboard or outboard relative to the drive wheel 24. More specifically, as shown in FIGS. 47A and 47B, the frame member 230 can be mounted on an outboard side 258 of the drive wheel 24 (i.e., a side of the drive wheel 24 furthest from its associated final drive unit $35_i$) or on an inboard side 260 of the drive wheel 24 (i.e., a side of the drive wheel 24 closest to its associated final drive unit $35_i$). This may allow a greater difference between the spacing S of the track systems $16_1$, $16_2$ in the narrow tread setting and in the wide tread setting as the drive wheel 24 can be mounted closer to or further from the final drive unit $35_i$ than if the frame member 230 were not reversible.

Figure 60:
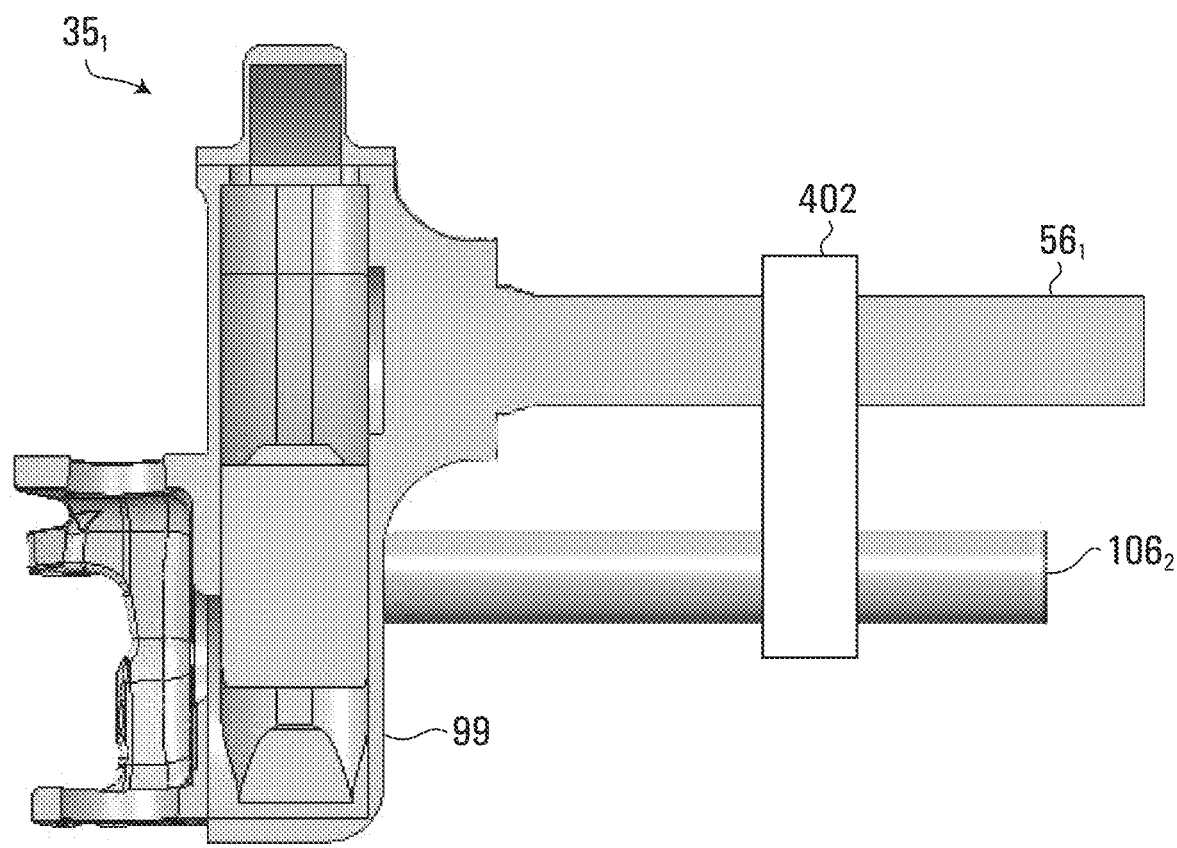
FIG. 60 shows an example of an embodiment in which the final drive unit is provided with a reinforcing support between a body of the final drive unit and the track system.
Figure 61:
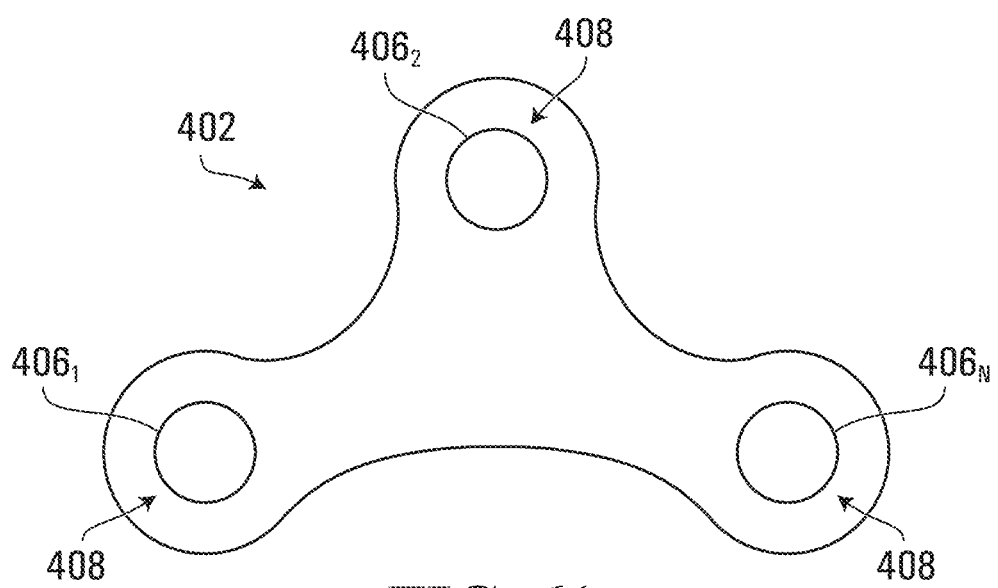
FIG. 61 shows a front view of the reinforcing support of FIG. 60.
Figure 62:
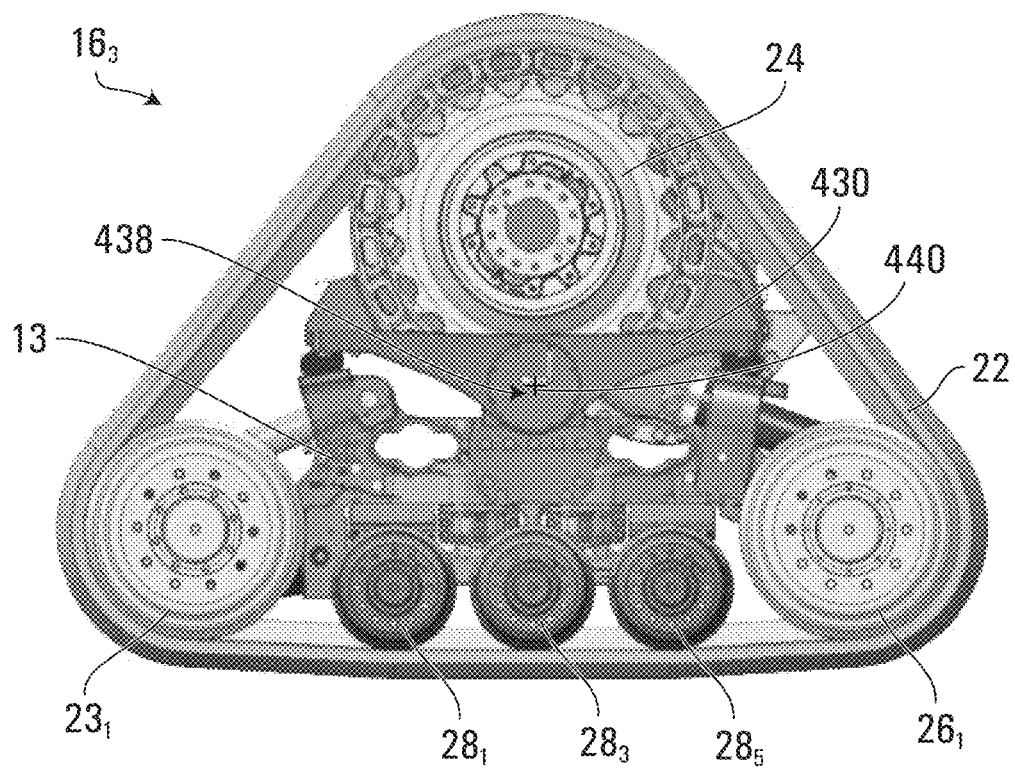
FIGS. 62 and 63 show a front and a rear view of an example of another embodiment of a rear track system.

Optionally, in some embodiments, as shown in FIGS. 60 and 61, the final drive unit $35_i$ may be provided with a reinforcing support 402 configured to reinforce the final drive unit $35_i$, notably its final drive axle $56_i$, from loads exerted by the drive wheel 24 of the track system $16_1$. The reinforcing support 402 is independent from the track system $16_1$, i.e., is not part of the track system $16_1$, and is disposed between the body 99 of the final drive unit $35_i$ and the drive wheel 24. In this embodiment, the reinforcing support 402 has a generally triangular shape and comprises a body 404 and a plurality of openings $406_1$-$406_N$ for receiving respective ones of the final drive axle $56_i$ and the support arms $106_1$, $106_2$. The reinforcing support 402 comprises a retaining mechanism 408 at each opening $406_1$ of the reinforcing support 402 for retaining a respective one of the final drive axle $56_i$ and the support arms $106_1$, $106_2$. The retaining mechanism 408 may be similar to the retaining mechanism 232 described above. For example, the retaining mechanism 408 may comprises a taper lock bushing, one or more set screws, or any other suitable retaining mechanism. The reinforcing support 402 may thus be mounted on the final drive unit $35_i$ prior to installing the track system $16_1$ on the final drive unit $35_i$. The reinforcing support 402 may help minimize bending loads applied on the final drive axle $56_i$ by the drive wheel 24 when it is unsupported by the frame 13 of the track system $16_1$.

The rear track systems $16_1$, $16_2$ are not steerable but rather their orientation relative to the frame 12 of the vehicle 10 is fixed. The rear track system $16_3$ will be described, with an understanding that the rear track system $16_4$ is similarly arranged.

Figure 48:
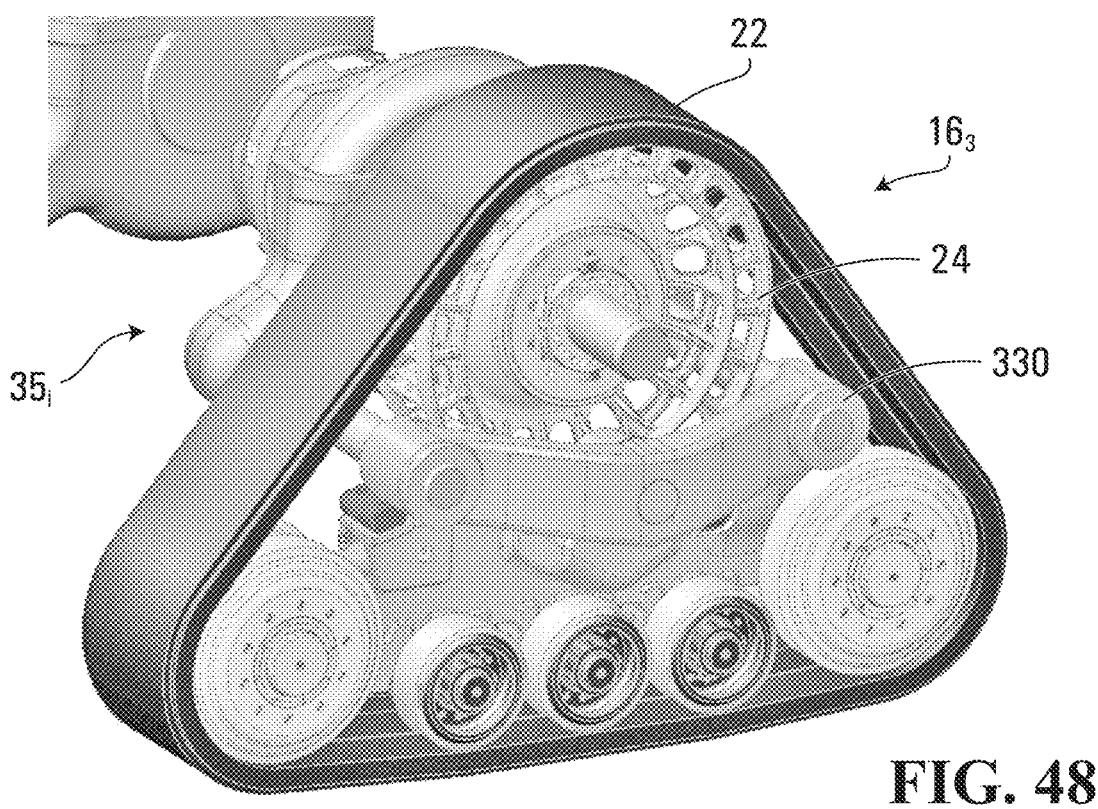
FIG. 48 shows a perspective view of a rear one of the track systems of FIG. 33.
Figure 49:
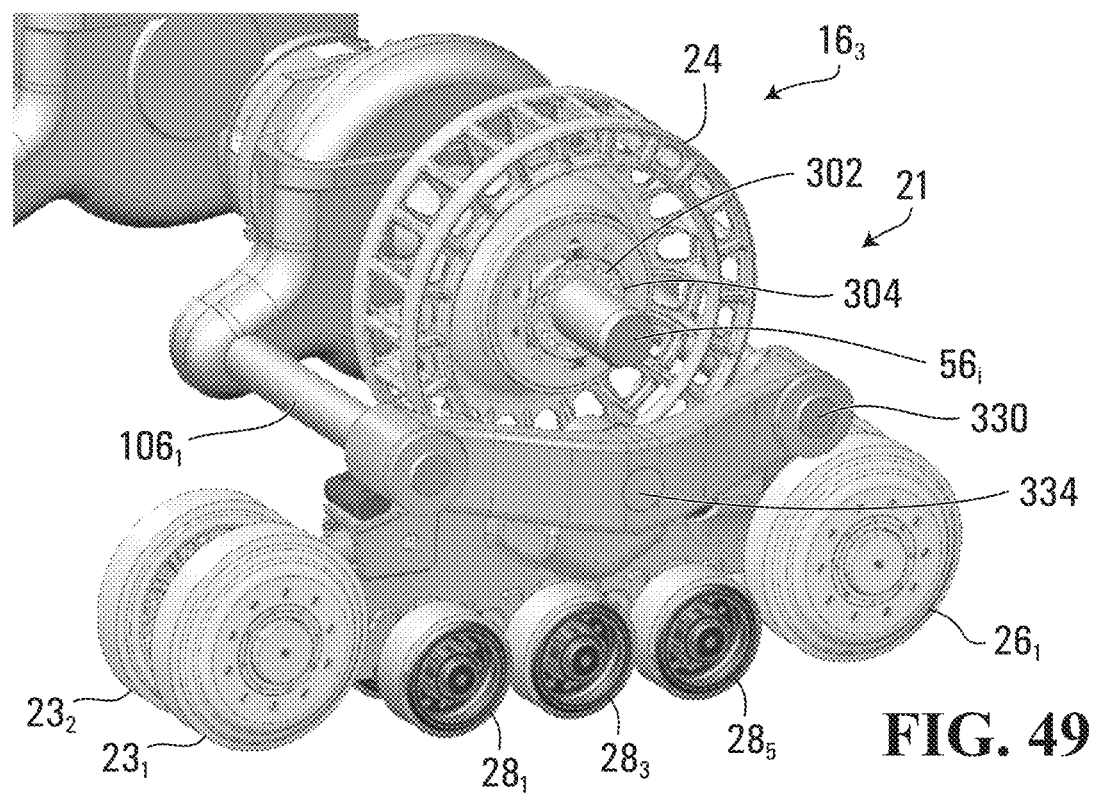
FIGS. 49 and 50 show front and rear perspective views of a track-engaging assembly of the track system of FIG. 48.
Figure 50:
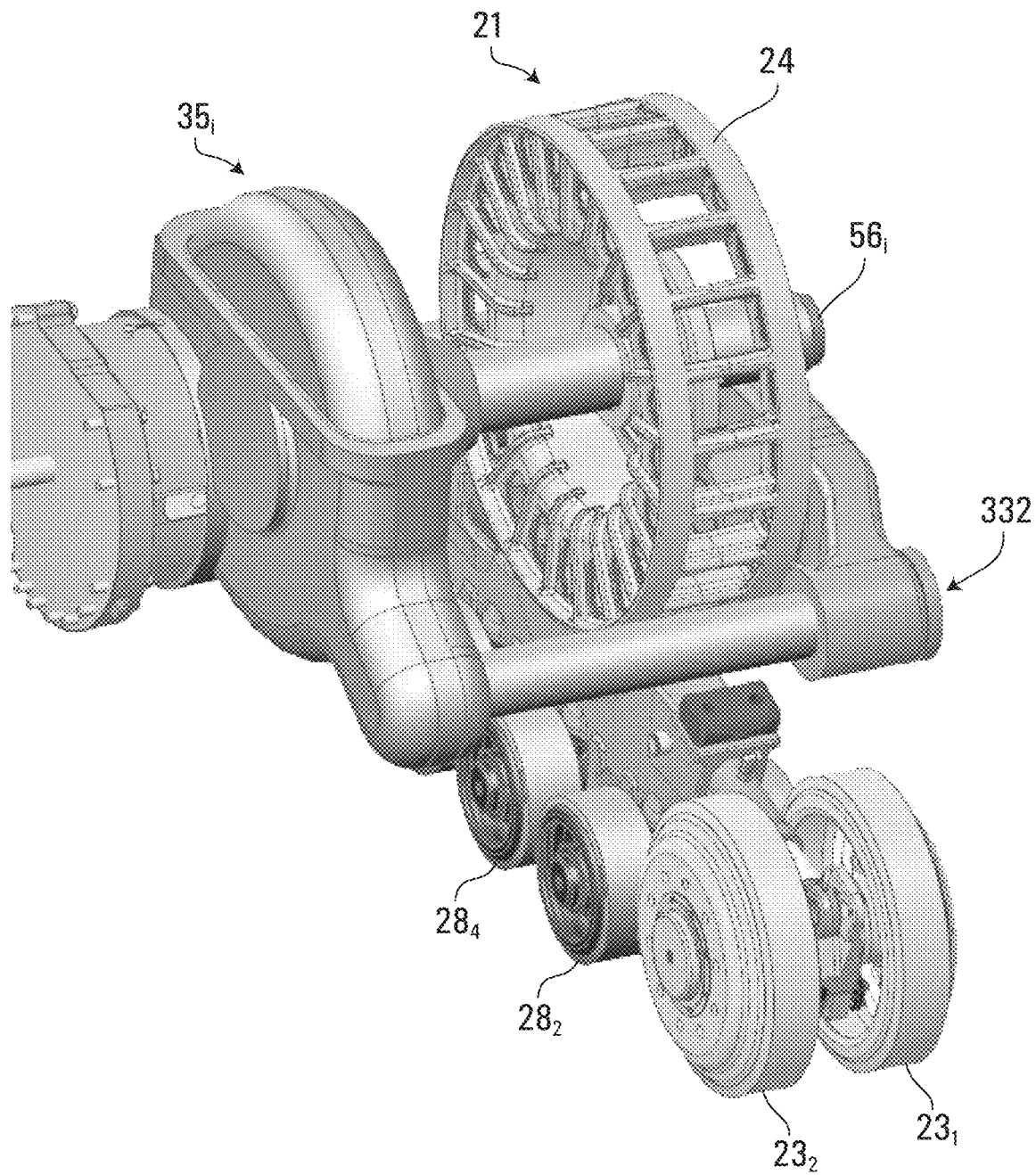
Figure 51:
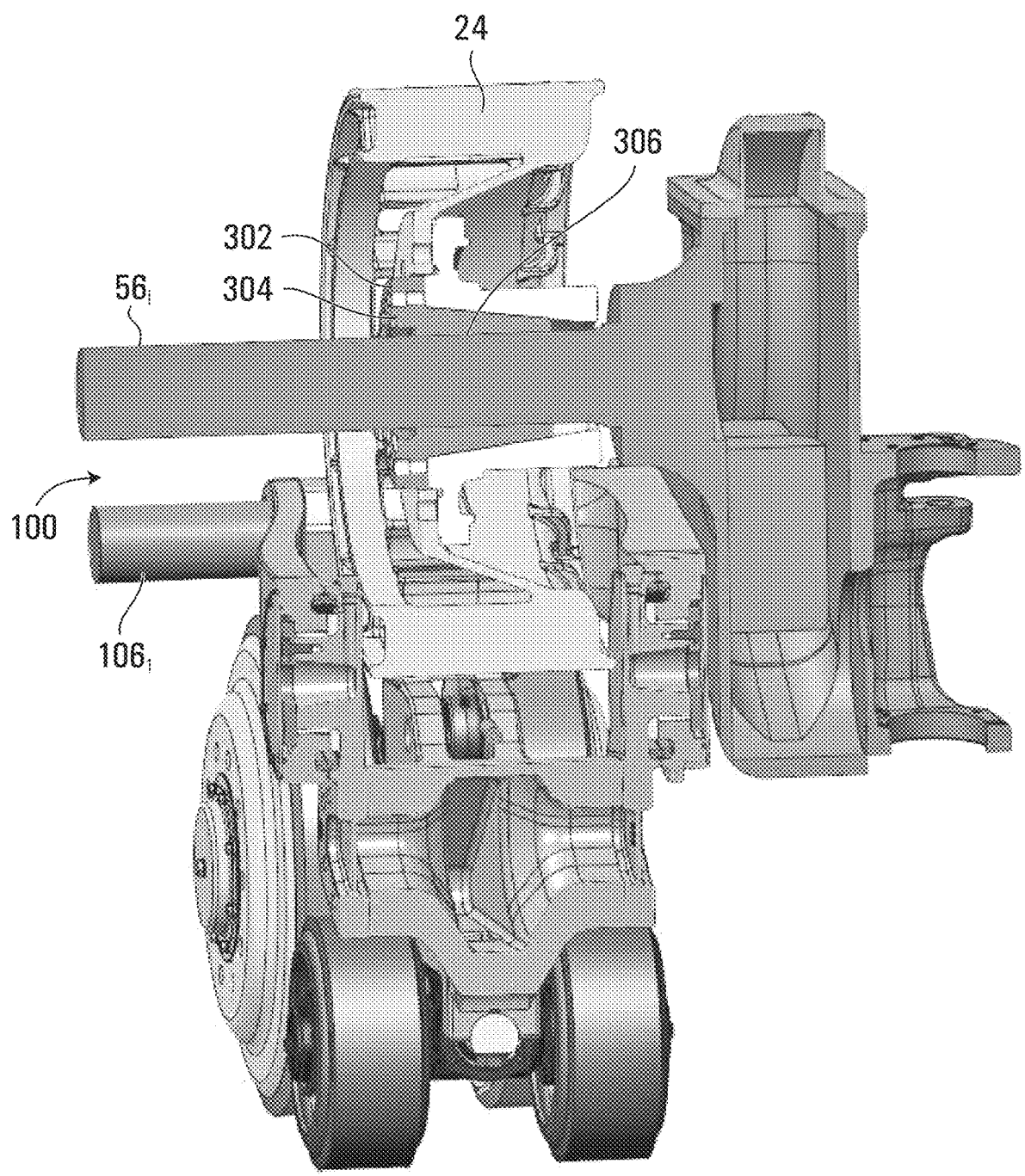
FIG. 51 shows a cross-sectional view of the track-engaging assembly of FIG. 49.

In this embodiment, with reference to FIGS. 48 and 49, the drive wheel 24 of the track system $16_3$ is entirely by the final drive axle $56_i$ and is unsupported by the frame 13 of the track system $16_3$. All loading exerted by the drive wheel 24, including its weight, is transmitted through the final drive axle $56_i$, and thus is not transmitted through the frame 13 of the track system $16_3$. The tension of the track 22 is taken up by the drive wheel 24. The drive wheel 24 may thus be seen as a "floating" drive wheel in that it is unconnected to and isolated from the frame 13 of the track system $16_3$. To that end, in this embodiment, the drive wheel 24 is only (i.e., exclusively) supported by a rotatable support 302 that is rotatable by the final drive axle $56_i$. This is in contrast to the embodiment considered above in respect of FIGS. 4 to 7 and 27 to 32 in which the drive wheel 24 is supported by the nonrotatable support 125, namely the upper member 110, which transmits loading exerted by the drive wheel 24, including its weight, through the frame 13 of the track system $16_3$ and in which the tension of the track 22 is partly taken up by the upper member 110.

More particularly, in this embodiment, the track system $16_3$ comprises a coupling 304 that couples the drive wheel 24 to the final drive axle $56_i$ so that the drive wheel 24 rotates with the final drive axle $56_i$, and the rotatable support 302 is constituted by the coupling 304. In this example, the coupling 304 comprises a bushing 306. For instance, in this case, the bushing 306 is a taper lock bushing similar to the taper lock bushing 122 described above. The drive wheel 24 is mounted to the final drive axle $56_i$ via the bushing 306 such as to rotate with the bushing 306. More specifically, in this embodiment, tightening of fasteners of the taper lock bushing 306 causes an opening of the taper lock bushing 306, which is configured to receive the final drive axle $56_i$, to shrink. This prevents movement of the final drive axle $56_i$ relative to the taper lock bushing 306. Conversely, loosening of the fasteners of the taper lock bushing 306 causes the opening of the taper lock bushing 306 to expand and therefore allow relative movement of the final drive axle $56_i$ relative to the taper lock bushing 306.

In this embodiment, the lateral track spacing adjustment mechanism 100 of the track system $16_3$ is configured such that the drive wheel 24, the idler wheels $23_1$, $23_2$, $26_1$, $26_2$, $28_1$-$28_6$, the frame 13, and the track 22 are movable relative to the final drive axle $56_i$ and the support arms $106_1$, $106_2$ of the final drive unit $35_i$ in the widthwise direction of the track system $16_3$. More particularly, in this embodiment, the drive wheel 24 is movable relative to the final drive axle $56_i$ by sliding relative to the final drive axle $56_i$ in the widthwise direction of the track system $16_3$.

Figure 53:
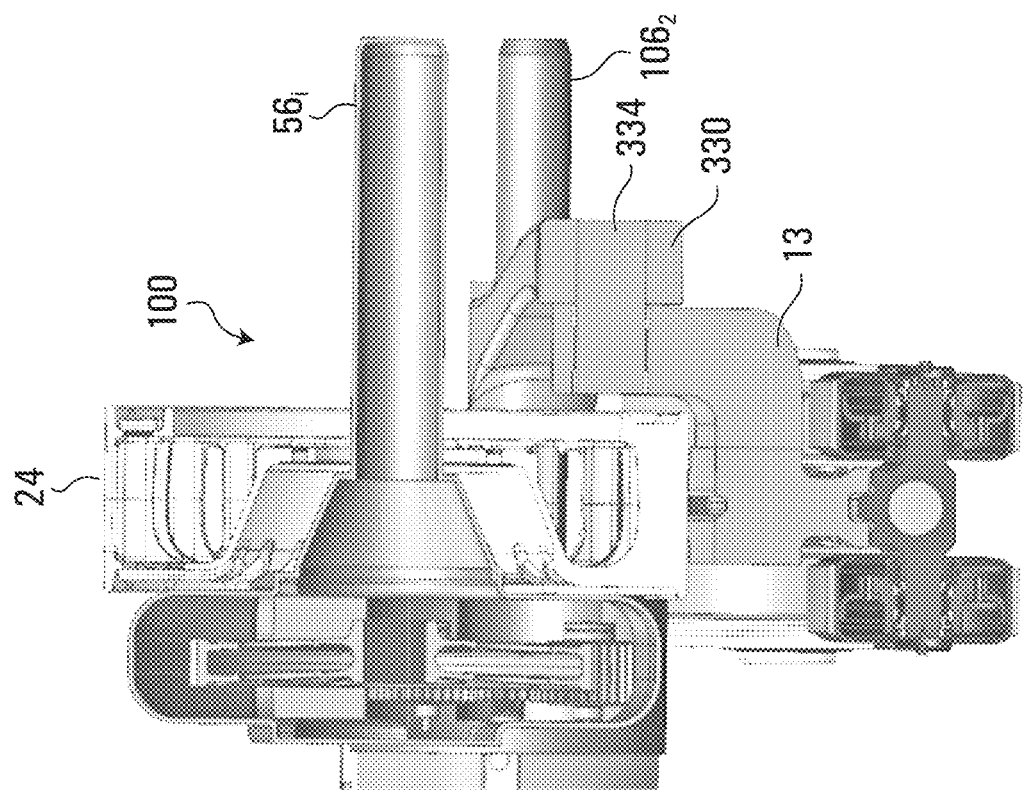
FIGS. 52 and 53 show cross-sectional views of the track-engaging assembly of FIG. 49 when adjusted at different positions relative to the final drive unit of the powertrain of the agricultural vehicle.
Figure 52:
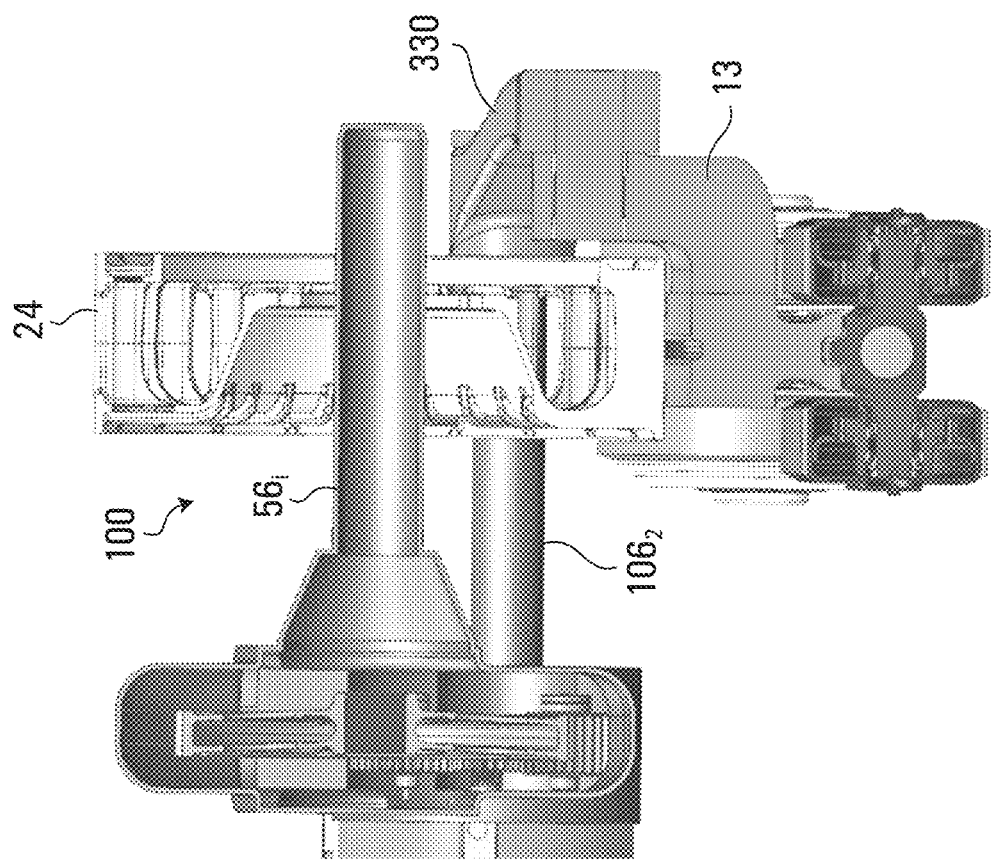

For instance, in this example, the drive wheel 24 is mounted onto the final drive axle $56_i$ via the bushing 306. Prior to adjusting the fasteners of the bushing 306, the drive wheel 24 is slidable along the length of the final drive axle $56_i$ in the widthwise direction of the track system 163. Once the drive wheel 24 is set at a desired position relative to the final drive axle $56_i$ and the support arms $106_1$, $106_2$, the drive wheel 24 is secured to the final drive axle $56_i$ by securing the fasteners of the bushing 306 which then retains the final drive axle $56_i$. If a different position of the drive wheel 24 is desired relative to the final drive axle $56_i$ and the support arms $106_1$, $106_2$, the fasteners of the bushing 306 are unfastened such as to loosen the hold of the bushing 306 onto the final drive axle $56_i$, and the drive wheel 24 is secured to the final drive axle $56_i$ at the different position. This allows the operator to adjust the spacing S of the track systems $16_3$, $16_4$ as shown in FIGS. 52 and 53. For example, the spacing S of the track systems $16_3$, $16_4$ can be adjusted to have the narrow tread setting (shown in FIG. 52), the wide tread setting (shown in FIG. 53), or a setting in between the narrow and wide tread settings. In this embodiment, in the narrow tread setting, the support arms $106_1$, $106_2$ of the final drive unit $35_i$ extend beyond the track 22 in the widthwise direction of the track system $16_3$.

In this embodiment, the drive wheel 24 is not connected to the frame 13 of the track system $16_3$. Rather, the drive wheel 24 is movable independently from the frame 13 of the track system $16_3$ when installing the track system $16_3$ onto the vehicle 10. For instance, when installing the track system $16_3$ onto the vehicle 10, the drive wheel 24 may be placed on the final drive unit $35_i$ first and secured thereto at a desired tread setting, and then the frame 13, to which the idler wheels $23_1$, $23_2$, $26_1$, $26_2$, $28_1$-$28_6$ are mounted, may be placed on the final drive unit $35_i$, notably in engagement with the support arms $106_1$, $106_2$, and secured thereto.

Moreover, in this embodiment, the frame 13 of the track system $16_i$ comprises an upper frame member 330 for receiving the support arms $106_1$, $106_2$. In this embodiment, the upper frame member 330 is disposed on an outboard side of the track system $16_i$ (i.e., on a side of the drive wheel 24 away from the center 117 of the vehicle 10) and comprises a pivot 334 about which the lower frame member 114 of the frame 13 may pivot relative to the upper frame member 330. The upper frame member 330 comprises a retaining mechanism 332 for retaining the support arms $106_1$, $106_2$. The retaining mechanism 332 may be implemented similarly to the retaining mechanism 232 described above.

Similarly to the track system $16_1$ described above in respect of FIG. 45, in this embodiment, the pivot 334 of the upper frame member 330 of the track system $16_3$ is located at or close to the neutral position NP of the track system $16_1$ which lies at an intersection of the resultant tension force $F_{T,R}$ from the track 22 at the rear idler wheels $26_1$, $26_2$ and the resultant tension force $F_{T,F}$ from the track 22 at the front idler wheels $23_1$, $23_2$ when the track system $16_3$ is at rest (i.e., immobile). In this example, this neutral position NP is also intersected by a vertical load $W_T$ from the vehicle 10 applied by the final drive axle $56_i$. This may help minimize generation of moments which tend to occur when the resultant tension forces $F_{T,F}$, $F_{T,R}$ and the load $W_T$ are not oriented to intersect the pivot 334 of the upper member 330. A line passing through the neutral position NP and the axis of rotation of the front idler wheels $23_1$, $23_2$ bisects the angle of wrap a of the track 22 on the front idler wheels $23_1$, $23_2$, and a line passing through the neutral position NP and the axis of rotation of the rear idler wheels $26_1$, $26_2$ bisects the angle of wrap of the track 22 on the rear idler wheels $26_1$, $26_2$.

More particularly, in this embodiment, the pivot 334 of the upper frame member 330 of the track system $16_3$ is located within the relatively small zone Z centered at the neutral position NP of the track system $16_3$. For instance, in some embodiments, a ratio $R_{PN}/H$ of the radius $R_{PN}$ of the relatively small zone Z centered at the neutral position NP of the track system $16_3$ in which the pivot 334 is located over the height H of the track system $16_3$ may be no more than 20%, in some cases no more than 15%, in some cases no more than 10%, in some cases no more than 5%, and in some cases even less.

In this example of implementation, the pivot 334 of the upper frame member 330 of the track system $16_1$ is located at the neutral position NP of the track system $16_3$, i.e., the ratio $R_{PN}/H$ of the radius $R_{PN}$ of the relatively small zone Z centered at the neutral position NP of the track system $16_1$ in which the pivot 234 is located over the height H of the track system $16_i$ is 0.

This neutral position of the pivot 334 at which the upper member 330 is pivotable relative to the lower member 114 may help minimize a tendency of having moments induced when the track system $16_3$ is propelled by the final drive unit $35_i$. Notably, when the track system $16_1$ is in motion (i.e., the track 22 is driven by the drive wheel 24), the traction exerted by the track 22 on the ground may result in a traction force component that is complimentary to a given one of the resultant tension forces $F_{T,R}$, $F_{T,F}$. This will result in a sum of the given one of the resultant tension forces $F_{T,R}$, $F_{T,F}$ and the traction force component not being oriented to intersect the pivot 334 which in turn will cause a moment to be induced about the pivot 334. However, because the pivot 334 is at the neutral position NP, the moment that is induced may be minimal compared to a scenario where the pivot 334 would not be at the neutral position NP. This may be particularly important when the vehicle 10 is used to pull a heavy load (e.g., a work implement) from its drawbar (not shown).

In this embodiment, the frame member 330 may be reversible to be mountable inboard or outboard relative to the drive wheel 24. More specifically, the frame member 330 can be mounted on the outboard side 258 of the drive wheel 24 or on the inboard side 260 of the drive wheel 24. This may allow a greater difference between the spacing S of the track systems $16_3$, $16_4$ in the narrow tread setting and in the wide tread setting as the drive wheel 24 can be mounted closer to or further from the final drive unit $35_i$ than if the frame member 330 were not reversible.

As described above, optionally, the final drive unit $35_i$ may be provided with the reinforcing support 402 that can be disposed between the body 99 of the final drive unit $35_i$ and the drive wheel 24 of the track system $16_3$.

Figure 54:
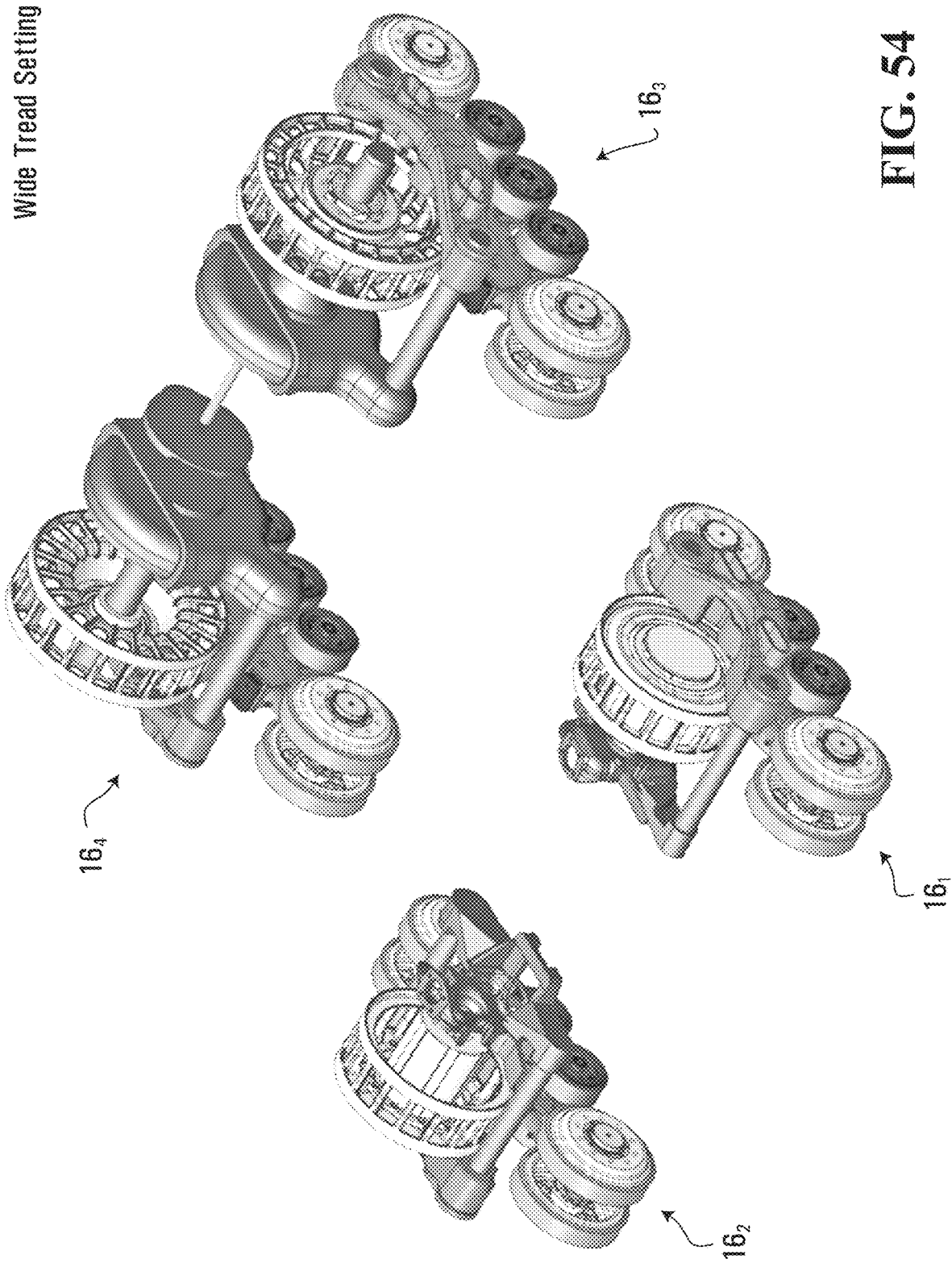
FIGS. 54 and 55 shows the track systems of FIG. 33 in the wide tread setting and the narrow tread setting, respectively.
Figure 55:
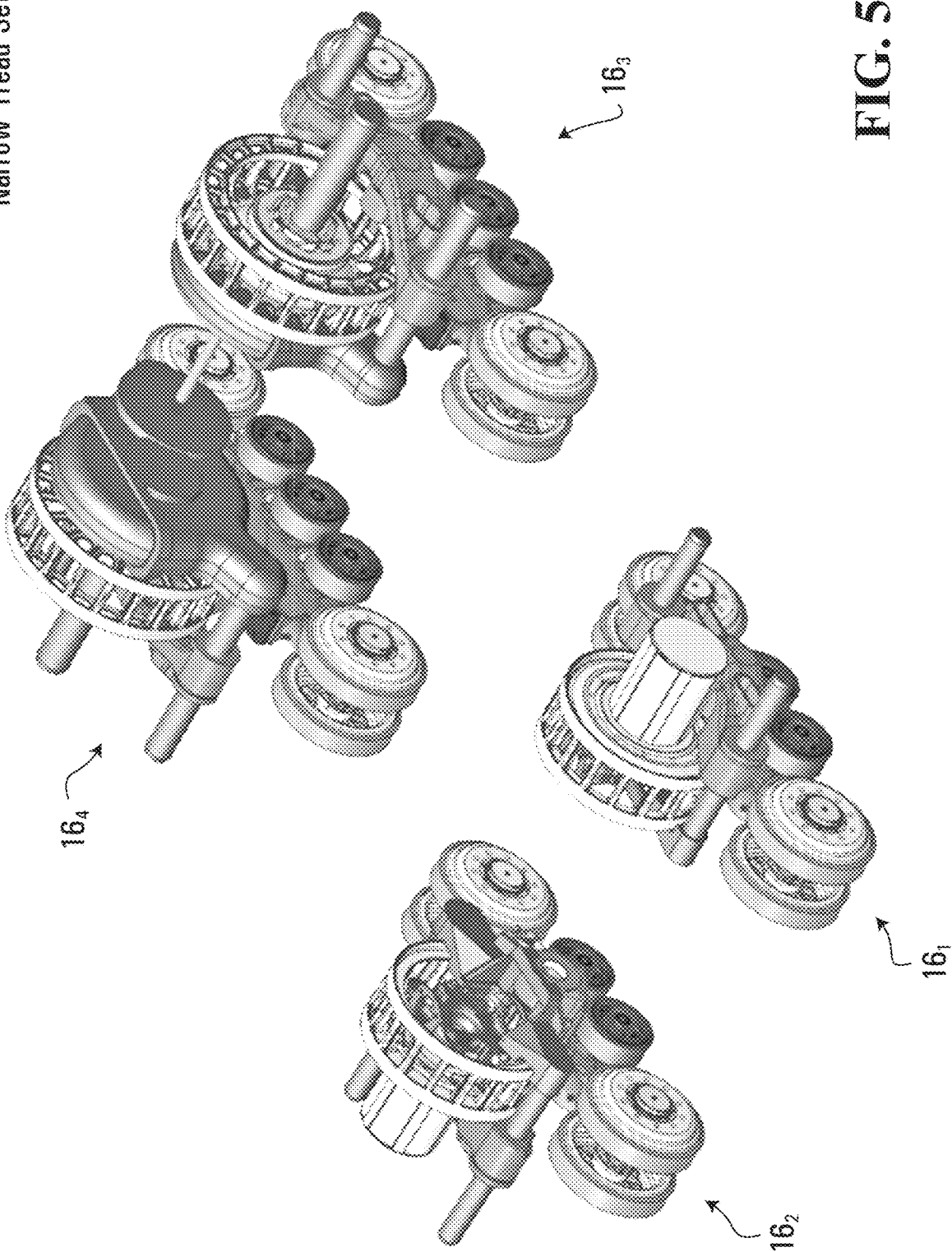

Thus, in this embodiment, as shown in FIGS. 54 and 55 the lateral track spacing adjustment mechanism 100 of a respective one of the track systems $16_1$-$16_4$ allows the spacing S between the track systems $16_1$, $16_2$ and the track systems $16_3$, $16_4$ to be adjusted from the narrow tread setting to the wide tread setting as desired.

For instance, FIGS. 62 to 75 show an example of another embodiment of the track systems $16_1$-$16_4$. In this embodiment, the front ones of the track systems $16_1$-$16_4$ are implemented differently from the rear ones of the track systems $16_1$-$16_4$, but each of the track systems $16_1$-$16_4$ includes features as discussed above, including the lateral load distribution mechanism 150, the lateral track spacing adjustment mechanism 100, etc.

The rear track system $16_3$ will be described, with an understanding that the rear track system $16_4$ is similarly arranged.

In this embodiment, the track system $16_3$ comprises a movable joint 410 that is located inboard of the drive wheel 24 and allows the frame 13 of the track system $16_3$ to move relative to the frame 12 of the vehicle 10 when travelling on an uneven terrain. The movable joint 410 is located inboard of the drive wheel 24 in that it is located between the drive wheel 24 and the center 117 of the vehicle 10 in the widthwise direction of the vehicle 10. This may help to allow better (e.g., narrower) adjustments of the spacing S of the track systems $16_3$, $16_4$.

More particularly, in this embodiment, the movable joint 410 comprises a pivot 412 allowing the frame 13 of the track system $16_3$ to pivot relative to the frame 12 of the vehicle 10 when travelling on the uneven terrain. The frame 13 of the track system $16_3$ may thus pivot relative to the frame 12 of the vehicle 10 about a pivot axis 414 of the pivot 412 to accommodate the uneven terrain.

In this embodiment, the pivot 412 comprises an axle 420 and a support 421 carrying the axle 420. The support 421 comprises a first body portion 416 and a second body portion 418 that is rotatable relative to the first body portion 416. The first and second body portions 416, 418 of the support 421 are mounted to the axle 420 via respective openings configured for receiving the axle 420. In this example of implementation, the first body portion 416 is fixedly mounted to the axle 420 such that the first body portion 416 is not rotatable relative to the axle 420. This may be achieved by mounting the first body portion 416 onto the axle 420 via a press-fit or in any other suitable way. Contrary to the first body portion 416, the second body portion 418 is rotatably mounted to the axle 420 such that the second body portion 418 is rotatable relative to the axle 420. This may be achieved by disposing a bearing between the second body portion 418 and the axle 420. It is noted that a similar result may be obtained if the first body portion 416 is rotatably mounted to the axle 420 while the second body portion 418 is fixedly mounted to the axle 420.

The pivot 412 is configured to be associated with the final drive unit $35_3$ of the powertrain 15. Notably, the pivot 412 is configured to be attached to the final drive unit $35_3$ such that the support 421 of the pivot 412 is mounted to the final drive unit $35_3$. In this example of implementation, the pivot 412 configured to be located beneath the final drive unit $35_3$ such as by being fastened to the final drive unit $35_3$ by a plurality of fasteners $422_1$-$422_F$ between the pivot 412 and a housing 415 of the transmission 72. The fasteners $422_1$-$422_F$ engage openings $424_1$-$424_A$ of the first body portion 416 of the support 421 and respective openings (not shown) of the housing 415 of the transmission 72. The housing 415 of the transmission 72 may comprise a mounting member 425 at an underside of the final drive unit $35_3$ for mounting the support 421 thereto.

In this embodiment, the frame 13 of the track system comprises a lower frame member 428 and an upper frame member 430. As will be discussed in more detail below, the lower frame member 428 is pivotally connected to the upper frame member 430. The lower frame member 428 carries the front and rear idler wheels $23_1$, $23_2$, $26_1$, $26_2$ and the mid-rollers $28_1$-$28_R$ and thus may be referred to as a "wheel-carrying member". The frame 13 further comprises an adjustment member 426 for adjusting the spacing S of the track system $16_3$ and the track system $16_4$ (i.e., the laterally-adjacent one of the track systems $16_1$-$16_4$) in the widthwise direction of the vehicle 10, as will be discussed in more detail below. In this embodiment, the adjustment member 426 is connected (e.g., fastened) to the wheel-carrying member 428. In other embodiments, the adjustment member 426 may be integrally made with the wheel-carrying member 428.

The pivot 412 is configured to be attached to the frame 13 of the track system $16_3$. For instance, as shown in FIGS. 71 to 75, the pivot 412 is connectable to the frame 13 of the track system $16_3$ at a plurality of different positions $P_1$-$P_N$ spaced in the widthwise direction of the vehicle 10 to adjust the spacing S of the track system $16_3$ and the track system $16_4$ (i.e., the laterally-adjacent one of the track systems $16_1$-$16_4$) in the widthwise direction of the vehicle 10. More specifically, the pivot 412 is connectable to the adjustment member 426 at the different positions $P_1$-$P_N$ such as to adjust the spacing S of the track system $16_3$ and the track system $16_4$. For example, the spacing S of the track systems $16_3$, $16_4$ may be adjusted to have the narrow tread setting (shown in FIGS. 71 to 73), the wide tread setting (shown in FIGS. 74 and 75), or a setting in between the narrow and wide tread settings. In this embodiment, in the narrow tread setting, the support arms $106_1$, $106_2$ of the final drive unit $35_3$ extend beyond the track 22 in the widthwise direction of the track system $16_3$.

Figure 66:
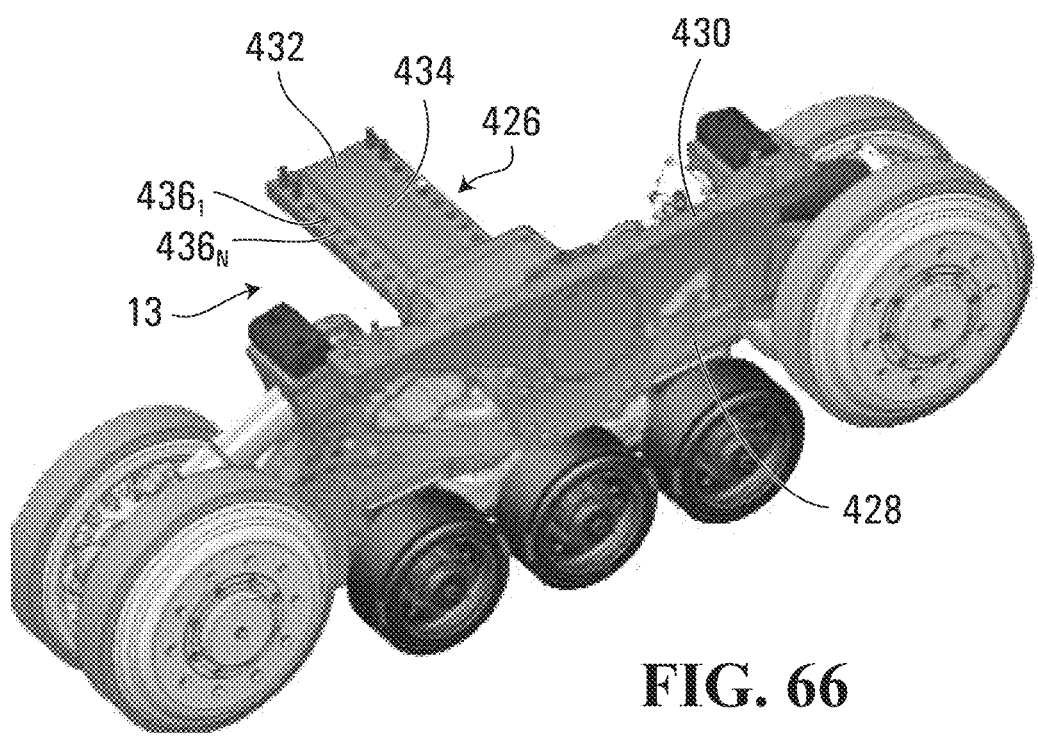
FIGS. 66 and 67 show front and rear perspective views of a frame of the track system of FIG. 62.
Figure 67:
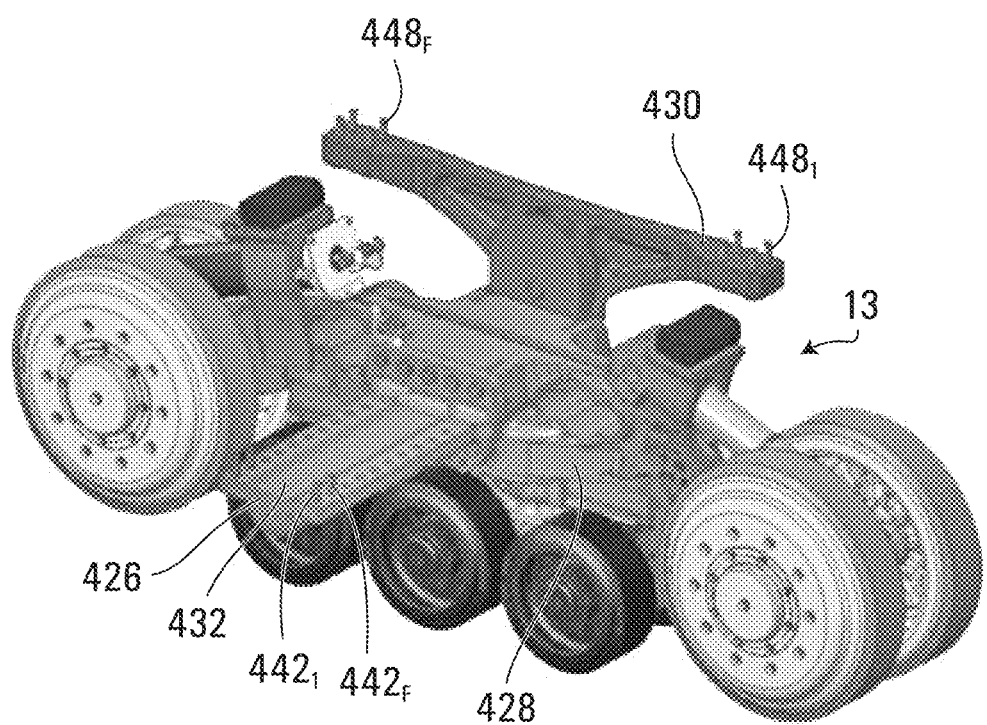
Figure 68:
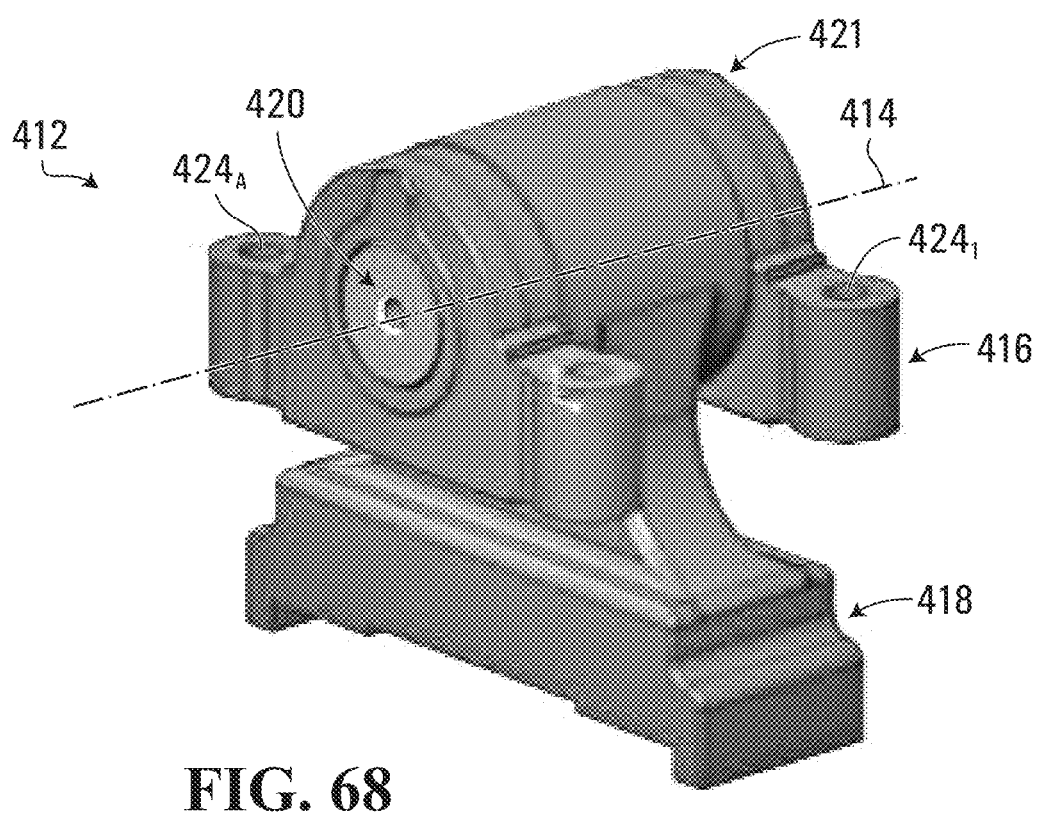
FIGS. 68 and 69 show front and rear perspective views of an inboard pivot of the track system of FIG. 62.
Figure 69:
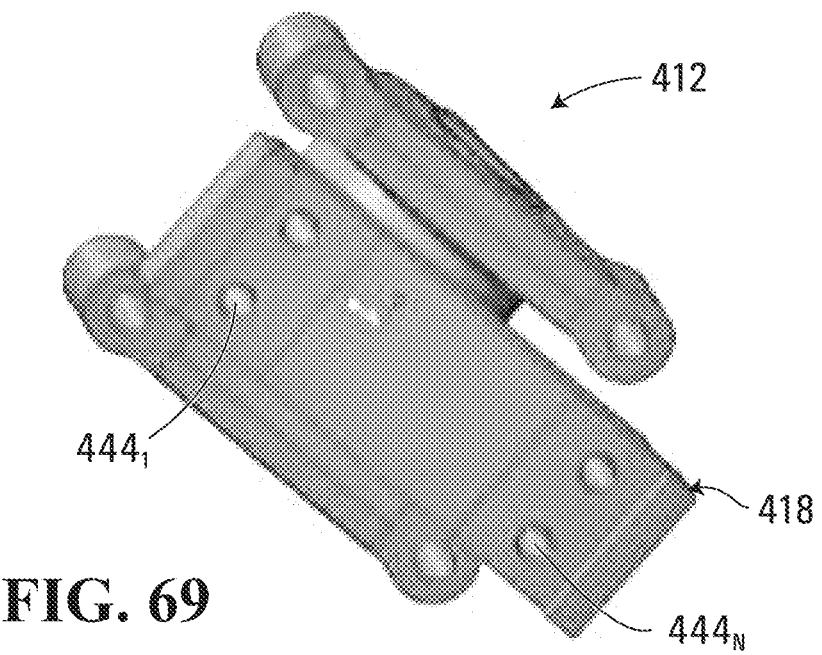

To that end, as shown in FIGS. 66 and 67, the adjustment member 426 comprises a lateral extension 432 projecting from the wheel-carrying member 428 in the widthwise direction of the track system $16_3$ and to which the pivot 412 is connectable. More particularly, the second body portion 418 of the support 421 of the pivot 412 is connectable to the lateral extension 432 via a plurality of fasteners $442_1$-$442_F$ which engage a plurality of openings $444_1$-$444_N$ of the second body portion 418 and a plurality of openings $436_1$-$436_N$ disposed at an upper side 434 of the lateral extension 432. That is, the fasteners $442_1$-$442_F$ engage the second body portion 418 and the lateral extension 432 of the adjustment member 426 such as to fasten the pivot 412 to the adjustment member 426. In this embodiment, the openings $444_1$-$444_N$ of the second body portion 418 are threaded for securely engaging the fasteners $442_1$-$442_F$. In other embodiments, the openings $444_1$-$444_N$ may be through holes and the fasteners $442_1$-$442_F$ may instead be secured by nuts.

In this embodiment, the upper frame member 430 is disposed on an outboard side of the track system $16_3$ (i.e., on a side of the drive wheel 24 away from the center 117 of the vehicle 10) and comprises a pivot 438 defining a pivot axis 440 about which the wheel-carrying member 428 of the frame 13 may pivot relative to the upper frame member 430. According to one example, the pivot 438 may be implemented by a bearing disposed at a connection between the upper frame member 430 and the wheel-carrying member 428 of the frame 13.

Figure 73:
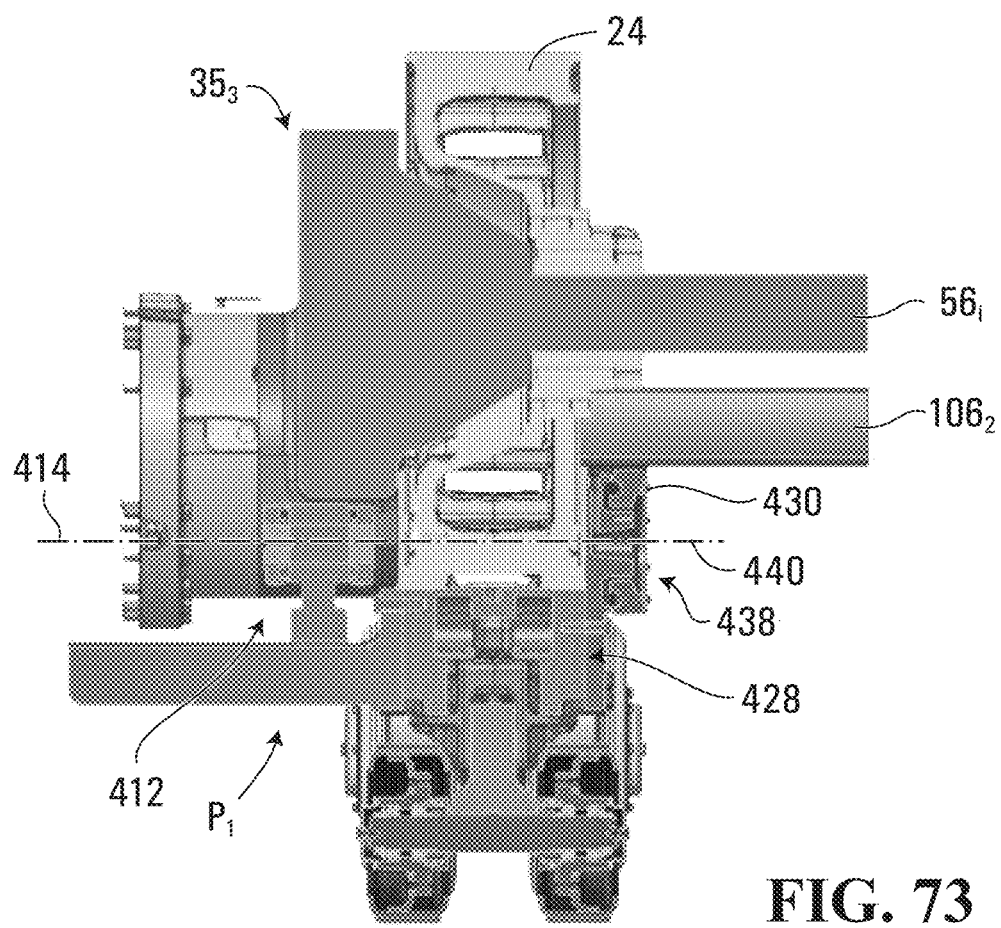
FIG. 73 shows a cross-sectional view of the track-engaging system of FIG. 71.
Figure 74:
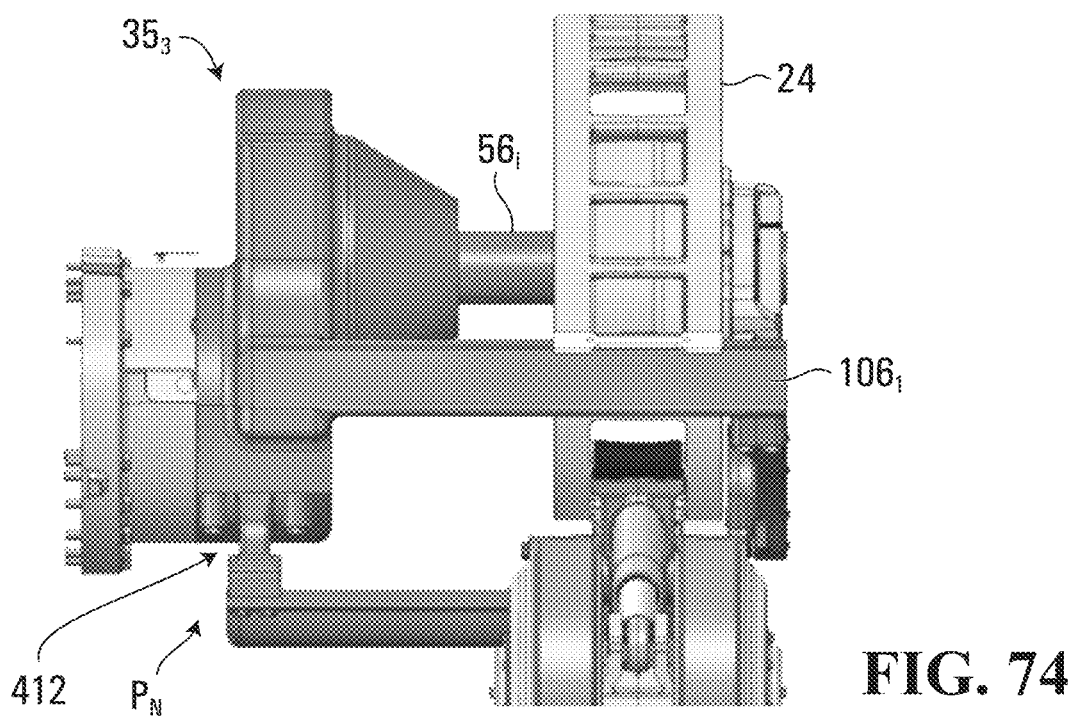
FIG. 74 shows a side view of the track-engaging system of FIG. 64 when the spacing of the laterally-adjacent track systems is in a wide tread setting.
Figure 75:
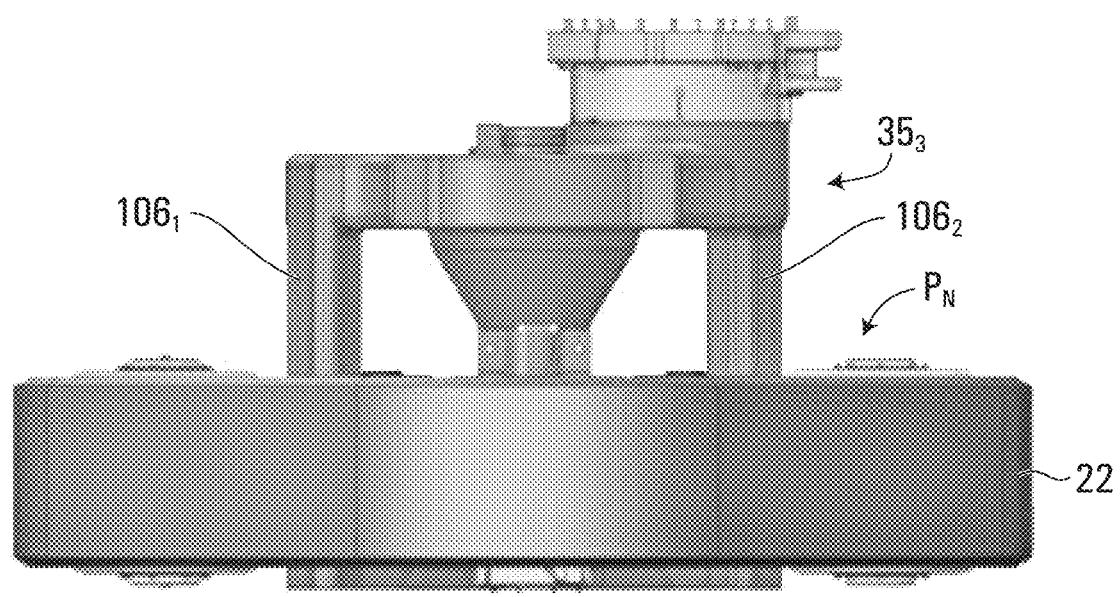
FIG. 75 shows a top view of the track system of FIG. 62 when the spacing of the laterally-adjacent track systems is in a wide tread setting.

Thus, in this embodiment, the pivot 412 may be referred to as an "inboard" pivot since it is disposed on the inboard side 260 of the drive wheel 24 while the pivot 438 may be referred to as an "outboard" pivot since it is disposed on the outboard side 258 of the drive wheel 24. Moreover, in this embodiment, as shown in FIG. 73, the pivot axis 414 of the inboard pivot 412 is coaxial with the pivot axis 440 of the outboard pivot 438.

Figure 63:
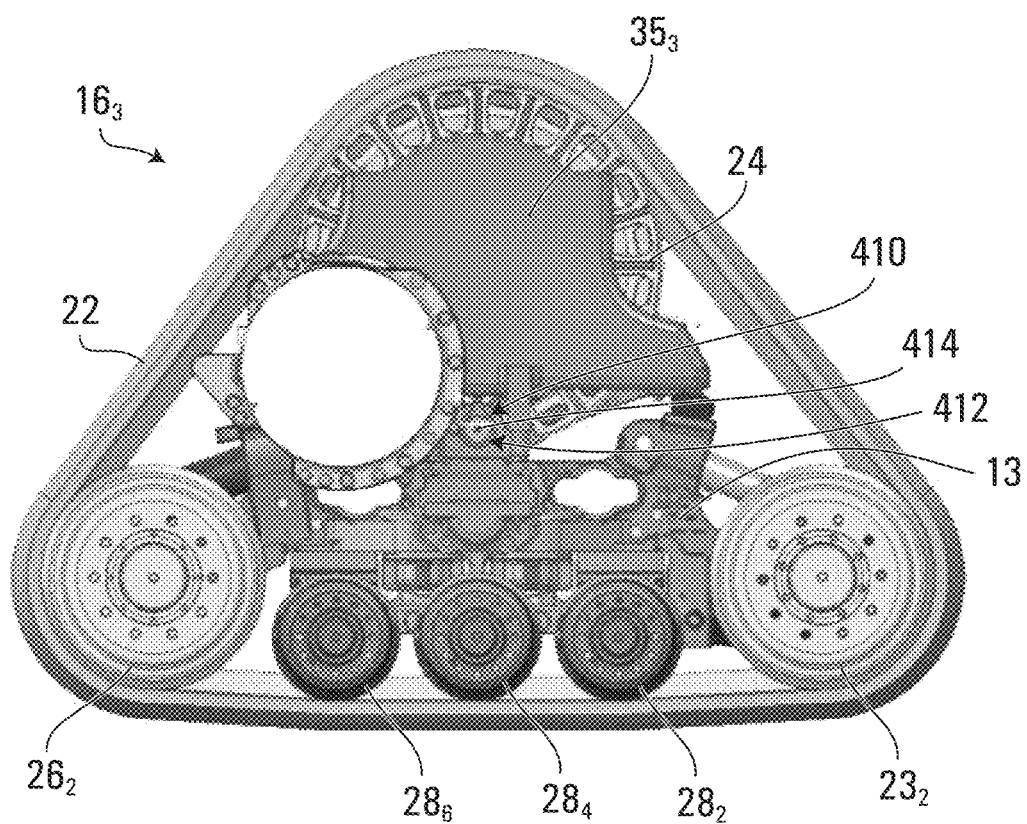
Figure 64:
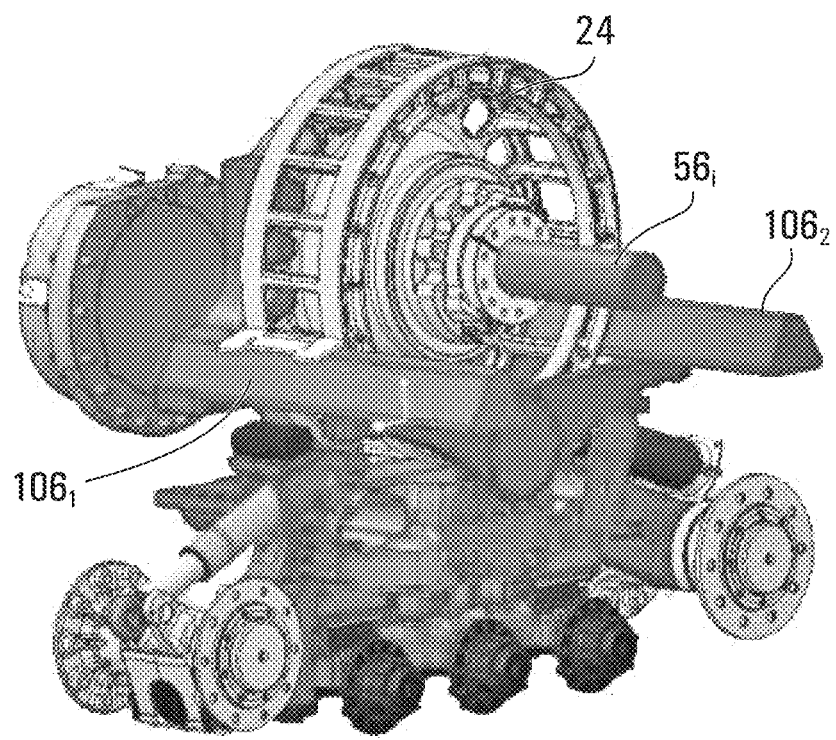
FIGS. 64 and 65 show front and rear perspective views of a track-engaging system of the track system of FIG. 62, with idler wheels thereof removed to more clearly show the components of the track-engaging system.
Figure 65:
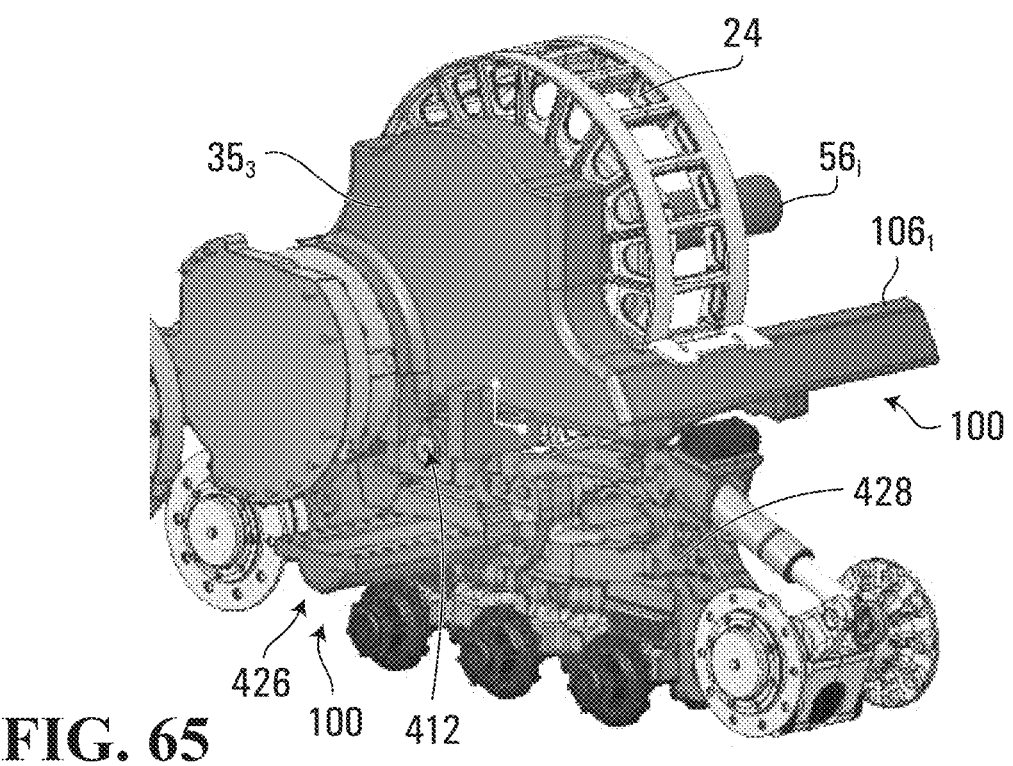

Furthermore, in this embodiment, as shown in FIG. 63, the pivot axis 414 of the inboard pivot 412 is located at or close to the neutral position NP of the track system $16_3$. For instance, in some cases, a ratio of a distance between the pivot axis 414 of the inboard pivot 412 and the neutral position NP of the track system $16_3$ over the height H of the track system $16_3$ may be no more than 20%, in some cases no more than 15%, in some cases no more than 10%, in some cases no more than 5%, and in some cases even less.

In this example of implementation, the pivot axis 414 of the inboard pivot 412 of the track system $16_3$ is located at the neutral position NP of the track system $16_3$, i.e., the ratio of the distance between the pivot axis 414 of the inboard pivot 412 and the neutral position NP of the track system $16_3$ over the height H of the track system $16_3$ is 0.

As described above with respect to FIG. 45, the neutral position NP of the track system $16_3$ lies at an intersection of the resultant tension force $F_{T,R}$ from the track 22 at the rear idler wheels $26_1$, $26_2$ and a resultant tension force $F_{T,F}$ from the track 22 at the front idler wheels $23_1$, $23_2$ when the track system $16_3$ is at rest (i.e., immobile). In this example, this neutral position NP is also intersected by a vertical load $W_T$ from the vehicle 10 applied by the final drive axle $56_i$.

Figure 70:
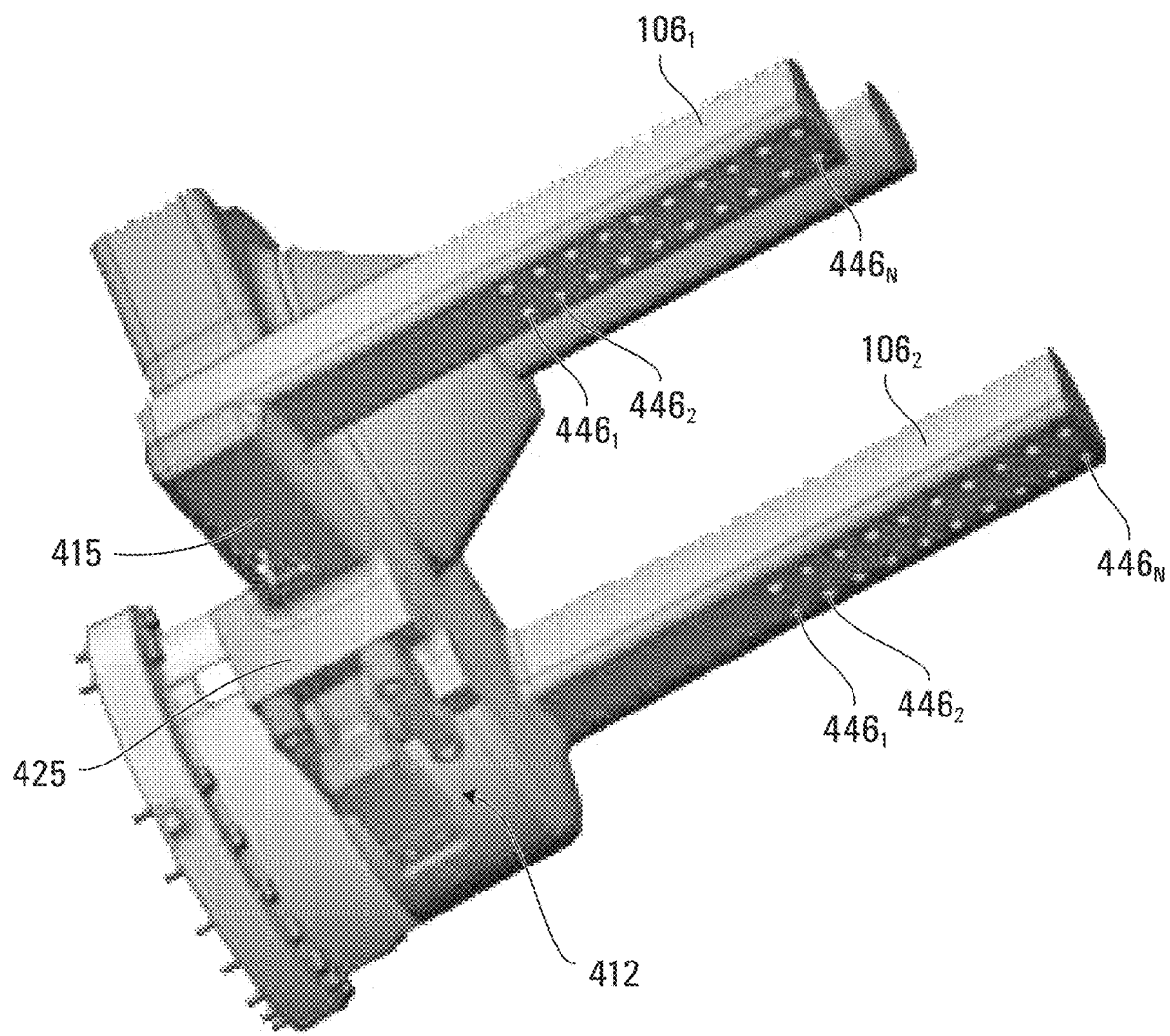
FIG. 70 shows a bottom perspective view of an embodiment of a final drive unit used in connection with the track system of FIG. 62.
Figure 71:
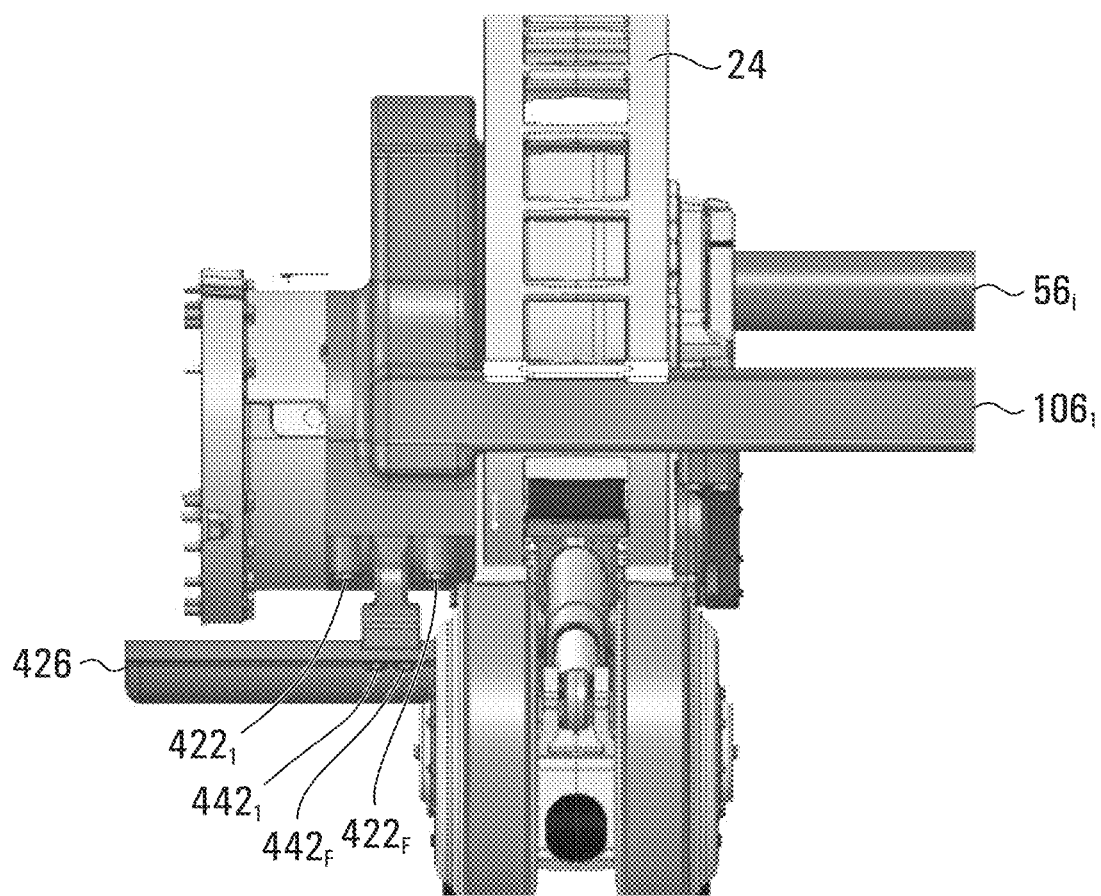
FIG. 71 shows a side view of the track-engaging system of FIG. 64 when the spacing of laterally-adjacent track systems is in a narrow tread setting.
Figure 72:
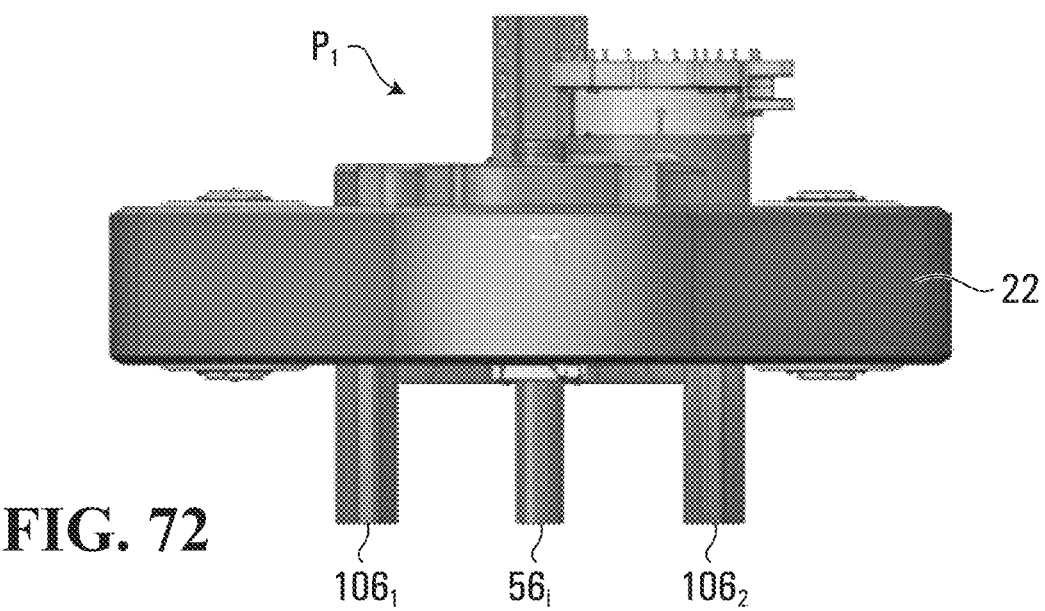
FIG. 72 shows a top view of the track system of FIG. 62 when the spacing between the laterally-adjacent track systems is in a narrow tread setting.

Furthermore, in this embodiment, as shown in FIG. 70, each support arm $106_i$ of the final drive unit $35_3$ comprises a plurality of openings $446_1$-$446_N$ for attaching the support arm $106_i$ to the frame 13 of the track system $16_3$ via a plurality of fasteners $448_1$-$448_F$. More particularly, the upper frame member 430 of the frame 13 of the track system $16_3$ is fastenable to the support arm $106_i$, beneath the support arm $106_i$, such that the upper frame member 430 and the support arm $106_i$ are fixed relative to one another when the track system $16_3$ moves on uneven terrain. To that end, the upper frame member 430 comprises a plurality of openings (not shown) for receiving the fasteners $448_1$-$448_F$ which fasten the upper frame member 430 to the support arms $106_1$, $106_2$. In other words, in this embodiment, the supports arms $106_1$, $106_2$ of the final drive unit $35_3$ are fastenable to the upper frame member 430 of the frame 13 of the track system $16_3$. In this embodiment, the openings $446_1$-$446_N$ of the support arm $106_i$ are disposed on a flat surface of the support arm $106_i$. More specifically, in this example of implementation, the support arms $106_1$, $106_2$ of the final drive unit $35_3$ are generally triangular and extend in the widthwise direction of the vehicle 10. The openings $446_1$-$446_N$ are disposed on a bottom-facing surface of the triangular support arm $106_i$.

As will be understood, each set of openings $446_1$-$446_N$ of the support arms $106_1$, $106_2$ is associated with a different position of the pivot 412. That is, in order to adjust a position of the pivot 412 (i.e., to displace the pivot 412 to occupy a position $P_x$), the support 421 of the pivot 412 is secured to a different set of the openings $436_1$-$436_N$ of the adjustment member 426 and the upper frame member 430 is secured to a corresponding set of the openings $446_1$-$446_N$ of the support arms $106_1$, $106_2$. As such, in this embodiment, the movable joint 410 and its pivot 412, as well as the support arms $106_1$, $106_2$ are part of the lateral track spacing adjustment mechanism 100.

In this embodiment, the drive wheel 24 of the track system $16_3$ is entirely supported by the final drive axle $56_i$ and is unsupported by the frame 13 of the track system $16_3$. All loading exerted by the drive wheel 24, including its weight, is transmitted through the final drive axle $56_i$, and thus is not transmitted through the frame 13 of the track system $16_3$. The tension of the track 22 is taken up by the drive wheel 24. The drive wheel 24 may thus be seen as a "floating" drive wheel in that it is unconnected to and isolated from the frame 13 of the track system $16_3$. To that end, in this embodiment, the drive wheel 24 is only (i.e., exclusively) supported by the final drive axle $56_i$. This is in contrast to the embodiment considered above in respect of FIGS. 4 to 7 and 27 to 32 in which the drive wheel 24 is supported by the nonrotatable support 125, namely the upper frame member 110, which transmits loading exerted by the drive wheel 24, including its weight, through the frame 13 of the track system $16_3$ and in which the tension of the track 22 is partly taken up by the upper frame member 110.

Figure 76:
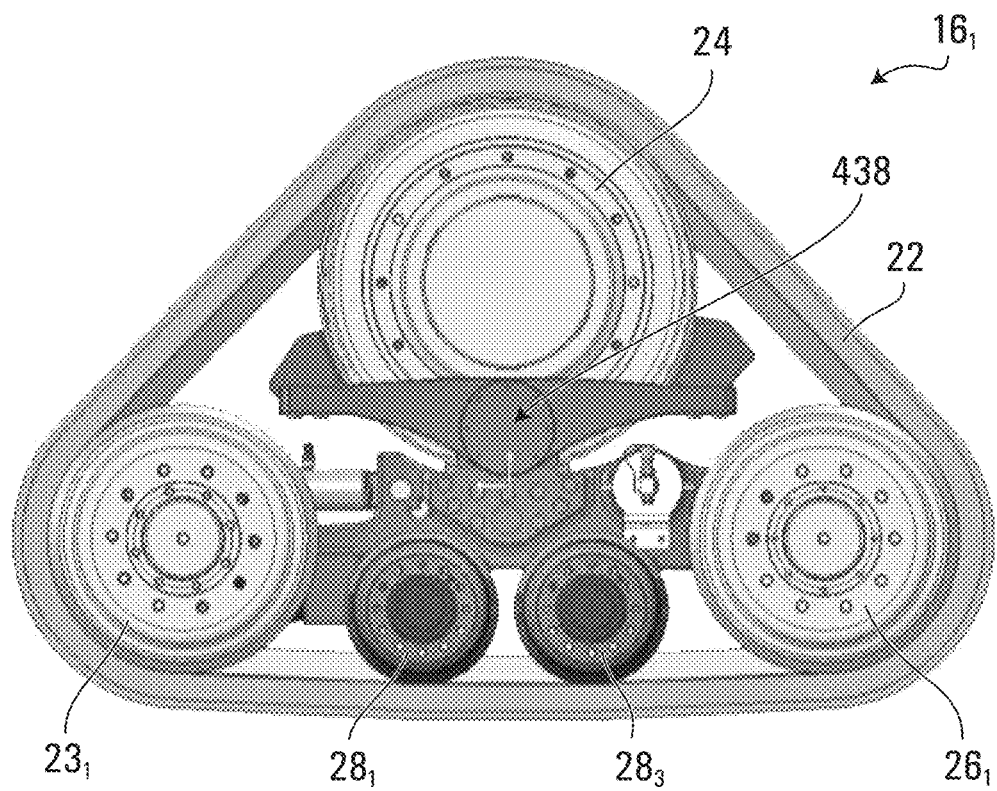
FIG. 76 shows a front view of a front track system in accordance with the embodiment of FIG. 62.
Figure 77:
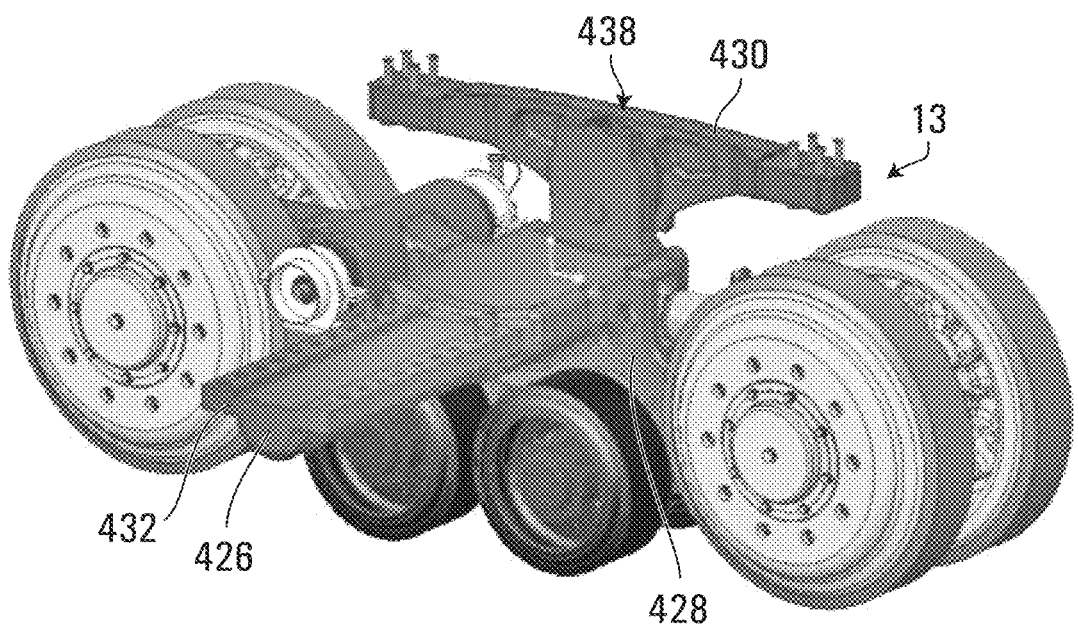
FIG. 77 shows a perspective view of a frame of the front track system of FIG. 76.

The front track systems $16_1$, $16_2$ are steerable to change their orientation relative to the frame 12 of the vehicle 10 in order to steer the vehicle 10 on the ground. As shown in FIGS. 76 and 77, each of the front track systems $16_1$, $16_2$ may be configured in a manner similar to that described with respect to FIGS. 62 to 75 for adjusting the spacing S of the front track systems $16_1$, $16_2$ in the widthwise direction of the vehicle 10. In this embodiment, as discussed above in relation to FIGS. 33 to 47B, the drive wheel 24 of each of the track systems $16_1$, $16_2$ is entirely supported by the final drive axle $56_i$ and is unsupported by the frame 13 of the track system $16_i$. All loading exerted by the drive wheel 24, including its weight, is transmitted through the final drive axle $56_i$, and thus is not transmitted through the frame 13 of the track system $16_i$. Thus, in this embodiment, the drive wheel 24 is only (i.e., exclusively) supported by a rotatable support (such as the rotatable support 202) that is rotatable by the final drive axle $56_i$. More particularly, the drive wheel 24 is mounted to a housing of the transmission such as to rotate with the housing (such as the housing 212 of transmission 204) as depicted in FIG. 39.

While the track systems $16_1$-$16_4$ including their lateral track spacing adjustment mechanism 100 is useful in agricultural fields, in this embodiment, the track systems $16_1$-$16_4$ can also perform well on roads since their lateral load distribution mechanism 150 may be useful when the lateral track spacing adjustment mechanism 100 is used for a wide track spacing.

Figure 59:
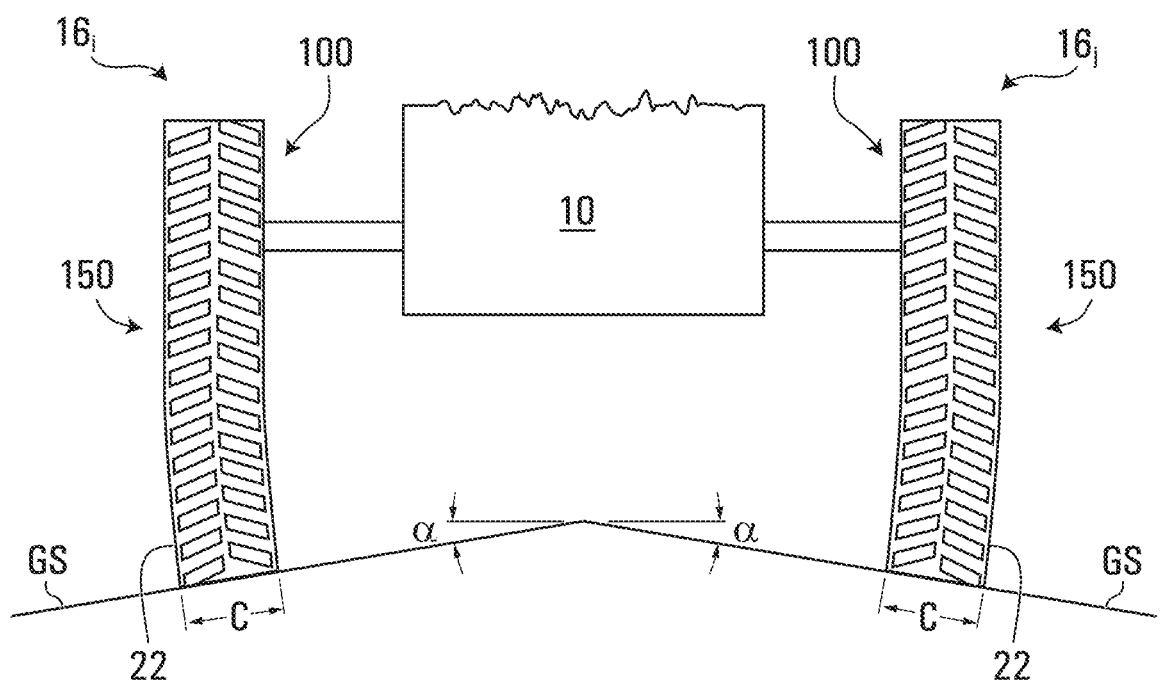
FIG. 59 shows the track system of FIG. 56 implementing the lateral load distribution mechanism for evenly distributing a load along a widthwise direction of the track while the agricultural vehicle is travelling on a crowned road.

The capability of the track systems $16_1$-$16_4$ to better perform on roads may be particularly useful in situations in which the road's surface GS has a cross slope for leading water away from the road (i.e., to avoid water accumulation on the road), as shown in FIG. 59. In this case, the cross slope of the road's surface GS is such that the road has a crown, i.e., a highest point, at a center of the road in its widthwise direction and slopes downwardly on either side of the crown. For instance, in some cases an angle α defined between a horizontal axis and road's surface GS on either side of the crown may be at least 1°, in some cases at least 2°, in some cases at least 4°, and in some cases even higher (e.g., at least 6° or 8°). The angle α may have any other value in other cases. In view of its crown, the road may sometimes be referred to as a "crowned road".

In this embodiment, each track system $16_i$ may be configured to accommodate a shape of the road, including its crown in this example, so as to better distribute loading on its track 22 than a conventional track system. More specifically, the lateral load distribution mechanism 150 of the track system $16_i$ allows better distribution of the loading on its track 22. This may be of particular use when the spacing S between the laterally-adjacent track systems $16_i$, $16_j$ is set to its wide tread setting via their respective lateral track spacing adjustment mechanisms 100 as shown in FIG. 54 for example. Notably, when the spacing S is set to its wide tread setting, the lateral load distribution mechanism 150 may be particularly useful to reduce wear of the track 22 and/or other components of the track systems $16_1$-$16_4$. For example, in a scenario where the track systems $16_1$-$16_4$ are compensating for the shape of the road (e.g., a crowned road) via their load distribution mechanisms 150, as shown in FIG. 59, and that the spacing S between the laterally-adjacent track systems $16_i$, $16_j$ is significant due to an adjustment made via the lateral track spacing adjustment mechanisms 100 of the track systems $16_i$, $16_j$, a greater adjustment in the roll axis may be desired from the load distribution mechanism 150 in order to adequately compensate for the shape of the road. In essence, the greater the spacing S between the laterally-adjacent track systems $16_i$, $16_j$, the greater the range of motion that will be desired from the load distribution mechanism 150 in order to adequately compensate for the shape of the road and thus distribute the load more evenly on the track systems $16_i$, $16_j$.

Although the track systems $16_1$-$16_4$ have been described as being mounted on the final drive unit $35_i$, in other cases the drive wheel 24 may be mounted directly to a drive shaft of the vehicle 10 (i.e., without a transmission between the drive shaft and the drive wheel 24). This may be particularly the case for the rear track systems $16_3$, $16_4$ which are not steerable.

In some examples of implementation, any feature of any embodiment described herein may be used in combination with any feature of any other embodiment described herein.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A vehicle comprising a frame, a powertrain, and a plurality of track systems for traction of the vehicle, a first one of the track systems being mounted on a first side of the vehicle and a second one of the track systems being mounted on a second side of the vehicle, each track system comprising:
   a track; and
   a track-engaging assembly for driving and guiding the track around the track-engaging assembly, the track-engaging assembly comprising:
      a drive wheel for driving the track when an axle of the vehicle rotates;
      a plurality of idler wheels for guiding the track, including:
         a leading idler wheel and a trailing idler wheel spaced apart in a longitudinal direction of the track system; and
         a plurality of roller wheels between the leading idler wheel and the trailing idler wheel in the longitudinal direction of the track system; and
      a frame supporting the idler wheels;
      the drive wheel being supportable by a transmission mountable between the drive wheel and the axle of the vehicle;
   wherein: a spacing between the first one of the track systems and/or the second one of the track systems and the transmission is adjustable.

2. A track system of a plurality of track systems for traction of a vehicle, the vehicle comprising a frame and a powertrain, the track system being mountable on a first side of the vehicle, a laterally-adjacent one of the track systems being mountable on a second side of the vehicle, the track system comprising:
   a track; and
   a track-engaging assembly for driving and guiding the track around the track-engaging assembly, the track-engaging assembly comprising:
      a drive wheel for driving the track when an axle of the vehicle rotates;
      a plurality of idler wheels for guiding the track, including:
         a leading idler wheel and a trailing idler wheel spaced apart in a longitudinal direction of the track system; and
         a plurality of roller wheels between the leading idler wheel and the trailing idler wheel in the longitudinal direction of the track system; and
      a frame supporting the idler wheels;
      a given one of the roller wheels being rotatable relative to the frame of the track system about an axis transversal to an axis of rotation of the given one of the roller wheels;
   wherein a spacing of the track system and the laterally-adjacent one of the track systems in a widthwise direction of the vehicle is adjustable in a continuous range of adjustment positions relative to a transmission of the vehicle.

3. A vehicle comprising a frame, a powertrain, and a plurality of track systems for traction of the vehicle, a first one of the track systems being mounted on a first side of the vehicle and a second one of the track systems being mounted on a second side of the vehicle, each track system comprising:
   a track; and
   a track-engaging assembly for driving and guiding the track around the track-engaging assembly, the track-engaging assembly comprising:
      a drive wheel for driving the track when an axle of the vehicle rotates;
      a plurality of idler wheels for guiding the track, including:
         a leading idler wheel and a trailing idler wheel spaced apart in a longitudinal direction of the track system; and
         a plurality of roller wheels between the leading idler wheel and the trailing idler wheel in the longitudinal direction of the track system; and
      a frame supporting the idler wheels;
      a given one the roller wheels being rotatable relative to the frame of the track system about an axis transversal to an axis of rotation of the given one of the roller wheels;
   wherein a spacing of the first one of the track systems and the second one of the track systems in a widthwise direction of the vehicle is adjustable in a continuous range of adjustment positions relative to a transmission of the vehicle.

4. The vehicle of claim 1, wherein the transmission comprises planetary gearing.

5. The vehicle of claim 1, wherein the track system comprises a wheel carrier carrying respective ones of the roller wheels and configured to allow the respective ones of the roller wheels to move relative to the frame of the track system.

6. The vehicle of claim 5, wherein the wheel carrier is configured to allow the respective ones of the roller wheels to rotate relative to the frame of the track system about an axis transversal to axes of rotation of the respective ones of the roller wheels.

7. The vehicle of claim 5, wherein the wheel carrier is configured to allow the respective ones of the roller wheels to rotate relative to the frame of the track system about an axis generally parallel to the axes of rotation of the respective ones of the roller wheels.

8. The track system of claim 2, wherein the drive wheel is unsupported by the frame of the track system and is supportable entirely by the axle of the vehicle.

9. The track system of claim 2, wherein the drive wheel is supportable by a support rotatable by the axle of the vehicle.

10. The track system of claim 9, wherein the support rotatable by the axle of the vehicle comprises an output of a transmission mountable between the drive wheel and the axle of the vehicle.

11. The track system of claim 10, wherein the transmission remains fixed in the widthwise direction of the vehicle while the spacing of the track system and the laterally-adjacent one of the track systems in the widthwise direction of the vehicle is adjusted.

12. The track system of claim 2, wherein: the given one of the roller wheels is a first one of the roller wheels; and a second one of the roller wheels is spaced from the first one of the roller wheels in a widthwise direction of the track system and rotatable relative to the frame of the track system about an axis transversal to an axis of rotation of the second one of the roller wheels.

13. The track system of claim 12, comprising a wheel-carrying structure that carries the first one of the roller wheels and the second one of the roller wheels and includes a pivot defining each of the axis transversal to the axis of rotation of the first one of the roller wheels and the axis transversal to the axis of rotation of the second one of the roller wheels.

14. The vehicle of claim 6, wherein the wheel carrier comprises an upper structure and a lower structure coupled to the upper structure, and wherein the wheel carrier is rotatable about the axis transversal to the axes of rotation of the respective ones of the roller wheels via the lower structure.

15. The vehicle of claim 14, wherein the wheel carrier is configured to allow the respective ones of the roller wheels to rotate relative to the frame of the track system about an axis generally parallel to the axes of rotation of the respective ones of the roller wheels via the upper structure.

16. The track system of claim 2, wherein the frame of the track system comprises an upper frame member configured to engage with a plurality of support arms on a support on the vehicle.

17. The track system of claim 16, wherein the upper frame member is pivotably connectable to a lower frame member that supports the plurality of idler wheels and the plurality of roller wheels.

18. The track system of claim 16, further comprising a retaining mechanism configured to selectively secure the track system to the transmission or a respective one of the plurality of support arms to provide the continuous range of adjustment positions.

19. The track system of claim 18, wherein the retaining mechanism comprises a taper lock bushing.

20. The vehicle of claim 3, further comprising a support configured to engage the frame of the track system, the support comprising a plurality of support arms that protrude from a body of the transmission, wherein the track system comprises an upper frame member configured to slidably engage with the plurality of support arms to adjust a spacing between the track system and the transmission.

* * * * *

UNITED STATES PATENT AND TRADEMARK OFFICE
CERTIFICATE OF CORRECTION

PATENT NO. : 11,661,124 B2
APPLICATION NO. : 17/526950
DATED : May 30, 2023
INVENTOR(S) : Dewaine Kautsch, Jonathan Lauzier and Michel Deslauriers It is certified that error appears in the above-identified patent and that said Letters Patent is hereby corrected as shown below:

In the Claims

Claim 3, Column 34, Line 42 should read:
"a given one of the roller wheels being rotatable relative to".

Signed and Sealed this
Fourth Day of July, 2023

Katherine Kelly Vidal
*Director of the United States Patent and Trademark Office*